United States Patent
Karimine et al.

(10) Patent No.: US 8,557,064 B2
(45) Date of Patent: Oct. 15, 2013

(54) METHOD OF COOLING RAIL WELD ZONE, AND RAIL WELD JOINT

(75) Inventors: Kenichi Karimine, Tokyo (JP); Masaharu Ueda, Tokyo (JP); Katsuya Iwano, Tokyo (JP); Seiji Sugiyama, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 69 days.

(21) Appl. No.: 13/138,791

(22) PCT Filed: Mar. 30, 2010

(86) PCT No.: PCT/JP2010/002303
§ 371 (c)(1), (2), (4) Date: Sep. 27, 2011

(87) PCT Pub. No.: WO2010/116680
PCT Pub. Date: Oct. 14, 2010

(65) Prior Publication Data
US 2012/0015212 A1    Jan. 19, 2012

(30) Foreign Application Priority Data

Mar. 30, 2009 (JP) ................................. 2009-081587
Jul. 28, 2009 (JP) ................................. 2009-175646

(51) Int. Cl.
*C21D 9/04* (2006.01)
*C22C 38/02* (2006.01)

(52) U.S. Cl.
USPC ........... 148/581; 148/529; 148/640; 148/644; 148/320

(58) Field of Classification Search
USPC ................... 148/529, 640, 644, 581, 320–337
See application file for complete search history.

(56) References Cited

U.S. PATENT DOCUMENTS

| 4,573,666 A | 3/1986 | Nomura et al. |
| 2008/0011393 A1 | 1/2008 | Ueda et al. |

FOREIGN PATENT DOCUMENTS

| JP | 48-095337 | 12/1973 |
| JP | 56-136292 | 10/1981 |
| JP | 59-093837 | 5/1984 |
| JP | 59-093838 | 5/1984 |
| JP | 60-33313 | 2/1985 |
| JP | 62-207824 | 9/1987 |
| JP | 03-249127 | 11/1991 |
| JP | 06-228648 | 8/1994 |

(Continued)

OTHER PUBLICATIONS

International Search Report dated Jun. 22, 2010 issued in corresponding PCT Application No. PCT/JP2010/002303.

(Continued)

*Primary Examiner* — Deborah Yee
(74) *Attorney, Agent, or Firm* — Kenyon & Kenyon LLP

(57) ABSTRACT

The invention provides a method of cooling a rail weld zone. The method includes a first rail web portion cooling process of cooling a rail web portion cooling region of the rail weld zone in a part of a temperature range until the completion of transformation from austenite to pearlite, a second rail web portion cooling process of cooling the rail web portion cooling region after the entire rail web portion of the rail weld zone is transformed to pearlite, a foot portion cooling process of cooling a foot portion of the rail weld zone, and a head portion cooling process of cooling a head portion of the rail weld zone. When cooling time of the first and second rail web portion cooling processes is t minute, a k value satisfies an expression represented as $-0.1t+0.63 \leq k \leq -0.1t+2.33$.

12 Claims, 40 Drawing Sheets

(56) References Cited

FOREIGN PATENT DOCUMENTS

| | | |
|---|---|---|
| JP | 06-292968 | 10/1994 |
| JP | 06-299246 | 10/1994 |
| JP | 8-337819 | 12/1996 |
| JP | 9-137228 | 5/1997 |
| JP | 11-270810 | 10/1999 |
| JP | 2002-263866 | 9/2002 |
| JP | 2004-43862 | 2/2004 |
| JP | 2004-43864 | 2/2004 |
| RU | 2003705 | 11/1993 |
| RU | 2139946 | 10/1999 |
| RU | 2162486 | 1/2001 |

OTHER PUBLICATIONS

Urashima et al., "The Influence of Residual Stress on Durability of Rails," Proceedings of the Second International Conference on residual stresses, ICR2, Nancy, France, Nov.23-25, 1988, p. P912-918.

Miki, Anami, Tani, Sugimato, "Fatigue Strength Improvement Methods by Treating the Weld Toe", Collection of papers of Institute of Welding, vol. 17, No. 1, p. 111-119 (1999).

Russian Notice of Allowance, dated Jan. 17, 2013, issued in corresponding Russian application No. 2011139538, and an English translation thereof.

METHOD OF COOLING RAIL WELD ZONE, AND RAIL WELD JOINT

TECHNICAL FIELD

The present invention relates to a rail weld joint and a method and device for cooling a rail weld zone that improve the fatigue strength of a weld joint as compared to the related art. More particularly, the present invention relates to a method and device for cooling a rail joint portion immediately after welding.

This application is a national stage application of International Application No. PCT/JP2010/002303, filed Mar. 30, 2010, which claims priority to Japanese Patent Application No. 2009-081587, filed Mar. 30, 2009 and Japanese Patent Application No. 2009-175646, filed Jul. 28, 2009, the contents of which are incorporated herein by reference.

BACKGROUND ART

Since a rail joint portion (rail weld zone) is most easily damaged in a rail, the rail joint portion requires maintenance cost. Further, a rail joint portion is a main generation source of noise and vibration that are generated during the passage of a train. Since the speed and trainload of a train are increasing in various countries, a technique, which forms a long rail by continuously connecting rail joint portions having the above-mentioned problem by welding, is being used generally.

A general rail will be described with reference to FIGS. 1A and 1B. FIG. 1A is a side view of a long rail. A long rail is manufactured by welding at least two rails. For this reason, the long rail has a weld zone 7. A weld bead 8 exists at the weld zone 7.

FIG. 1B is a cross-sectional view taken along a line A-A shown in FIG. 1A. As shown in FIG. 1B, a rail includes a head portion 1 (rail upper portion) with which a wheel comes into contact, a foot portion 3 (rail lower portion) that is placed on sleepers, and a rail web portion 2 that is formed between the head portion 1 and the foot portion 3. Further, the head portion 1 includes a head-top portion 4, and the foot portion includes a foot-surface portion 5 and a sole portion 6.

Flash butt welding (for example, Patent Document 1), gas pressure welding (for example, Patent Document 2), enclosed arc welding (for example, Patent Document 3), and Thermit welding (for example, Patent Document 4) are main methods of welding a rail.

FIGS. 2A to 2C are views illustrating flash butt welding. As shown in FIGS. 2A to 2C, the flash butt welding generates arc between end faces by applying a voltage to materials 10, which are to be welded and are disposed so as to face each other, through electrodes 9, and melts the end faces of the materials to be welded. Further, when the materials to be welded are sufficiently heated, the materials are pressed against each other in an axial direction, so that the materials to be welded are joined to each other.

FIGS. 3A and 3B are views illustrating Thermit welding. FIG. 3B is a cross-sectional view taken along a line B-B shown in FIG. 3A. In the Thermit welding, as shown in FIGS. 3A and 3B, materials 10 to be welded are disposed so as to face each other with a gap of 20 to 30 mm interposed therebetween and the gap is surrounded by a mold 14. Further, molten steel 16, which is generated in a crucible 15 by the reaction between aluminum and an iron oxide, is poured into the mold, so that the end faces of the rail are melted and welded to each other.

FIGS. 4A to 4C are views illustrating gas pressure welding. In the gas pressure welding, as shown in FIG. 4A, while joint surfaces are pressed, portions of materials to be welded in the vicinity of the joint surfaces are heated from side surfaces by burners 17 and the joint surfaces come into press contact with each other at high temperature. As shown in FIG. 4B, portions in the vicinity of a weld zone are deformed so as to expand by pressing. Further, as shown in FIG. 4C, expanding portions are removed by trimmers 18.

FIGS. 5A to 5B are views illustrating enclosed arc welding. In the enclosed arc welding, as shown in FIGS. 5A and 5B, materials to be welded are disposed so as to face each other with a gap of 10 to 20 mm interposed therebetween and backing metal 19 and siding metal 20 are disposed around the gap. Further, weld metal is built at the gap with a welding rod 21. This method is a so-called manual arc welding method.

In particular, there is a concern that fatigue cracks are generated from the neutral axis of the rail weld zone as an origination at a railway where a heavy-load freight train passes, a railway of a cold area, or the like. Accordingly, rails need to be frequently replaced in order to prevent the brittle fracture of a rail that is caused by the fatigue cracks. An example of brittle fracture is shown in FIGS. 6A and 6B.

FIG. 6A is a view showing a fatigue crack 22 that is generated at the rail web portion in a horizontal direction, and a brittle crack 23 that is caused by the fatigue crack. Further, FIG. 6B is a view showing the crack surface of the brittle crack 23 and the fatigue crack 22 shown in FIG. 6A. The fatigue crack 22 is generated from a weld defect as an origination, which is formed in the vicinity of the weld bead 8 and the neutral axis, in the horizontal direction. After the brittle crack 23 caused by the fatigue crack 22 penetrates the rail web portion in a thickness direction, one end of the crack is growing toward a rail head-top portion and the other end thereof is growing toward the foot portion. The origination of the fatigue crack 22 is not limited to the weld defect, and various causes are considered as the origination of the fatigue crack.

It is considered that the generation of a fatigue crack is affected by not only an external load condition but also residual stress in a material. FIG. 7A is a graph showing the distribution of residual stress at a rail weld zone in a circumferential direction. FIG. 7A shows that tensile residual stress exists when residual stress is larger than 0, and compressive residual stress exists when residual stress is smaller than 0.

From FIG. 7A, it is understood that large tensile residual stress in the circumferential direction (that is, vertical direction) of the rail is generated in the vicinity of the rail web portion of the rail weld zone by welding. Accordingly, it is considered that a fatigue crack generated from a weld defect as an origination is generated since a load is repeatedly applied to the vicinity of the rail web portion of the rail weld zone having large tensile residual stress by the passage of a train. In order to prevent the fatigue crack, it is preferable to prevent the generation of a weld defect an origination and to make a weld defect be ineffective even though the weld defect exists.

Further, FIG. 7B shows a relationship between a distance from a welding center (in the longitudinal direction of the rail) and residual stress that exists at the rail web portion of the rail in the vertical direction. From FIG. 7B, it is understood that large tensile residual stress exists in the range between the welding center and a position distant from the welding center by a distance of about 25 mm.

A track of a railway includes rails and sleepers that support the rails. When a train passes on the rails, dispersed loads are applied to the rails from a plurality of wheels of the train.

A cause, which generates the above-mentioned fatigue cracks, is related with the state of a load that is applied to the rail weld zone from the wheel. A load which is applied to the rail during the passage of the train varies at a rail portion immediately above the sleeper 24 and a rail portion that is formed between two sleepers 24. A vertical load of the train is directly applied to the rail at the rail portion immediately above the sleeper 24. When a long rail welded at a factory is installed on sleepers in the field, the position of the weld zone may correspond to that of the sleeper by accident. It is considered that several points where the positions of the weld zones correspond to those of the sleepers exist on a long rail having a length of several hundred meters.

FIG. 9A illustrates a time point where a wheel 25 passes just above the sleeper 24 (on a weld zone) at a point where the position of the sleeper 24 corresponds to the position of the weld zone. In this case, the largest stress is generated at the rail web portion 2 of which the cross-sectional area is small. The stress in this case is compressive stress, but large tensile residual stress exists at the rail web portion 2 as described above. Accordingly, while the rail web portion 2 receives actual tensile stress, stress repeatedly acts on the rail web portion.

Meanwhile, FIG. 9B illustrates a time point where a wheel 25 passes between two sleepers 24 (on a weld zone) at a point where the positions of the sleepers 24 and 24 do not correspond to the position of the weld zone. In this case, a load, which presses and bends the rail, is applied to the rail from the wheel 25 from above. For this reason, compressive stress in the longitudinal direction is generated at the rail head portion 1 and tensile stress in the longitudinal direction is generated at the rail foot portion 3. Bending stress applied to the rail web portion 2 is in neutral. Since the tensile stress of the rail foot portion 3 is generated whenever the wheel 25 passes, it is necessary to consider the generation of a fatigue crack at the rail foot portion 3.

FIG. 8 shows residual stress that is generated at the peripheral portion of the weld zone in the longitudinal direction. As shown in FIG. 8, large compressive stress in the longitudinal direction remains on the bottom of the rail. For this reason, even though tensile stress is applied to the bottom of the rail when a train passes, the tensile stress and the compressive stress offset each other in the state of effective stress. Accordingly, it is possible to suppress the generation of fatigue cracks. For this reason, an actual example of fatigue failure from the rail foot portion is uncommon. However, if compressive residual stress is small, damage from the fatigue crack 26 which is generated at the rail sole as an origination may be generated as shown in FIGS. 10A and 10B.

Patent Document 5 and Patent Document 6 disclose a method of making the entire rail weld zone or the head portion and the rail web portion of the rail weld zone in a high-temperature state by welding heat or heat transferred from the outside, and then performing accelerated cooling in order to prevent the damage to a rail web portion. According to this technique, since residual stress of a rail weld zone is controlled, it is possible to reduce tensile residual stress that is generated at the rail web portion of the rail weld zone in the vertical direction or to convert the tensile residual stress into compressive residual stress. For this reason, it is possible to improve the fatigue strength of the rail weld zone. It is possible to suppress the generation of the fatigue cracks from the rail web portion by this technique.

As other techniques that improve the fatigue strength of the rail weld zone, there are a method using shot peening as described in, for example, Patent Document 7, methods using hammer peening, grinder treatment, and TIG dressing, and the like.

Further, Patent Document 8 discloses a device for cooling a rail weld zone.

In order to improve the durability of a long rail, it is necessary to suppress the generation of fatigue cracks from a rail web portion and a foot portion of a weld zone and to give fatigue resistance to the long rail at the same time.

When the accelerated cooling of a head portion and a rail web portion of a rail weld zone is performed by a cooling method disclosed in Patent Document 5 and Patent Document 6, the tensile residual stress of the rail web portion in the vertical direction is improved, so that the generation of fatigue cracks at the rail web portion is suppressed. However, in the drawings of the Non-patent Document 1, it is indicated that the residual stress of a sole portion in the longitudinal direction of a rail is converted into tensile residual stress, if the above-mentioned method is employed. In recent years, since heavy-load trains have tended to increase, the burden that is caused by a bending load and applied to a sole portion, is increasing. Since the sole portion is tensioned in the longitudinal direction of a rail by the burden that is caused by the bending load, the fatigue strength of the rail sole portion is important. As described above, residual stress of the rail in the longitudinal direction significantly affects the fatigue strength of the rail sole portion. However, since residual stress of the rail sole portion in the longitudinal direction of the rail is reduced (is to be converted into tensile residual stress) in the cooling treatment of Patent Document 5 and Patent Document 6 as described above, there is a concern that fatigue strength is reduced. For this reason, there is a concern that damage shown in FIGS. 10A and 10B is generated.

Meanwhile, according to shot-peening treatment that is the related art for improving residual stress (that is, for applying compressive residual stress) by mechanical rail web-treatment, steel spheres, which have a diameter of several mm, are bumped against a material to plastically deform a surface layer of the material, so that the surface layer is subjected to work hardening. As a result, it is possible to improve fatigue strength by increasing residual stress. However, this treatment requires large facilities that project steel spheres, collect the steel spheres, and prevent dust, and the like. For this reason, the application of the shot-peening treatment to a large weld zone is limited. In addition, since materials to be projected need to be supplied due to the abrasion and damage thereof, it is disadvantageous in terms of cost.

Further, according to hammer peening that plastically deforms a weld zone by hitting a material with ends of tools, compressive stress is given to the material and stress concentration is suppressed by plastic deformation, so that fatigue strength of the material is improved. However, vibration is large during hitting, burden on a worker is large, and it is difficult to perform fine control and uniform treatment. In Non-patent Document 2, it is indicated that an effect of improving the fatigue strength is small due to a wrinkly groove portions, which are formed by working according to the treatment conditions.

Further, since grinder treatment suppresses stress concentration by smoothing weld bead toes, a reliable effect can be expected. However, if the weld bead toes are excessively ground, the thickness of a weld zone is insufficient, which causes reduction in strength. For this reason, there is a drawback in that grinder treatment requires skill and a long time.

Further, weld bead toes are melted again by arc generated from a tungsten electrode and are solidified again in a smooth shape in TIG dressing, so that stress concentration is suppressed. As a result, it is possible to improve fatigue strength. However, when a high-carbon material such as a rail is manually welded, a hard and brittle martensite structure is apt to be generated. In order to prevent the generation of a martensite structure, strict working management is required.

Further, it is possible to increase the hardness of a weld zone by performing appropriate cooling from a high-temperature state after welding by a device for cooling a rail weld zone disclosed in Patent Document 8. Meanwhile, according to the examination of the inventors, in order to control the state of residual stress of a weld zone, it is necessary to perform cooling in an appropriate range at appropriate intensity. It is considered that residual stress is also changed by the device of Patent Document 8, but cooling conditions for appropriate distribution of residual stress are not described.

Since a rail joint portion (rail weld zone) is most easily damaged in a rail as described above, the rail joint portion requires maintenance cost. Further, a rail joint portion is a main generation source of noise and vibration that are generated during the passage of a train. Since the speed and train-load of a train are increasing in various countries, a technique, which forms a long rail by continuously connecting rail joint portions having the above-mentioned problem by welding, is being used generally.

Flash butt welding (for example, see Patent Document 1), gas pressure welding (for example, see Patent Document 2), enclosed arc welding (for example, see Patent Document 3), and Thermit welding (for example, see Patent Document 4) are main methods of welding a rail.

When a rail joint portion is welded, in particular, there is a concern that fatigue cracks are generated in the vicinity of the neutral axis of the rail weld zone at a railway where a heavy-load freight train passes, a railway of a cold area, or the like. Accordingly, rails need to be frequently replaced in order to prevent the brittle fracture of a rail that is caused by the fatigue cracks. An example of brittle fracture is shown in FIGS. 41A and 41B. FIG. 41A shows a state where a fatigue crack 151 generated in a horizontal direction is generated in the vicinity of the neutral axis of a rail weld zone 150. A brittle crack 152 is generated toward the rail head portion and the rail foot portion. FIG. 41B shows a fracture surface of the fatigue crack 151 and the brittle crack 152. From FIG. 41B, it is understood that a fatigue crack 151 is generated from the vicinity of the neutral axis of the rail weld zone 150 as an origination and the brittle crack 152 then penetrates the rail web portion in a thickness direction. Meanwhile, in this specification, a rail upper portion 160 coming into contact with a wheel is referred to as a "head portion", a rail lower portion 162 coming into contact with a sleeper is referred to as a "foot portion", and a portion 161 formed between the head portion and the foot portion is referred to as a "rail web portion" (see FIGS. 27A and 27B).

It is considered that the generation of a fatigue crack is affected by not only an external load condition but also residual stress in a material. FIG. 42 is a graph showing the distribution of residual stress, which is caused by flash butt welding, at a peripheral portion of a rail weld zone in a circumferential direction. In a graph of FIG. 42, a positive direction of a vertical axis represents tensile residual stress and a negative direction of the vertical axis represents compressive residual stress. From FIG. 42, it is understood that tensile residual stress of the rail web portion is large. If a rail weld zone is positioned on the sleeper, compressive stress in the vertical direction acts on the rail web portion during the passage of a train. However, large tensile stress in the vertical direction (rail cross-section circumferential direction) remains at the rail web portion. Accordingly, while the rail web portion receives actual tensile stress, stress repeatedly acts on the rail web portion. For this reason, fatigue cracks are apt to be generated at the rail web portion.

Patent Document 5 and Patent Document 6 disclose a method of making the entire rail weld zone or the head portion and the rail web portion of the rail weld zone in a high-temperature state by welding heat or heat transferred from the outside, and then performing accelerated cooling in order to prevent the damage to a rail web portion. According to this technique, since residual stress of a rail weld zone is controlled, it is possible to reduce tensile residual stress that is generated at the rail web portion of the rail weld zone in the vertical direction or to convert the tensile residual stress into compressive residual stress. For this reason, it is possible to improve the fatigue strength of the rail weld zone.

Further, as techniques that improve the fatigue strength of the rail weld zone, there is a method using shot-peening treatment as described in, for example, Patent Document 7. In the shot-peening treatment, steel spheres, which have a diameter of several mm, are projected to a material to plastically deform a surface layer of the material, so that the surface layer is subjected to work hardening. Accordingly, it is possible to improve fatigue strength by converting residual stress into compressive stress.

Further, Patent Document 8 discloses a device for cooling a rail weld zone. The device includes an air chamber that cools a head-top surface of a rail weld zone, an air chamber that cools head-side surfaces of the rail weld zone, and air chambers that cool an abdomen portion (rail web portion) and a bottom portion (foot portion) of the rail weld zone. Each of the air chambers is provided with a plurality of nozzles that ejects compressed air, and a nozzle for detecting temperature is provided in the middle of a nozzle group of the air chamber that cools the head-top portion.

The rail head portion suffers from wear due to the contact between a wheel and itself. In particular, wear is facilitated on a curved track by the relative slip that occurs between a wheel and a rail. For this reason, a heat-treated rail of which a rail head portion is hardened is frequently employed for a curved section. In the welding of the heat-treated rail, it is preferable that the same hardness as the hardness of a base material to be welded be obtained by performing the accelerated cooling of the rail head portion after welding in a temperature range until the completion of pearlite transformation from an austenite temperature region. When the accelerated cooling of the rail head portion is performed after welding, the accelerated cooling of the head portion and the rail web portion of the rail weld zone is performed, so that the residual stress of the rail web portion in the vertical direction is reduced (that is, compressive residual stress is increased). Accordingly, the generation of a fatigue crack of the rail web portion is suppressed. This method is disclosed in Non-patent Document 1. However, from the experiment of the inventions, it is found that residual stress of the rail web portion is not significantly reduced even though the accelerated cooling of the head portion and the rail web portion of the rail weld zone is performed.

Further, shot-peening treatment requires large facilities that project steel spheres, collect the steel spheres, and prevent dust, and the like. For this reason, the application of the shot-peening treatment to a large weld zone is limited. In addition, since the steel spheres are abraded and damaged, the steel spheres need to be supplied at regular intervals. Accordingly, there is a problem in that running cost is required.

Furthermore, from tests performed by the inventors, it is found that the residual stress of a rail web portion is not reduced and fatigue life is not much lengthened when the accelerated cooling of a rail weld zone is performed by the cooling device disclosed in Patent Document 8. That is, it is apparent that the residual stress of the rail weld zone cannot be reduced (compressive residual stress cannot be increased) unless cooling is performed in an appropriate range of the rail weld zone at an appropriate cooling rate.

RELATED ART DOCUMENTS

Patent Documents

[Patent Document 1] Japanese Unexamined Patent Application, First Publication No. S56-136292
[Patent Document 2] Japanese Unexamined Patent Application, First Publication No. H11-270810
[Patent Document 3] Japanese Unexamined Patent Application, First Publication No. H6-292968
[Patent Document 4] Japanese Unexamined Patent Application, First Publication No. S48-95337
[Patent Document 5] Japanese Unexamined Patent Application, First Publication No. S59-93837
[Patent Document 6] Japanese Unexamined Patent Application, First Publication No. S59-93838
[Patent Document 7] Japanese Unexamined Patent Application, First Publication No. H3-249127
[Patent Document 8] Japanese Unexamined Patent Application, First Publication No. S60-33313

Non-Patent Documents

[Non-patent Document 1] Proceedings of the Second International Conference on residual stresses, ICR2, Nancy, France, 23-25, Nov., 1988, P912-918
[Non-patent Document 2] Mild, Anami, Tani, Sugimato, "Improvement of fatigue strength by modification of weld bead toes", Collection of papers of Institute of Welding, Vol. 17, No. 1, P111-119 (1999)

DISCLOSURE OF THE INVENTION

Problems to be Solved by the Invention

As described above, in the past, there has been no technique that effectively increases the fatigue strength of the rail web portion, the fatigue strength of the rail sole portion, and the hardness of the rail head portion. Accordingly, a first object of the invention is to provide a method of efficiently manufacturing a rail of which the fatigue strength of a weld zone is improved as compared to the related art.

Further, a second object of the invention is to provide a method of cooling a rail weld zone and a cooling device used in the method that can secure sufficient hardness of a rail head portion and improve the fatigue strength of a rail weld zone as compared to the related art by further reducing the residual stress of a rail web portion (that is, by increasing compressive residual stress).

Means for Solving the Problems

The invention employs the following in order to achieve the above-mentioned objects.

(1) According to a first aspect of the invention, there is provided a method of cooling a rail weld zone that includes an Ac1 region heated to a temperature not lower than a starting temperature Ac1 of transformation from pearlite to austenite and an Ac3 region heated to a temperature not lower than a completion temperature Ac3 of the transformation. The method includes a first rail web portion cooling process of cooling a rail web portion cooling region of the rail weld zone in a part of a temperature range until the completion of transformation from austenite to pearlite, a second rail web portion cooling process of cooling the rail web portion cooling region after the entire rail web portion of the rail weld zone is transformed to pearlite, a foot portion cooling process of cooling a foot portion of the rail weld zone, and a head portion cooling process of cooling a head portion of the rail weld zone. When cooling time of the first and second rail web portion cooling processes is t minute, a k value, which is obtained by dividing a width L of the rail web portion cooling region by a width LAc1 of the Ac1 region, satisfies an expression represented as $-0.1t+0.63 \leq k \leq -0.1t+2.33$.

(2) In the method according to (1), the rail web portion cooling region may be cooled at a cooling rate which exceeds a natural cooling rate and is not higher than 5° C./s, in the first rail web portion cooling process. The rail web portion cooling region may be cooled at a cooling rate which exceeds a natural cooling rate and is not lower than a cooling rate of the foot portion, in the second rail web portion cooling process.

(3) In the method according to (1), the rail web portion cooling region may be cooled at a cooling rate which exceeds a natural cooling rate and is not lower than a cooling rate of the foot portion, in the second rail web portion cooling process.

(4) In the method according to (1), the rail web portion cooling region may be cooled at a cooling rate which exceeds a natural cooling rate and is not higher than 5° C./s, in the first rail web portion cooling process.

(5) In the method according to (1), in the first rail web portion cooling process, a process of cooling an austenite temperature region may include a first former rail web portion cooling process and a first latter rail web portion cooling process of continuing to cool the rail web portion cooling region after the first former rail web portion cooling process in a temperature range until the completion of transformation to pearlite; the rail web portion cooling region may be cooled at a cooling rate which exceeds a natural cooling rate and is not lower than a cooling rate of the foot portion, in the first former rail web portion cooling process; the rail web portion cooling region may be cooled at a natural cooling rate or a cooling rate not higher than 2° C./s in the first latter rail web portion cooling process; and the rail web portion cooling region may be cooled at a cooling rate which exceeds a natural cooling rate and is not lower than a cooling rate of the foot portion, in the second rail web portion cooling process.

(6) In the method according to (1), a cooling rate of the foot portion may be a natural cooling rate.

(7) In the method according to (1), in the head portion cooling process, the head portion may be cooled at a cooling rate which exceeds a natural cooling rate and is not higher than 5° C./s, in at least a part of the temperature range until the completion of transformation to pearlite from an austenite temperature region that exceeds A3, Ae, or Acm.

(8) In the method according to any one of (1) to (7), a cooling rate of a lower corner portion of a jaw portion may be lower than a cooling rate of the rail web portion when the head portion and the rail web portion are cooled.

(9) In the method according to (8), when the height of a head-side portion, which forms a side surface of the head portion, is denoted by Hs, the entire head portion except for a region of the head portion, which is positioned below a lower position distant from an upper end of the head-side portion by a distance of 2 Hs/3, may be subjected to accelerated cooling.

(10) In the method according to (9), shield plates may be provided at the region of the head portion, which is positioned below a lower position distant from the upper end of the head-side portion by a distance of 2 Hs/3, and a cooling fluid is ejected to the head portion.

(11) According to a second aspect of the invention, there is provided a rail weld joint that is cooled by a method of cooling a rail weld zone according to (1). The rail weld joint includes the rail web portion of which residual stress in a vertical direction is 350 MPa or less, a rail sole portion of which residual stress in a longitudinal direction is compressive stress, and the rail weld zone of which 95% or more of metal structure is pearlite structure.

(12) According to a third aspect of the invention, there is provided a rail weld joint that is cooled by a method of cooling a rail weld zone according to (8). The rail weld joint includes the rail web portion of which residual stress in a circumferential direction of a cross-section of a rail is 300 MPa or less, and the head portion of which hardness is Hv 320 or more.

(13) According to a fourth aspect of the invention, there is provided a device for cooling a rail weld zone. The device may include a head portion cooling unit. The head portion cooling unit performs accelerated cooling of the entire head portion except for a region of a head portion, which is positioned below a lower position distant from an upper end of a head-side portion by a distance of 2 Hs/3, when the height of the head-side portion, which forms a side surface of the head portion of the rail weld zone, is denoted by Hs.

(14) In the device according to (13), the head portion cooling unit may include an ejection section that ejects a cooling fluid to the head portion, and shield plates that cover a region of the head portion positioned below a lower position distant from the upper end of the head-side portion by a distance of 2 Hs/3.

Effects of the Invention

According to the methods of (1) to (7), it is possible to improve the residual stress of the rail web portion of the rail weld zone, and prevent fatigue crack from easily occurring at the weld zone by controlling the residual stress of the sole portion in a compression range.

According to the methods of (8) to (10), it is possible to reduce the residual stress of the rail web portion while sufficiently securing the hardness of the rail head portion by making the cooling rates of the jaw portions be lower than the cooling rate of the rail web portion when the head portion and the rail web portion of the rail weld zone are subjected to accelerated cooling. For this reason, it is possible to improve the wear resistance of the rail head portion and the fatigue strength of the rail weld zone.

According to the rail weld joint of (11), it is possible to suppress the damage caused by metal fatigue, even when a heavy-load train passes on the rails.

According to the rail weld joint of (12), it is possible to suppress the wear of the rail head portion and the damage caused by metal fatigue, even when a heavy-load train passes on the rails.

According to the devices of (13) and (14), the head portion cooling unit performs the accelerated cooling of the entire head portion except for a region of a head portion, which is positioned below a lower position distant from an upper end of a head-side portion by a distance of 2 Hs/3. Accordingly, the cooling rate of the jaw portion is made to be low, so that it is possible to make the cooling rate of the jaw portion be lower than the cooling rate of the rail web portion. For this reason, it is possible to maintain the hardness of the rail head portion, which comes into contact with a wheel, high and to further reduce the residual stress of the rail web portion in the vertical direction.

EMBODIMENTS OF THE INVENTION

<Welding Method>

In the invention, a method of welding a rail weld zone is not limited to flash butt welding. Flash butt welding will be described in more detail below as an example of a method of welding a rail weld zone with reference to FIGS. 2A to 2C.

Figure 1A:
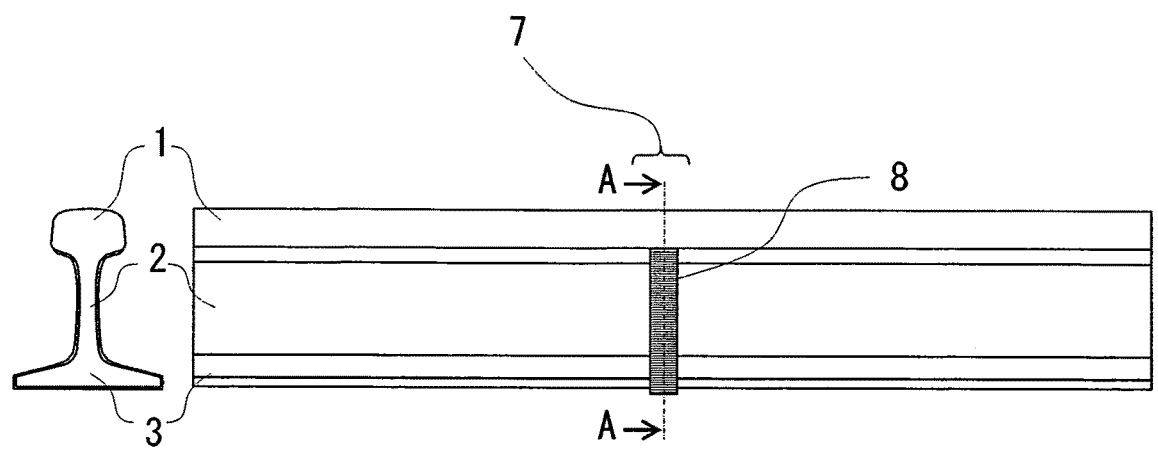
FIG. 1A is a side view of a rail.
Figure 1B:
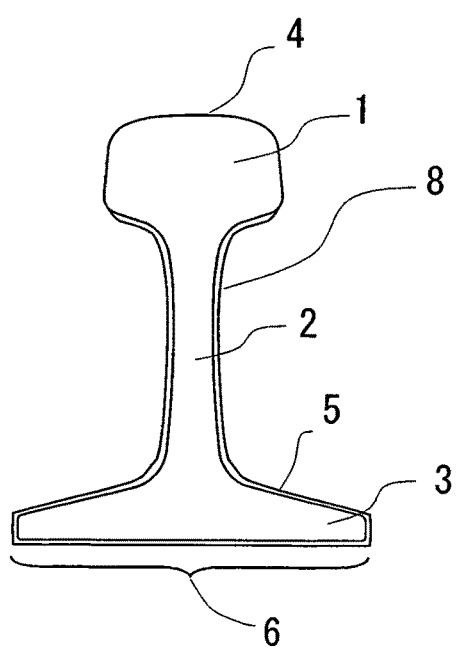
FIG. 1B is a cross-sectional view taken along a line A-A of FIG. 1A.
Figure 2A:
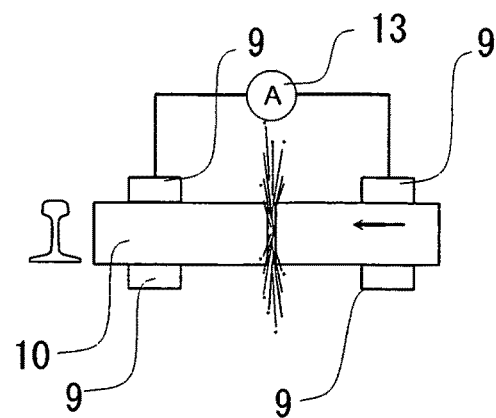
FIG. 2A is a schematic view illustrating a flashing process of flash butt welding.

A first process of a flash butt welding method is a process for continuously generating an arc between end faces shown in FIG. 2A (flashing process). In this process, the arc is generated between end faces of materials, which are to be welded, by a voltage applied through an electrode 9. Portions where the arc is generated are locally melted, a part of molten metal is discharged to the outside as spatters, and the rest of the molten metal remains on the end faces. Recesses, which are referred to as craters, are formed at the portions that are melted by the arc. As the materials to be welded gradually approach each other, an arc is successively generated at new contact portions and the materials are gradually shortened by the repetition of the local melting thereof. The moving speed of the material to be welded is adjusted so that a gap between the materials to be welded is maintained as a substantially constant gap in this process.

A process which makes end faces of materials come into contact with each other intentionally so as to raise the temperature of a base material to be welded by a large current caused by the direct application of current may be employed in the flashing process. The purpose of this process is to make the flashing process proceed more efficiently to an upset process by smoothening the temperature distribution in the vicinity of the end face. This process is referred to as a "preheating process", and generally repeats the contact application of current for about 2 to 5 seconds and a non-contact break period for about 1 second several times.

Figure 2B:
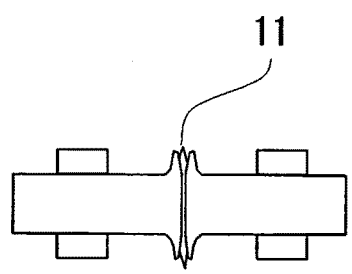
FIG. 2B is a schematic view illustrating an upset process of flash butt welding.

When the flashing process continues for several tens of seconds to several minutes, the entire end faces of the materials to be welded are melted. Further, the materials in the vicinity of the end faces are softened due to the rise of temperature. Pressing in an axial direction is performed as shown in FIG. 2B at the time point where the materials reach this state. Concave-convex surfaces of the craters, which are formed at the end faces, are crushed by this pressing that is referred to as upset. Accordingly, the molten metal, which exists between the end faces, is extruded to the outside. The cross-section of a portion in the vicinity of the softened end face increases due to plastic deformation and a weld bead 11 is formed around a weld surface.

Figure 2C:
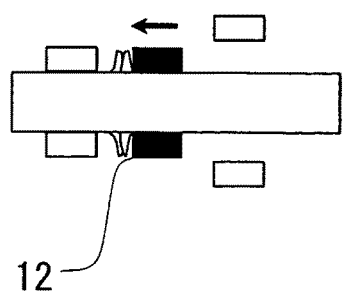
FIG. 2C is a schematic view illustrating a trimming process of flash butt welding.
Figure 3A:
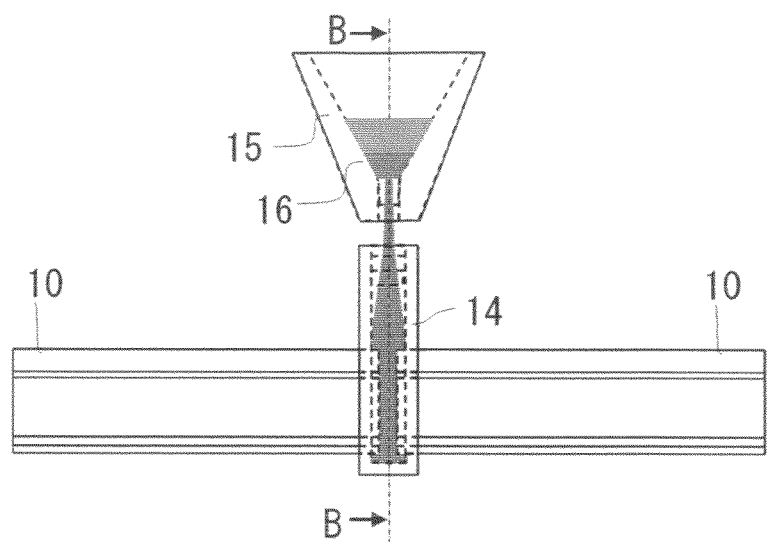
FIG. 3A is a schematic view illustrating Thermit welding.
Figure 3B:
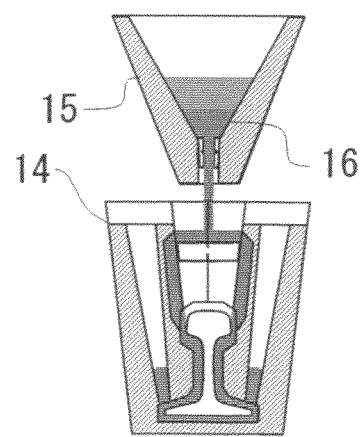
FIG. 3B is a cross-sectional view taken along a line B-B of FIG. 3A.
Figure 4A:
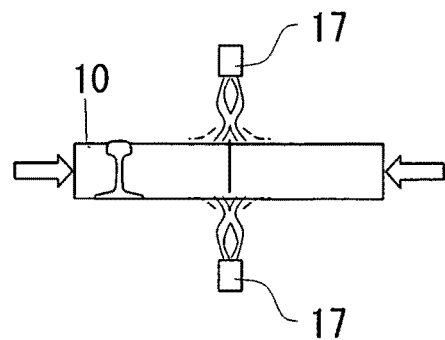
FIG. 4A is a schematic view illustrating a heating process of gas pressure welding.
Figure 4B:
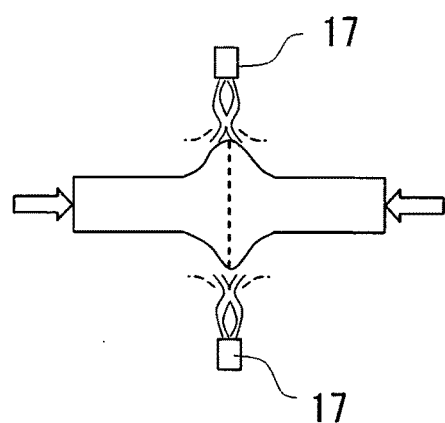
FIG. 4B is a schematic view illustrating a pressing process of gas pressure welding.
Figure 4C:
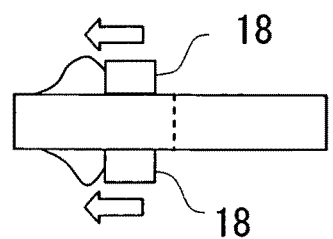
FIG. 4C is a schematic view illustrating a trimming process of gas pressure welding.
Figure 5A:
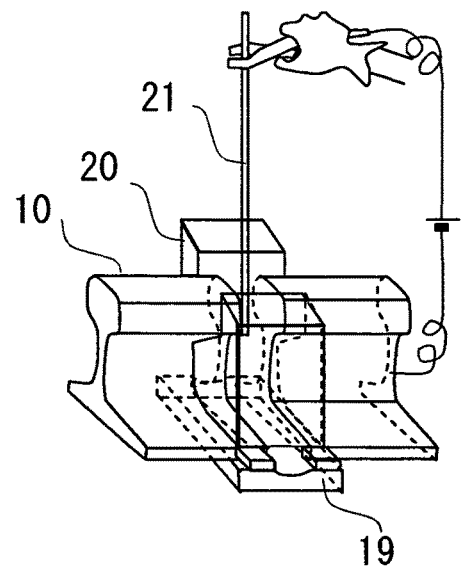
FIG. 5A is a schematic view illustrating enclosed arc welding.
Figure 5B:
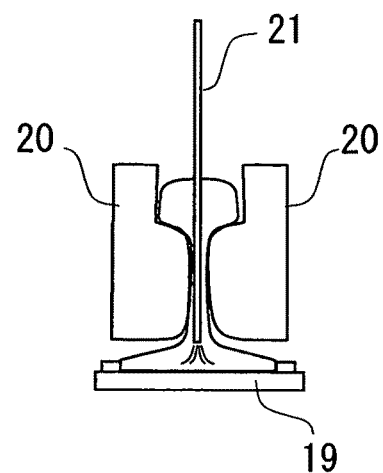
FIG. 5B is a cross-sectional view illustrating enclosed arc welding.
Figure 6A:
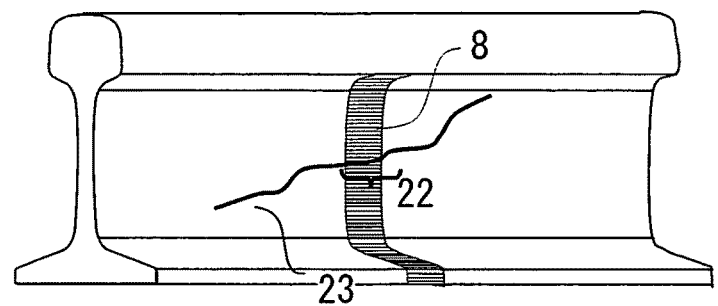
FIG. 6A is a schematic view showing fatigue damage that occurs from a rail web portion of a rail weld zone.
Figure 6B:
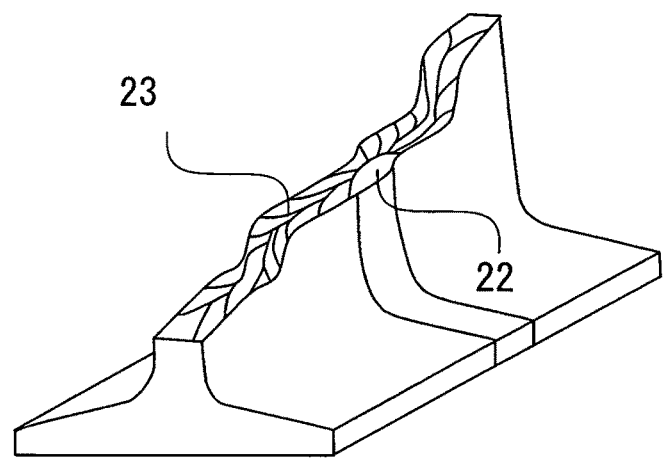
FIG. 6B is a schematic view showing a fracture surface of the damage.
Figure 7A:
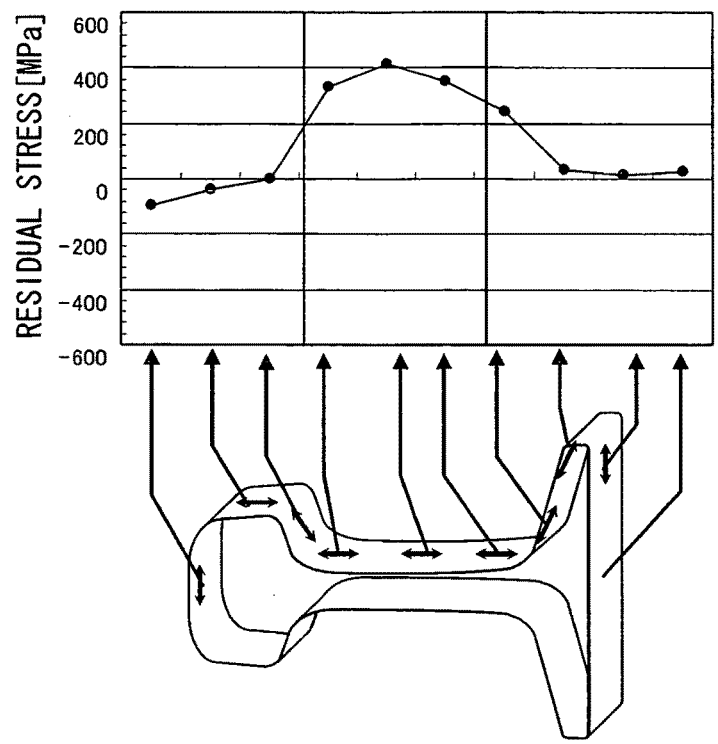
FIG. 7A is a graph showing the distribution of residual stress that exists at a peripheral portion of a rail weld zone in a circumferential direction.
Figure 7B:
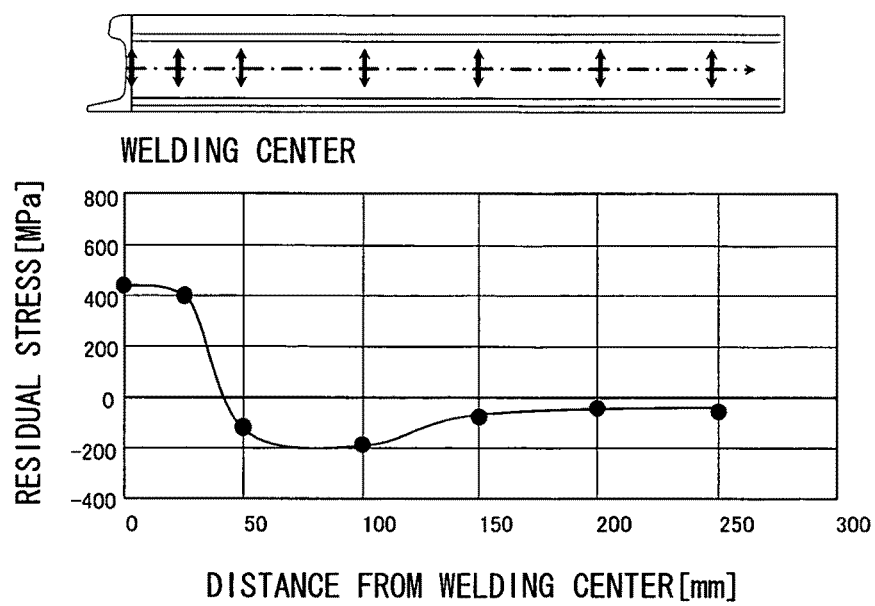
FIG. 7B is a graph showing a relationship between a distance from a welding center and residual stress that exists at a rail web portion in a vertical direction.
Figure 8:
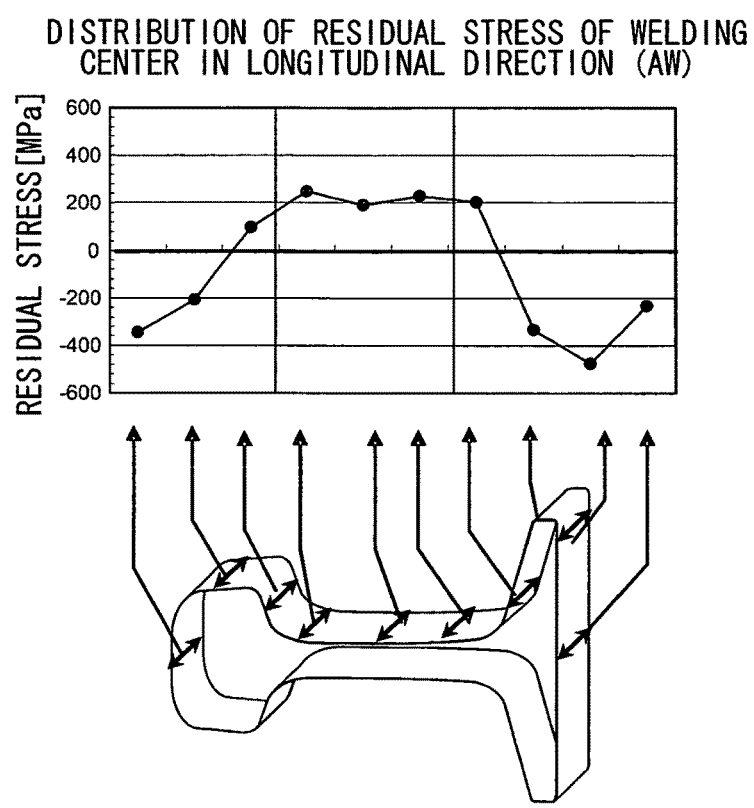
FIG. 8 is a graph showing the distribution of residual stress that exists at the peripheral portion of a rail weld zone in a longitudinal direction of a rail.
Figure 9A:
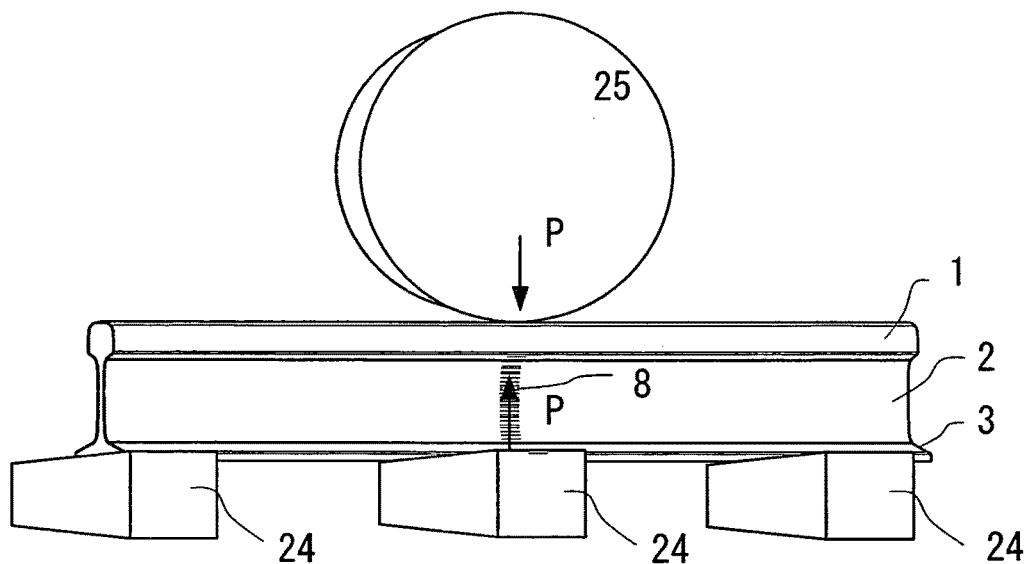
FIG. 9A is a schematic view illustrating a time point where a wheel passes just above a sleeper.
Figure 9B:
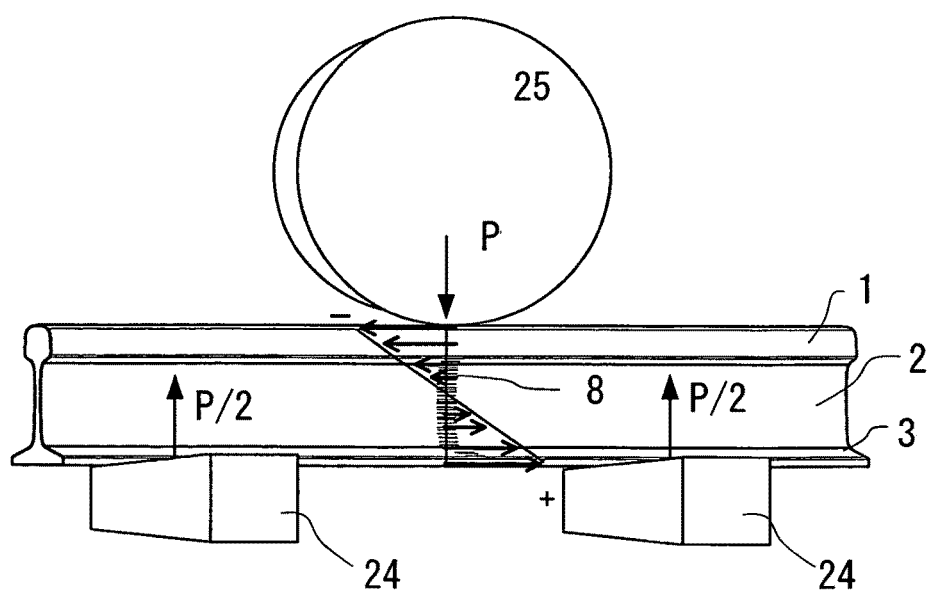
FIG. 9B is a schematic view illustrating a time point where a wheel passes between sleepers.
Figure 10A:
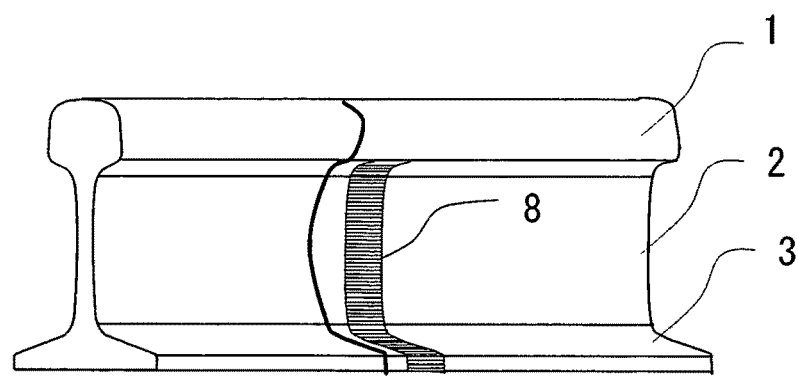
FIG. 10A is a schematic view showing fatigue damage that occurs from a foot portion of a rail weld zone.
Figure 10B:
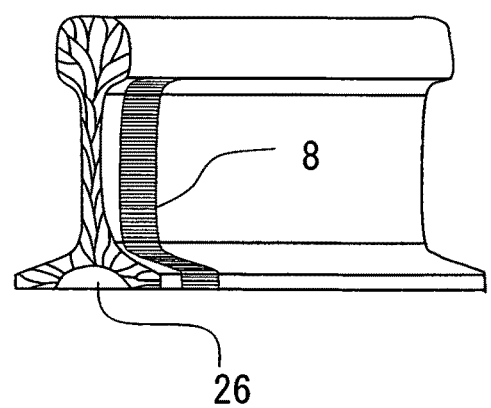
FIG. 10B is a schematic view showing a fracture surface of the damage.

The weld bead 11 is sheared and removed by trimmers 12 as shown in FIG. 2C when at a high temperature immediately after welding (trimming process). After trimming, a thin weld bead, which has a height of several millimeters and a width of about 10 to 30 mm, remains around the weld zone.

The thin weld bead, which remains after trimming, of a rail head portion coming into contact with a wheel, is polished by a grinder so as to be smoothed. The weld bead of a rail foot portion and a rail web portion is treated by treating methods, which differ from railway company to railway company, such as a method of completely smoothing the weld bead by polishing using a grinder, a method of making the weld bead thin by polishing using a grinder, and a method of not treating the weld bead.

<Material of Rail>

Next, rail steel will be described. As defined in JIS-E1101 and JIS-E1120, hypoeutectoid steel containing 0.5 to 0.8% by mass of carbon or eutectoid carbon steel containing about 0.8% by mass of carbon is generally used as rail steel. Further, rail steel, which has a hypereutectoid composition, contains carbon exceeding 0.8% by mass, and has further improved the wear resistance of a heavy load freight line of a foreign mining railway, has also become widespread in recent years.

<Equilibrium Diagram>

Figure 11:
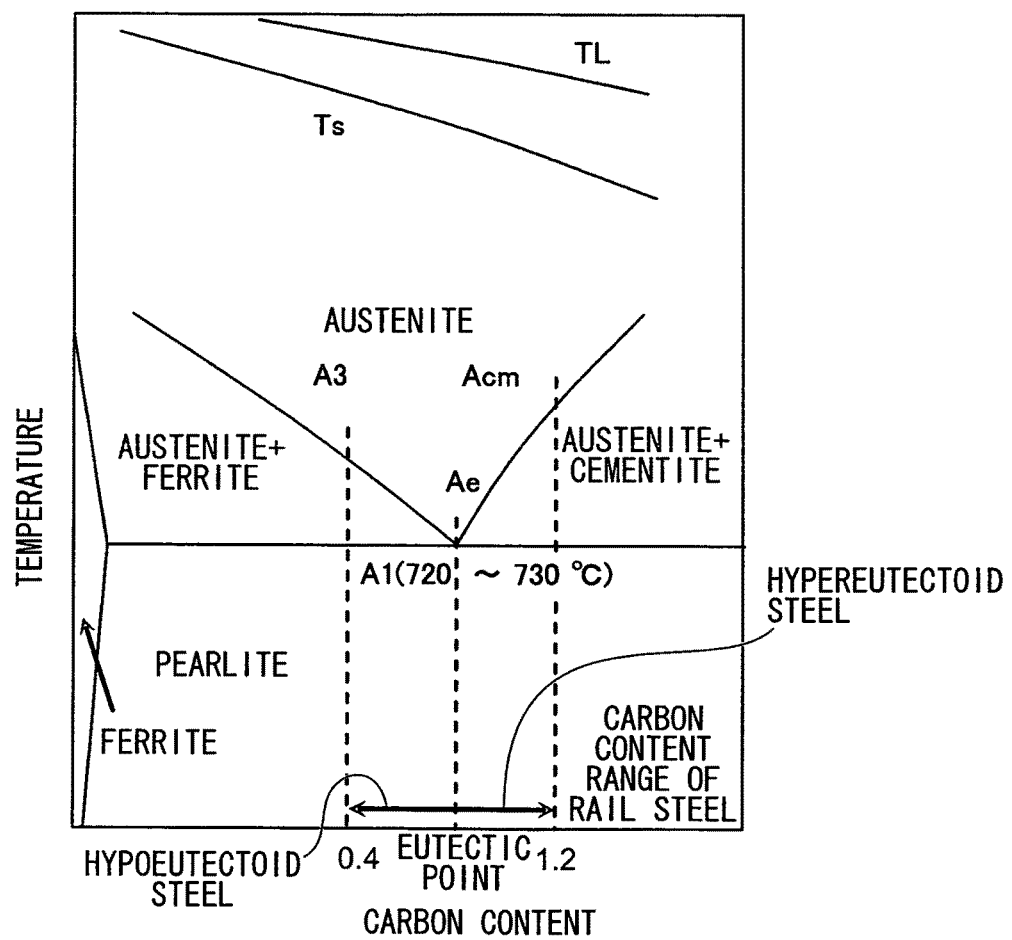
FIG. 11 is an equilibrium diagram of carbon steel.

FIG. 11 is an equilibrium diagram of carbon steel where the amount of carbon is represented by a horizontal axis. As described above, the amount of carbon in rail steel is generally in the range of 0.4 to 1.2% by mass. Rail steel contains Si or Mn other than carbon, and contains a reinforcing element such as Cr in some cases. Strictly speaking, an equilibrium diagram is changed due to the influence of these elements other than carbon. However, the change of the equilibrium diagram is slight in the range of the element (other than carbon) content of rail steel. Steel having a hypoeutectoid composition has a metal structure, which mainly contains pearlite and partially contains ferrite, at a temperature not higher than a point A1; has a metal structure where ferrite and austenite are mixed with each other, at a temperature in the range of points A1 to A3; and has an austenite structure at a temperature not lower than the point A3.

Steel having a eutectoid composition has a pearlite structure at a temperature not higher than the point A1 and has an austenite structure at a temperature not lower than a point Ae.

Steel having a hypereutectoid composition has a metal structure, which mainly contains pearlite and partially contains cementite, at a temperature not higher than the point A1; has a metal structure where ferrite and cementite are mixed with each other, at a temperature in the range of points A1 to Acm; and has an austenite structure at a temperature not lower than the point Acm.

All of the steel having the above-mentioned composition has a two-phase structure where an austenite phase and a liquid phase are mixed with each other, at a temperature not lower than a high solidus temperature Ts; and has a liquid-phase structure at a temperature not lower than a liquidus temperature TL. The temperature of a weld interface reaches point TL in the flash butt welding. Further, the temperature becomes low as a position becomes distant from the weld interface.

In a natural cooling (natural releasing cooling) process in the atmosphere after the rolling of a rail, an accelerated cooling process that is performed subsequent to rolling, or a continuous cooling process that is performed after a rail is cooled to a room temperature once and then reheated, supercooling from an equilibrium transformation temperature occurs according to the cooling rate of the rail, the content of a proeutectoid phase supposed from a state diagram is reduced, and a pearlite structure occupies the majority of a structural fraction. In particular, as for the range of 0.6 to 1.0% by mass of the amount of carbon in the vicinity of a eutectoid composition, a fraction of pearlite structure reaches substantially 100%. Meanwhile, "accelerated cooling" means to forcibly cool a material, which is to be cooled, at a cooling rate higher than a natural cooling rate by ejecting a cooling fluid to the material to be cooled.

<Welding Heat Cycle and Structural Change>

Figure 12:
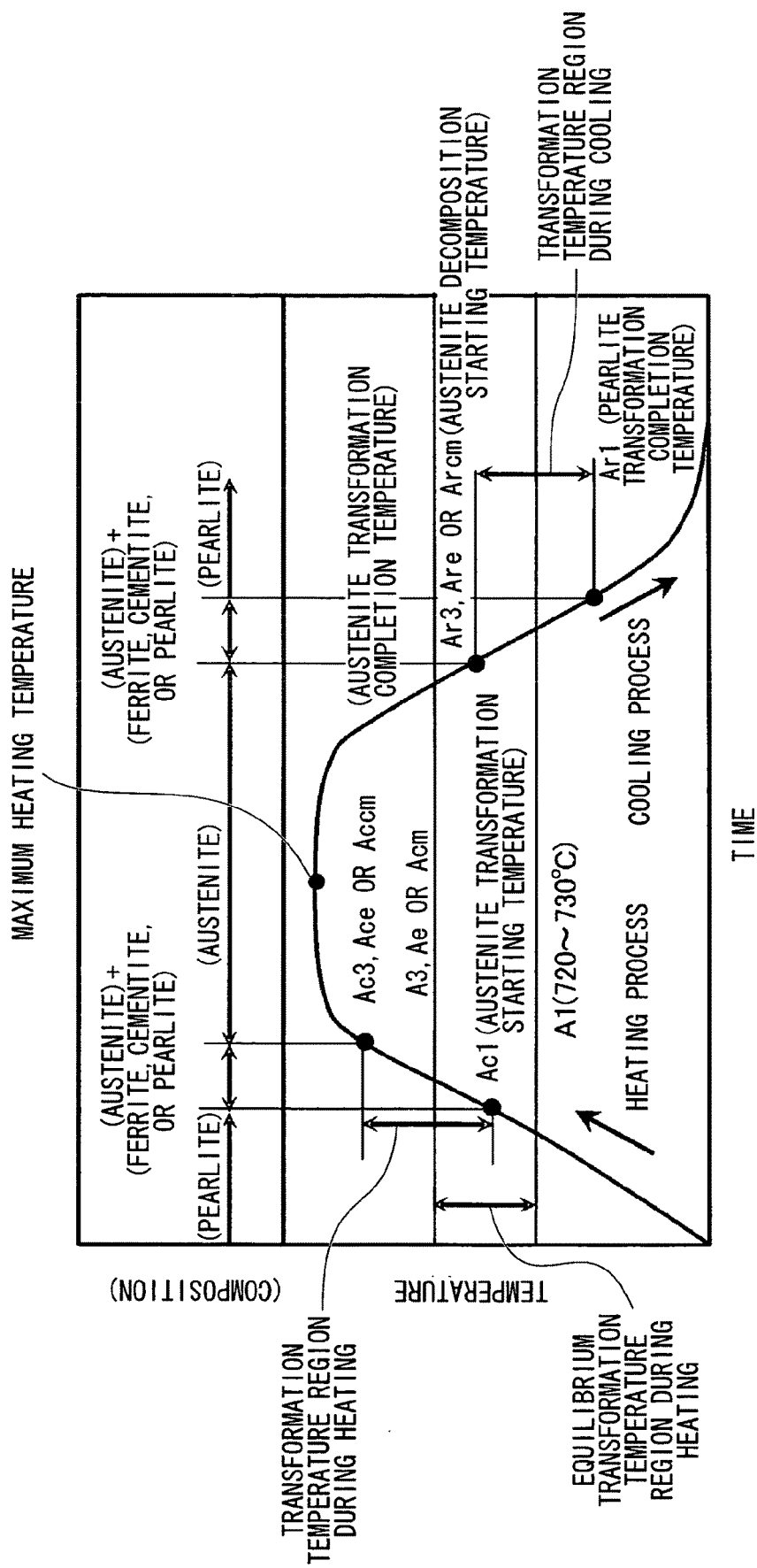
FIG. 12 is a schematic view showing structural change that is caused by the heating and cooling of carbon steel.

FIG. 12 is a schematic view showing structural change that is caused by the heating and cooling of carbon steel. As shown in FIG. 12, actual structural change in a heating process starts according to the heating rate of the heating process at a temperature higher than the equilibrium transformation temperature. Further, actual structural change in a cooling process starts according to the cooling rate of the cooling process at a temperature lower than the equilibrium transformation temperature. For this reason, a superheated state occurs in the heating process and a supercooled state occurs in the cooling process. In general, a transformation temperature in the heating process is distinguished by adding "c" to the equilibrium transformation temperature, such as A1 and A3, and a transformation temperature in the cooling process is distinguished by adding "r" to the equilibrium transformation temperature, such as A1 and A3.

That is, as for the steel having a hypoeutectoid composition, a starting point where pearlite starts to be transformed to austenite in the heating process is denoted by Ac1, a temperature where pearlite is completely transformed to austenite is denoted by Ac3, a starting point where austenite starts to be transformed to ferrite in the cooling process is denoted by Ar3, and a temperature where austenite disappears is denoted by Ar1.

Likewise, as for the steel having a hypereutectoid composition, a starting point where pearlite starts to be transformed to austenite in the heating process is denoted by Ac1, a temperature where pearlite is completely transformed to austenite is denoted by Accm, a starting point where austenite starts to be transformed to cementite in the cooling process is denoted by Arcm, and a temperature where austenite disappears is denoted by Ar1.

Further, as for the steel having eutectoid composition, a starting point where pearlite starts to be transformed to austenite in the heating process is denoted by Ac1, a temperature where pearlite is completely transformed to austenite is denoted by Ace, a starting point where austenite starts to be transformed to pearlite in the cooling process is denoted by Are, and a temperature where austenite disappears is denoted by Ar1.

Meanwhile, as shown in FIG. 11, as for the steel having a eutectoid composition, a point where a line A3 and a line Acm are connected to each other is referred to as the point Ae.

<Description of Structural Change Using Continuous Cooling Transformation Diagram (CCT Diagram)>

Figure 13A:
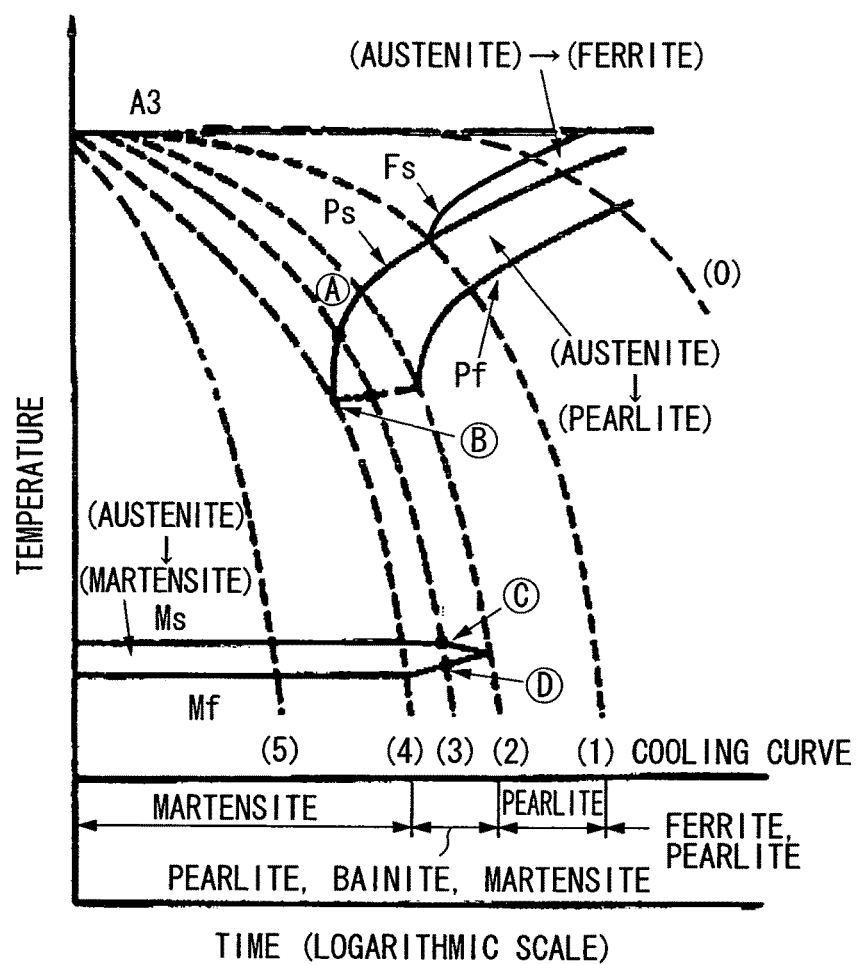
FIG. 13A is a CCT diagram of steel having hypoeutectoid composition.
Figure 13B:
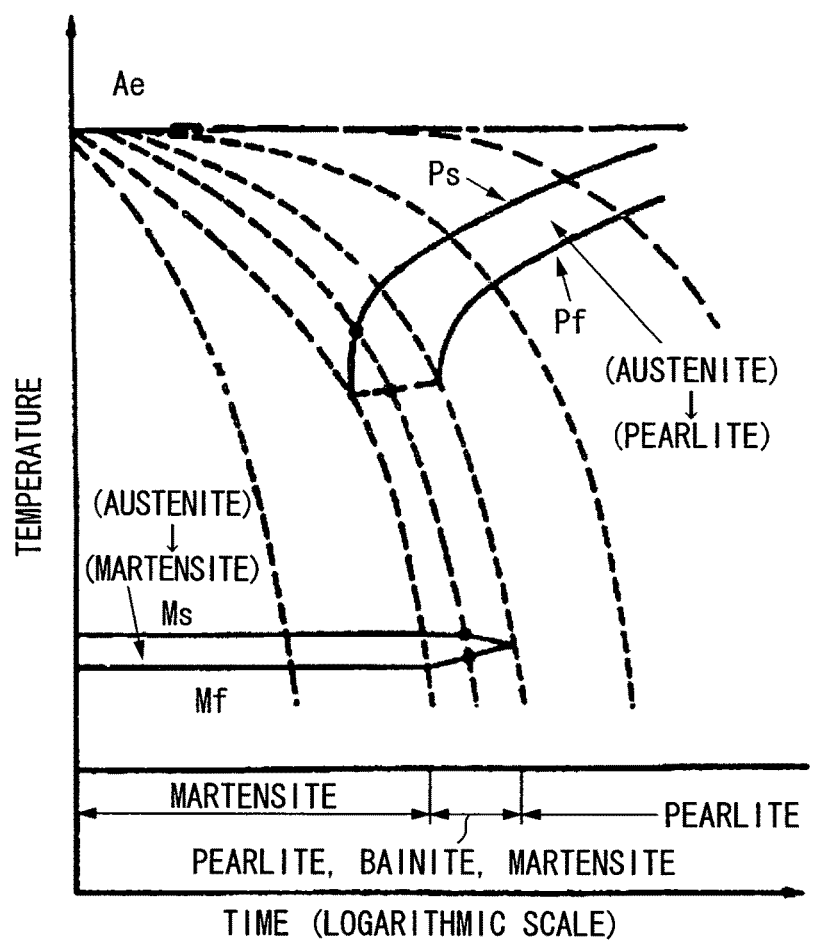
FIG. 13B is a CCT diagram of steel having eutectoid composition.
Figure 13C:
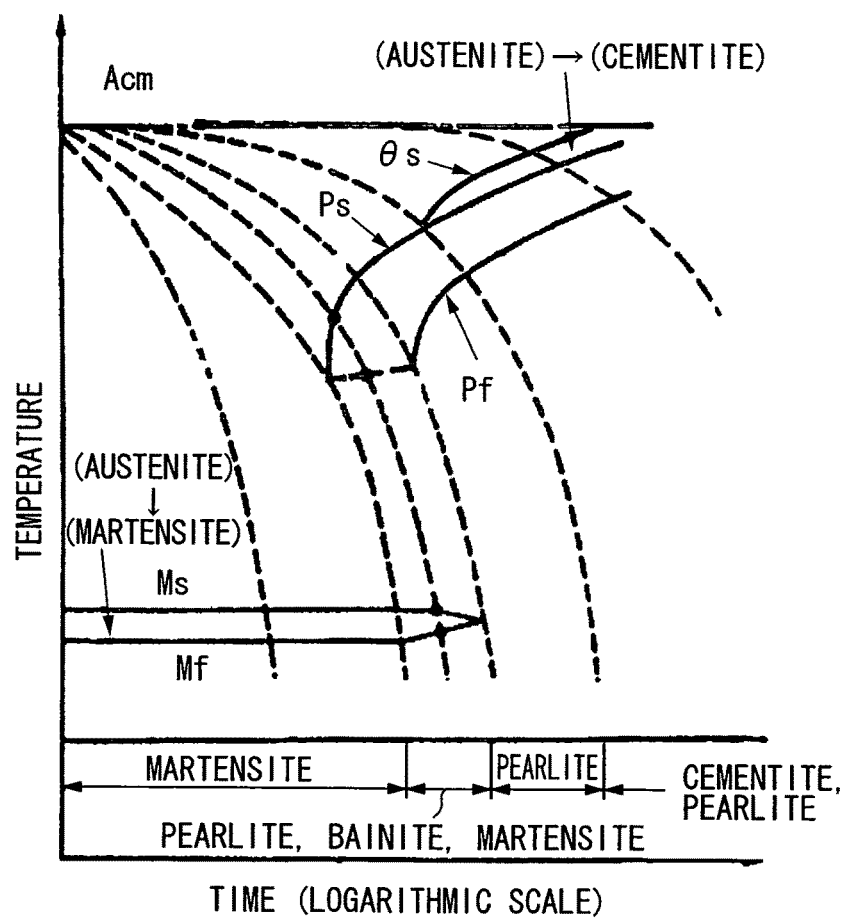
FIG. 13C is a CCT diagram of steel having hypereutectoid composition.

In general, as for phase change in the cooling process, a transformation temperature and a precipitated phase vary according to components of steel and a cooling rate. FIGS. 13A to FIG. 13C are CCT diagrams showing the structural change of high-carbon steel that is caused by continuous cooling.

FIG. 13A is a CCT diagram of hypoeutectoid steel. When slow cooling shown by a curve (0) is performed, proeutectoid ferrite is precipitated at a temperature corresponding to the intersection between a line Fs and the curve (0). After that, pearlite transformation starts at a temperature corresponding to an intersection between a line Ps and the curve (0). Further, pearlite transformation is completed at a temperature corresponding to an intersection between a line Pf and the curve (0). In this case, a metal structure becomes a ferrite-pearlite structure that contains a small amount of grain boundary ferrite. When a cooling rate increases and cooling shown by a curve (1) is performed, the line Fs joins the line Ps and disappears. Accordingly, proeutectoid ferrite is not precipitated, but pearlite transformation occurs between the line Ps and the line Pf. In this case, a metal structure becomes a pearlite structure. When a cooling rate further increases and cooling shown by a curve (3) is performed, pearlite transformation stops at a temperature B and a bainite structure partially appears. However, a non-transformed portion is supercooled while being austenite. Further, martensite transformation occurs between a temperature C and a temperature D. In this case, a metal structure becomes a structure where pearlite, bainite, and martensite are mixed. When a cooling rate further increases and cooling shown by a curve (5) is performed, the curve (5) does not intersect with the line Ps and austenite structure is supercooled to a point Ms. Then, martensite transformation occurs. Since the martensite structure of high-carbon steel is very hard and brittle, it is preferable that fast cooling exceeding the cooling curve (2) be avoided in the welding of rail steel.

FIG. 13B is a CCT diagram of eutectoid steel. In the case of eutectoid steel, proeutectoid ferrite is not precipitated during slow cooling unlike in the case of hypoeutectoid steel.

FIG. 13C is a CCT diagram of hypereutectoid steel. In the case of hypereutectoid steel, proeutectoid cementite is precipitated during slow cooling unlike in the case of hypoeutectoid steel where proeutectoid ferrite is precipitated during slow cooling. In FIG. 13C, a line θs is a proeutectoid line of cementite. When slow cooling where a cooling curve intersects with the line θs is performed, a metal structure becomes a cementite-pearlite structure that contains a small amount of proeutectoid cementite.

<Maximum Temperature, Structure, and Hardness in Regard to Hardness Distribution>

Figure 14:
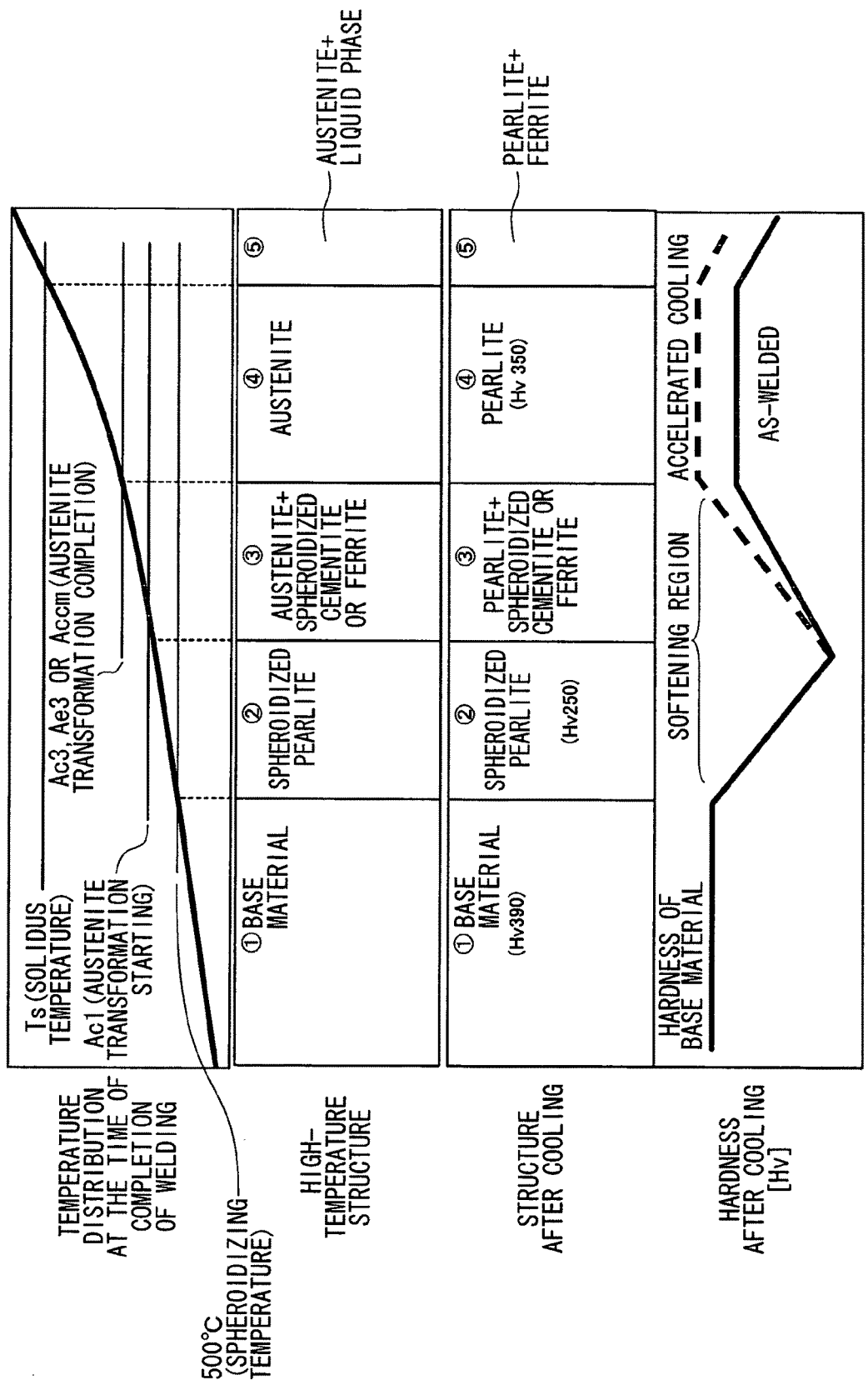
FIG. 14 is a graph showing a rail temperature distribution and a rail hardness distribution in an axial direction of a rail.

FIG. 14 schematically shows temperature distribution in an axial direction of a rail when the welding of the rail is completed, a metal structure (high-temperature structure) when the welding of the rail is completed, a metal structure after cooling, and hardness after cooling. The left end of FIG. 14 represents a base material of a rail that is not affected by heat, and the right end of FIG. 14 represents a welding center.

Due to the flashing process, the temperature of the welding center (the right end of FIG. 14) exceeds the solidus temperature Ts and a decarburized portion is formed at the welding center of the rail. The decarburized portion remains thin even after the upset process. Since proeutectoid ferrite is apt to be formed at this portion during cooling as compared to peripheral portions, the hardness of this portion after cooling is low.

A first region in the vicinity of the welding center which is transformed to a complete austenite phase by being heated above Ac3, Ace, or Accm is completely transformed to pearlite during subsequent cooling, and uniform hardness is obtained from the first region after cooling. On the outside of the first region, there is a second region that is not lower than Ac1 but does not exceed Ac3, Ace, or Accm. An austenite phase, and a non-transformed ferrite phase or a cementite phase exist together with each other in this second region at the time of heating. A portion which has been transformed to austenite is transformed to pearlite in subsequent cooling. However, a non-transformed ferrite phase or cementite which is not melted and is spheroidized remains up to room temperature as it is. The hardness of these kinds of structure is lower than that of normal pearlite that is transformed from an austenite phase. Since the fraction of this non-transformed phase increases with distance from the welding center, the hardness of the second region is reduced.

At a position that is further distant from the welding center, there is a region that does not reach Ac1. Even in this region, the hardness of a third region heated to a temperature of 500° C. or more is reduced since cementite in pearlite is spheroidized. The degree of spheroidizing is reduced with distance from the welding center, so that hardness gradually approaches the hardness of a base material.

Further, as for a macrostructure of a vertical longitudinal cross-section of a weld zone, a spheroidizing region, which is in the range of 500° C. to Ac1, is not changed from cross-section that of a base material. However, in a region where the temperature is not lower than Ac1 and not higher than Ac3, Ace, or Accm, an austenite phase, a ferrite phase, and a cementite phase exist together with one another, fine grains are attained. Accordingly, it is possible to definitely discriminate the difference between the spheroidizing region and the region by using acetic alcohol or the like. The grain of the first region which is heated to a temperature not lower than Ac3, Ace, or Accm tends to become coarse due to high-temperature heating, but the first region has the structure close to a base material to the naked eye. Meanwhile, in the third region that is in the range of 500° C. to Ac1, it is possible to confirm spheroidized cementite by a scanning electron microscope (SEM).

A distance, where a material to be welded is heated to a temperature of Ac1 or more in the welding of a rail, differs somewhat depending on welding methods, welding conditions, and portions of the rail. As a result of the observation of the hardness distribution and macrostructure of the vertical longitudinal cross-section of the welded rail, the distance at the rail web portion in the flash butt welding was in the range of 10 to 50 mm according to welding conditions. Further, likewise, a distance, where a material to be welded is heated to a temperature of Ac3, Ae3, or Accm or more, was in the range of 5 to 40 mm.

<Mechanism for Generating Residual Stress>

Next, the ideas of the inventors about a mechanism for generating a very large residual stress for the rail web portion in the vertical direction during the welding of a rail will be described.

Figure 15A:
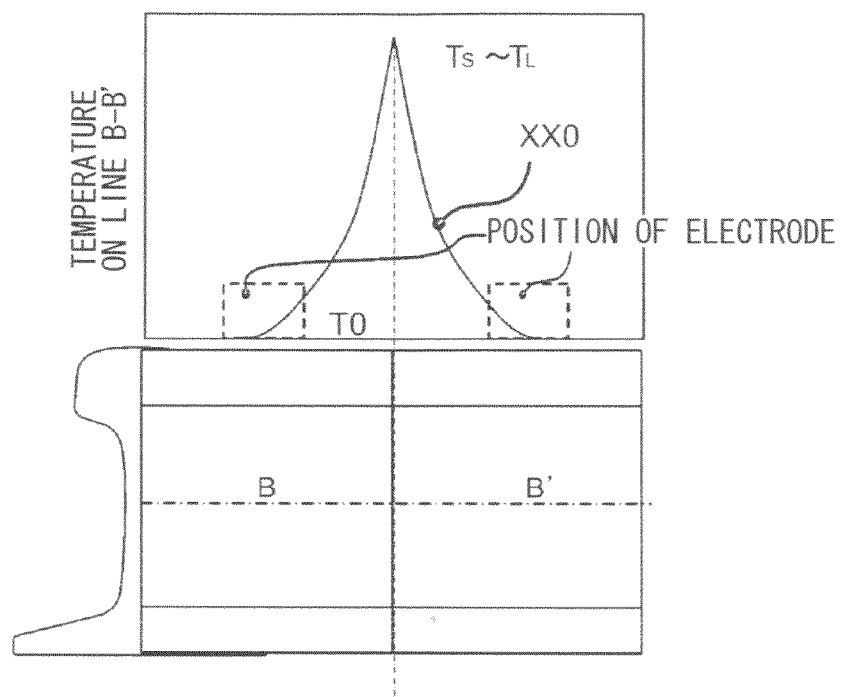
FIG. 15A is a view showing the temperature distribution of a rail web portion of a weld zone immediately after welding.

Flashing is generated between end faces of a rail in the flash butt welding, so that the temperature of the end face reaches a melting point in the range of 1300 to 1400° C. or higher. Meanwhile, electrodes 9 (see FIG. 2A), which are used to supply power, are water-cooled so that the wear damage of the electrodes caused by erosion or the like is suppressed. For this reason, rails are cooled by the water-cooled electrodes 9, so that the temperature of the rail in the vicinity of the electrode 9 is about 300° C. even at the time of the completion of welding. A mounting position of the electrode 9 on the rail is generally away from a welding end face by about 100 mm. Accordingly, at the time of the completion of welding, a temperature difference of about 1000° C. is generated between the electrode 9 and the end face between which the distance is about 100 mm. FIGS. 15A to 15D show temperature distribution at the rail web portion of the rail weld zone. A curve XX0 of FIG. 15A shows a temperature distribution immediately after welding. From FIG. 15A, it is found that a steep temperature gradient is generated at the rail.

Meanwhile, since the end face of the rail is melted and welded by the pouring of high-temperature molten steel in a Thermit welding method, a large temperature distribution temporarily occurs in the longitudinal direction of the rail by the pouring of molten steel.

In gas pressure welding, the vicinity of end faces of rails which come into press contact with each other is heated, so that the vicinity of the end face is heated to a temperature of about 1000° C. Accordingly, temperature distribution occurs in the longitudinal direction of the rail as in the above-mentioned welding method.

In enclosed arc welding, weld metal is sequentially formed from the bottom of a rail by devoting a working time of 1 hour or more to manual welding. Temperature distribution occurs in the longitudinal direction of the rail as in the above-mentioned welding method. However, the enclosed arc welding is slightly different from other welding methods in that temperature distribution occurs even in a vertical direction. It can hardly be said that a controlled cooling method according to the invention is necessarily effective in this welding method.

The generation of residual stress at a rail web portion in a vertical direction (circumferential direction) is most significant in the flash butt welding where a temperature gradient is steepest. Further, a temperature distribution becomes gentle, that is, residual stress is reduced in the Thermit welding and the gas pressure welding in this order. The invention is effective in all these welding methods.

When non-uniform thermal shrinkage stress based on the non-uniform temperature in a structure exists, shrinkage stress remains as internal stress so that components of the structure constrain shrinkage strain. As a result, residual stress is generated. Since the structure has a low yield point and is apt to be plastically deformed when the temperature of the structure is high, a constraining force is not generated between the components and residual stress is low. Since it is known that a yield point rises as a temperature falls, the generation of residual stress is significant at low temperature.

Meanwhile, when transformation occurs from an austenite phase in a cooling process, a crystal lattice is apt to be changed in a direction where stress is smaller. As a result, large strain is generated in the direction, so that stress is reduced. For this reason, it is considered that stress is released at a transformation point once. Considering the state where temperature has reached room temperature, there may also be a case where a stress distribution at a temperature higher than a transformation point is negligible. However, since continuing before and after transformation and affecting the subsequent generation of residual stress, temperature distribution itself is important.

Figure 15B:
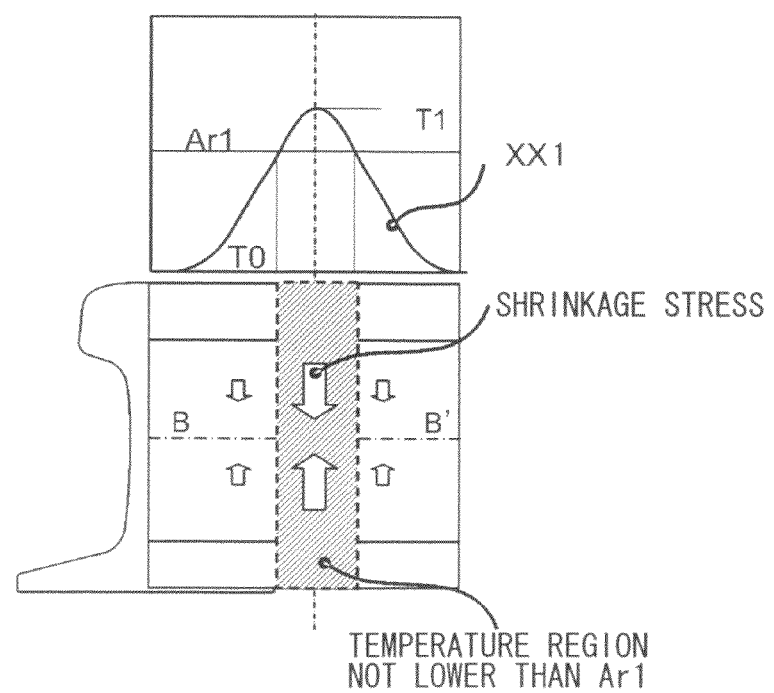
FIG. 15B is a view showing temperature distribution and shrinkage stress of a rail web portion of a weld zone at a certain time point of a cooling process.

FIG. 15B shows the temperature distribution and shrinkage stress of a rail web portion of a weld zone at a certain time point of a cooling process. A solid line XX1 shows a temperature distribution at the time point. Shrinkage stress is generated at the weld zone due to the difference between the temperature T1 of the center of the weld zone and the temperature of a surrounding portion. Since stress is released in a transformation temperature region once, it is considered that stress is low in the transformation temperature region and residual stress is generated in earnest after T1 falls to the transformation completion temperature Ar1.

Figure 15C:
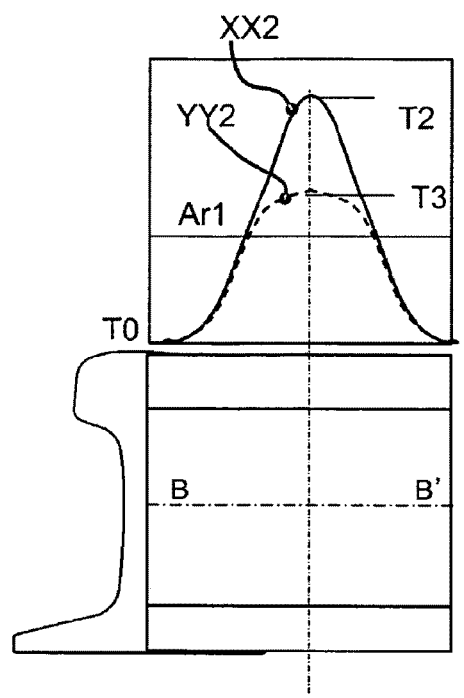
FIG. 15C is a view showing the temperature distribution of a rail web portion of a weld zone at certain time points of a natural cooling process and an accelerated cooling process.

FIG. 15C shows the temperature distribution of a rail web portion of a weld zone at certain time points of a natural cooling process and an accelerated cooling process. A curve YY2 shown by a broken line is a temperature distribution curve when a high-temperature region in the vicinity of the center of the weld zone is subjected to accelerated cooling. A curve XX2 shown by a solid line shows a temperature distribution when a high-temperature region in the vicinity of the center of the weld zone is subjected to natural cooling.

Figure 15D:
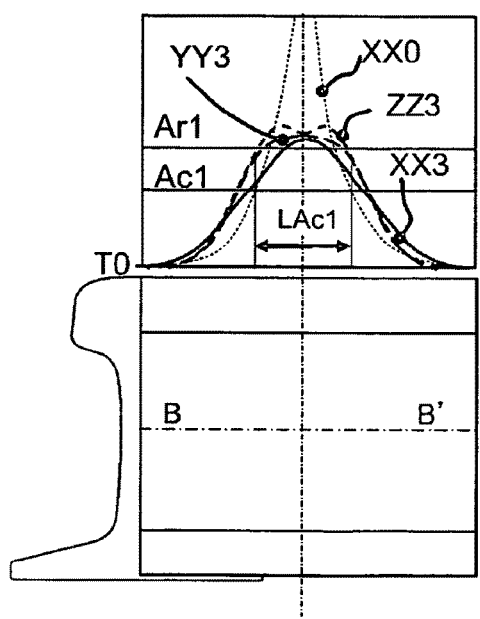
FIG. 15D is a view showing the temperature distribution of a rail web portion of a weld zone at time points, where the temperature of a welding center is slightly higher than Ar1, in a natural cooling process and an accelerated cooling process.

FIG. 15D is a view showing a temperature distribution at time points, where the temperature of a welding center is slightly higher than Ar1, in a natural cooling process and an accelerated cooling process. A curve XX3 shown by a solid line shows a temperature distribution in the case of natural cooling. A curve YY3 shown by a broken line shows a temperature distribution when a wide range in the vicinity of the center of the weld zone is subjected to accelerated cooling, and a curve ZZ3 shown by a broken line shows a temperature distribution when a narrow range in the vicinity of the center of the weld zone is subjected to accelerated cooling. A time taken to reach this temperature is shorter when the welding center is subjected to accelerated cooling. Here, the difference in temperature distribution, in a certain region in the vicinity of the welding center, for example, in a range (LAc1) where the maximum heating temperature is not lower than Ac1 in the temperature distribution XX0 immediately after welding, and the difference in residual stress based on the difference in temperature distribution will be described below. When the welding center is subjected to accelerated cooling, the difference between the maximum temperature and the minimum temperature in the range LAc1 is small as compared to the case of natural cooling. As a result, the generation of residual stress, which is based on the difference in temperature in this range, is suppressed. Further, even when being extensively considered, the restriction of shrinkage, which is performed by the low-temperature portion away from the weld zone, is dispersed in the wide range of the weld zone. Accordingly, the generation of residual stress is suppressed. In this way, an effect of reducing residual stress is obtained through the reduction of the difference between the maximum temperature and the minimum temperature in a certain range of the weld zone at the time point when a predetermined time has passed after welding. If a temperature distribution is changed by the change of a cooling width, a concave temperature distribution where the temperature of a middle portion is low as in the curve ZZ3 in FIG. 15D is formed in some cases. However, if the difference between the maximum temperature and the minimum temperature in the region is reduced, the same effect is obtained.

According to the experiments of the inventors, if the difference between the maximum temperature and the minimum temperature in a region where the maximum heating temperature of a weld zone exceeds Ac1 at the time point when a predetermined time has passed after welding is not higher than 50° C., an effect of reducing the residual stress of the rail web portion is recognized.

Temperature distribution is affected by cooling time and a cooling rate. Since rail steel has high-carbon composition, the hardenability of the rail steel is high. When accelerated cooling is performed from an austenite region, a transformation pattern needs to be considered. If a cooling rate is excessively high, a cooling curve does not pass through a transformation region shown in FIGS. 13A to 13C where austenite is transformed to pearlite, and passes through a supercooling austenite region, which corresponds to a short time end region from the supercooling austenite region. For this reason, a martensite structure, which is hard and brittle, is generated, so that the weld zone is embrittled. Accordingly, in the invention, a cooling rate is defined up to 5° C./s in order to prevent the embrittlement of rail steel. According to the experiments of the inventors, cooling time and a cooling width are the main factors related with residual stress in the range of a cooling rate where martensite is not generated. The appropriate ranges of cooling time and a cooling width will be described below.

It is considered that an effect which reduces residual stress by performing the accelerated cooling in the vicinity of the welding center so as to flatten the temperature distribution is largest when the flattened temperature distribution is obtained in the vicinity of Ar1. However, the effect is obtained even at a temperature not lower than Ar1 or a temperature not higher than Ar1. Meanwhile, since residual stress is already generated even though a flat temperature distribution is obtained while the central temperature of the weld zone is lower than 200° C., the effect is small.

<Cooling Width of Weld Zone>

Figure 16A:
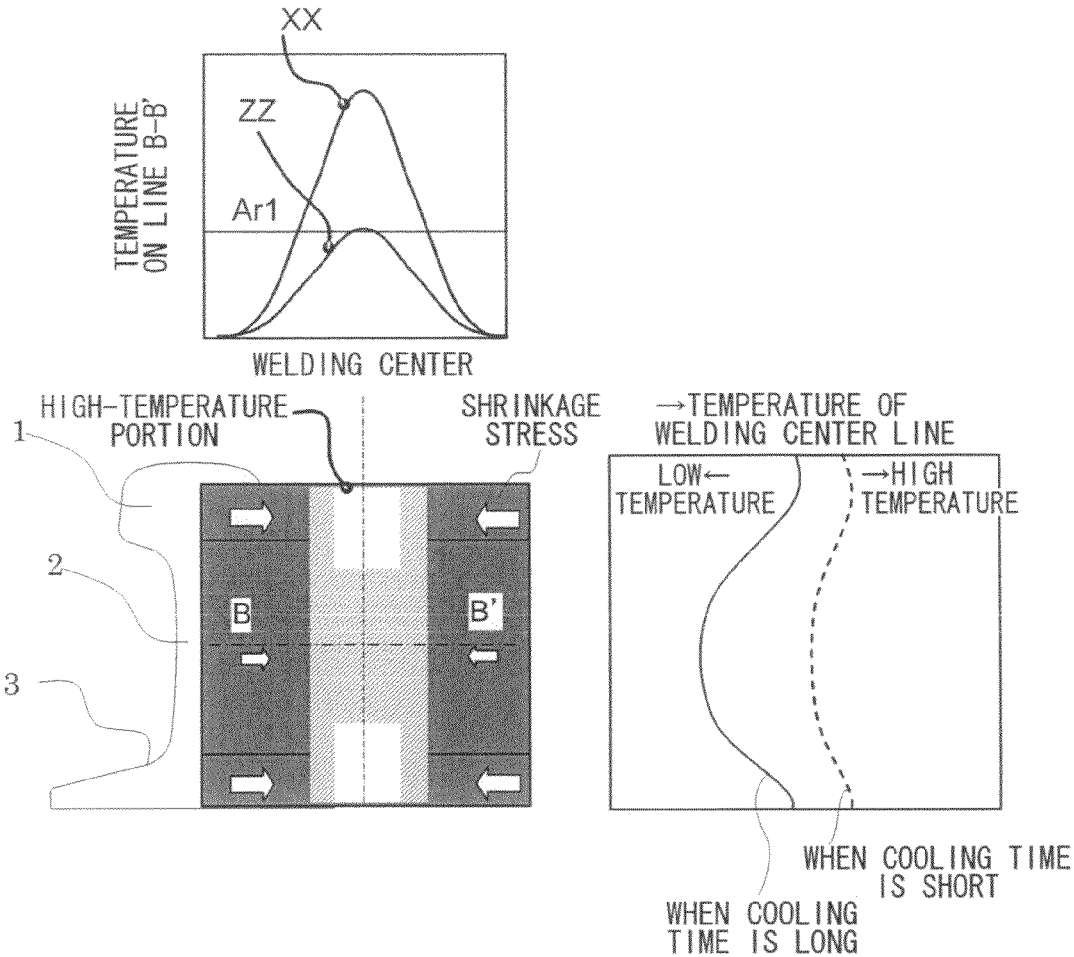
FIG. 16A is a schematic view showing temperature distribution when a rail web portion is extensively cooled.

FIG. 16A schematically shows temperature distributions of the rail head portion, the rail web portion, and the rail foot portion of the weld zone when the rail web portion is extensively cooled. In the temperature distribution of the middle portion of the rail web portion on a longitudinal direction B-B', a temperature falls as a whole. Accordingly, an action which reduces stress by flattening the temperature distribution of the middle portion cannot be expected. Meanwhile, in the temperature distribution map of the welding center, the temperature of the rail web portion falls relative to the temperature of the head portion and the foot portion as cooling time increases. As a result, the shrinkage stress of the head portion and the foot portion in the longitudinal direction is restricted by the rail web portion that has been cooled first, so that tensile stress is generated particularly at a sole portion in the longitudinal direction. Since there is a concern that changing the residual stress of the sole portion in the longitudinal direction into tensile stress may cause bending fatigue strength to be reduced, this is not preferable. However, since the rail web portion is compressed in the longitudinal direction and residual stress in the vertical direction (circumferential direction) is also reduced, fatigue strength is improved only for the rail web portion. In this way, the influence of a cooling width changes even depending on cooling time. The appropriate condition thereof will be described below.

<Sole Cooling>

Figure 16B:
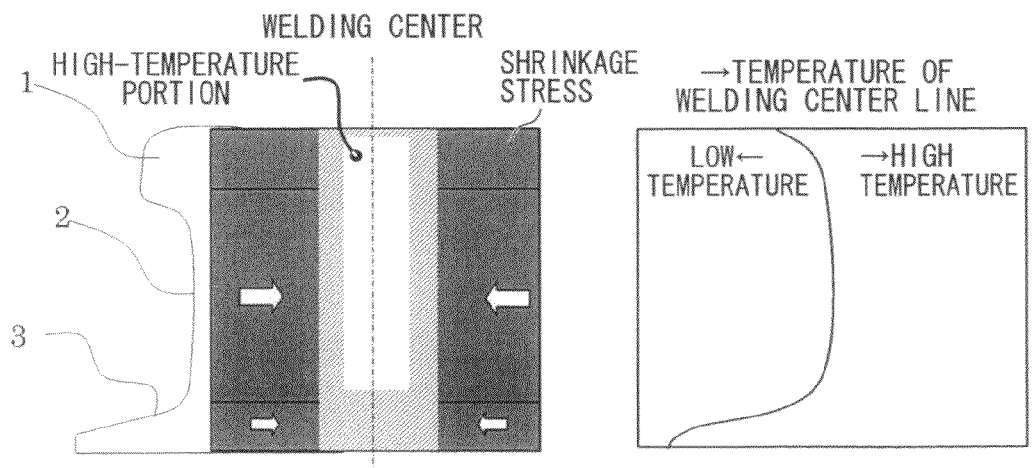
FIG. 16B is a schematic view showing temperature distribution when a foot portion is excessively cooled.

FIG. 16B is a schematic view showing temperature distribution when a rail sole portion is excessively cooled. When the temperature of the foot portion falls relative to the temperature of the rail web portion due to accelerated cooling, shrinkage stress of the rail web portion in the longitudinal direction is restricted by the foot portion of which the temperature has further fallen. Due to this action, tensile stress is generated at the rail web portion in the longitudinal direction and tensile stress corresponding to a Poisson's ratio is generated even in the vertical direction (circumferential direction), so that stress of the rail web portion in the vertical direction (circumferential direction) is changed to the tensile side. For this reason, when the rail foot portion is subjected to accelerated cooling for the purpose of increasing strength, it is preferable that the temperature of the rail foot portion be maintained higher than that of the rail web portion.

<Cooling Device>

As long as a device for cooling a rail weld zone can appropriately cool portions of a rail that are objects to be cooled, the type of the device is not limited. Cooling capacity varies depending on cooling media, but the kind of a cooling medium is not particularly limited as long as a cooling rate defined in the invention is obtained. However, it is necessary that a cooling rate can be adjusted for each portion of a rail. For example, when air is used as a cooling medium, it is necessary that a cooling rate can be adjusted by the adjustment of the amount of ejected air, a distance between an ejection nozzle and the surface of the rail, and the like. The details of the cooling device will be described below.

<Cooling Method (Method of Cooling Head Portion of Heat-Treated Rail Having High Strength)>

Meanwhile, wear occurs at a rail head portion due to the contact between a wheel and the rail head portion. In particular, wear is facilitated on a curved track by the relative slip that occurs between a wheel and a rail. Further, as the weight of a train increases, this tendency becomes strong. For this reason, a heat-treated rail of which a rail head portion is hardened is often employed in a curved section in order to reduce the replacement frequency of a rail.

A heat-treated rail having high hardness is manufactured by making a transformation temperature fall by accelerated cooling from a high-temperature austenite state that is performed in a process for manufacturing a rail. When a heat-treated rail is to be welded, the hardness of an austenitizing region in the vicinity of a welding center is determined according to a cooling rate after welding. For this reason, the hardness of a weld zone is different from the hardness of a portion of the heat-treated rail that is not affected by welding heat.

Since a cooling rate in a pearlite transformation temperature region when natural cooling is performed after welding is performed by flash butt welding is generally 1° C./s or less, the hardness of the weld zone is often made lower than the hardness of the heat-treated rail. For this reason, it is preferable that a rail head portion be subjected to accelerated cooling after welding in a temperature range between an austenite region and the completion of pearlite transformation and the same hardness as the hardness of a base material be obtained in the welding of the heat-treated rail. Since a cooling rate is yet lower in other welding methods other than the flash butt welding, the hardness of a weld zone is further decreased. In order to obtain the hardness of a weld zone which is the same as the hardness of a base material in the welding of a heat-treated rail, it is preferable that the rail head portion be subjected to accelerated cooling after welding in a temperature range between an austenite decomposition starting temperature and the completion of pearlite transformation.

However, even though being subjected to accelerated cooling, a spheroidized cementite region or a ferrite single phase region of a portion which is heated to a temperature region of 500° C. to Ac3, Ace, or Accm by welding is not hardened. Accordingly, a portion of which the hardness can be adjusted by accelerated cooling is a region in the vicinity of a welding center that is heated up to an austenite single phase region.

<Cooling Temperature Region>

A cooling temperature region will be described below with reference to FIGS. 17 to 21.

Figure 17:
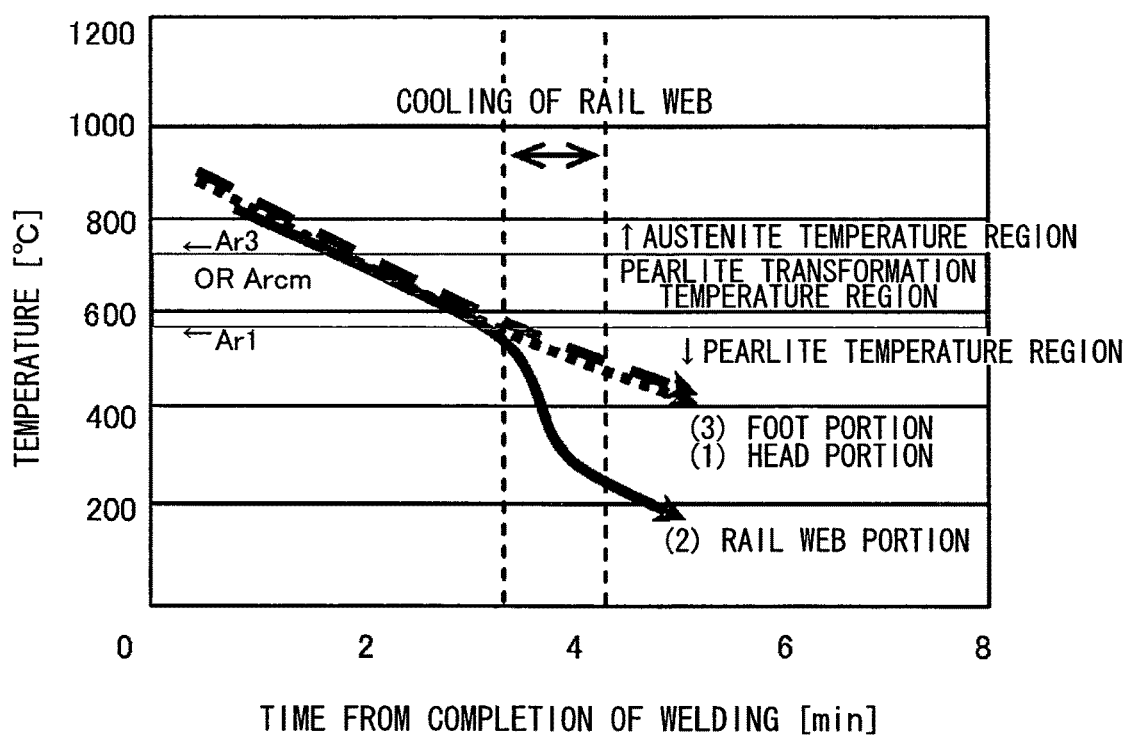
FIG. 17 is a schematic view showing temperature history when a rail web portion is subjected to accelerated cooling after the completion of pearlite transformation. (First Cooling Pattern)

FIG. 17 shows a first cooling pattern that performs the accelerated cooling of a rail web portion after completing the pearlite transformation of the rail web portion.

It is preferable that the starting temperature of the cooling of the rail web portion be high. However, if the rail web portion is cooled at a high cooling rate from a high-temperature state where pearlite transformation is not completed, there is a risk that a martensite structure will be generated, and thus, not desirable.

It is necessary that the cooling rate of the rail web portion is not lower than a natural cooling rate. As a cooling rate becomes high, it is easy to flatten the temperature distribution of the welding center and an effect of reducing residual stress becomes large.

Further, when the cooling rate of the foot portion exceeds the cooling rate of the rail web portion, shrinkage stress is generated afterward at the rail web portion. As a result, since the shrinkage of the rail web portion is restricted by the foot portion, tensile residual stress in the longitudinal direction increases. As a result, since tensile stress corresponding to a Poisson's ratio is generated even in the vertical direction (circumferential direction) of the rail web portion, the residual stress in the vertical direction (circumferential direction) deteriorates on the tensile side. Accordingly, this is not preferable. It is possible to reduce the residual stress of the rail web portion in the vertical direction (circumferential direction) by the first cooling pattern shown in FIG. 17, and to maintain the compressive residual stress of the foot portion in the longitudinal direction.

Figure 18A:
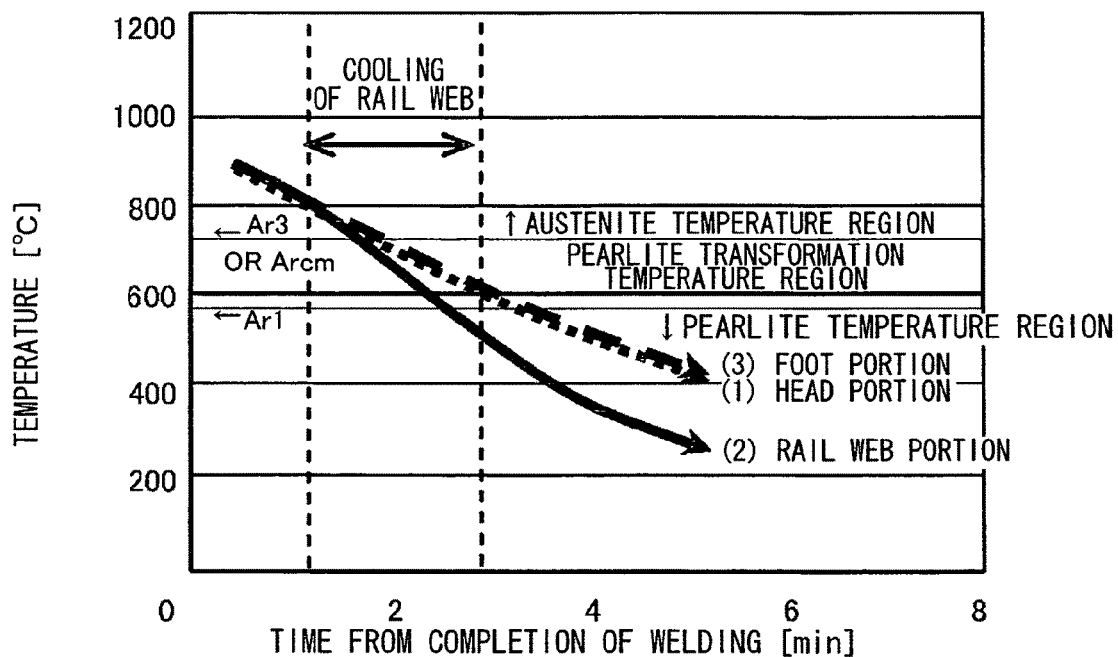
FIG. 18A is a schematic view showing temperature history when a rail web portion is subjected to accelerated cooling until the completion of pearlite transformation from the time where austenite decomposition does not start yet. (Second cooling pattern)
Figure 18B:
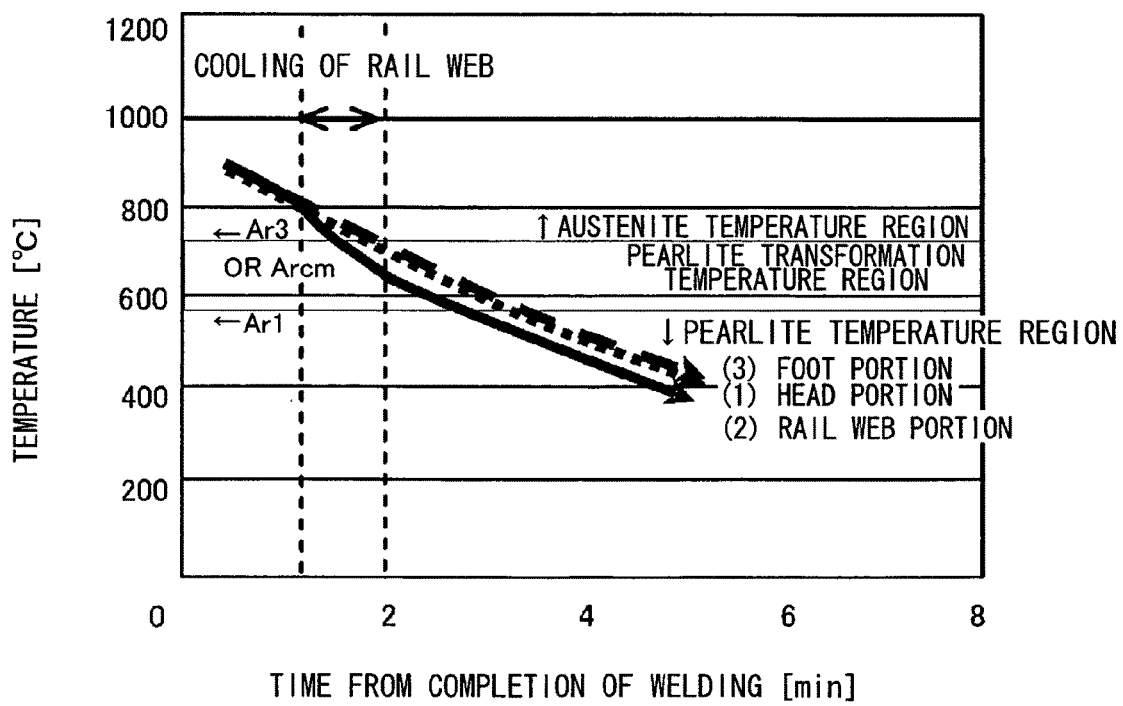
FIG. 18B is another schematic view showing temperature history when a rail web portion is subjected to accelerated cooling until the completion of pearlite transformation from the time where austenite decomposition does not start yet. (Second cooling pattern)
Figure 18C:
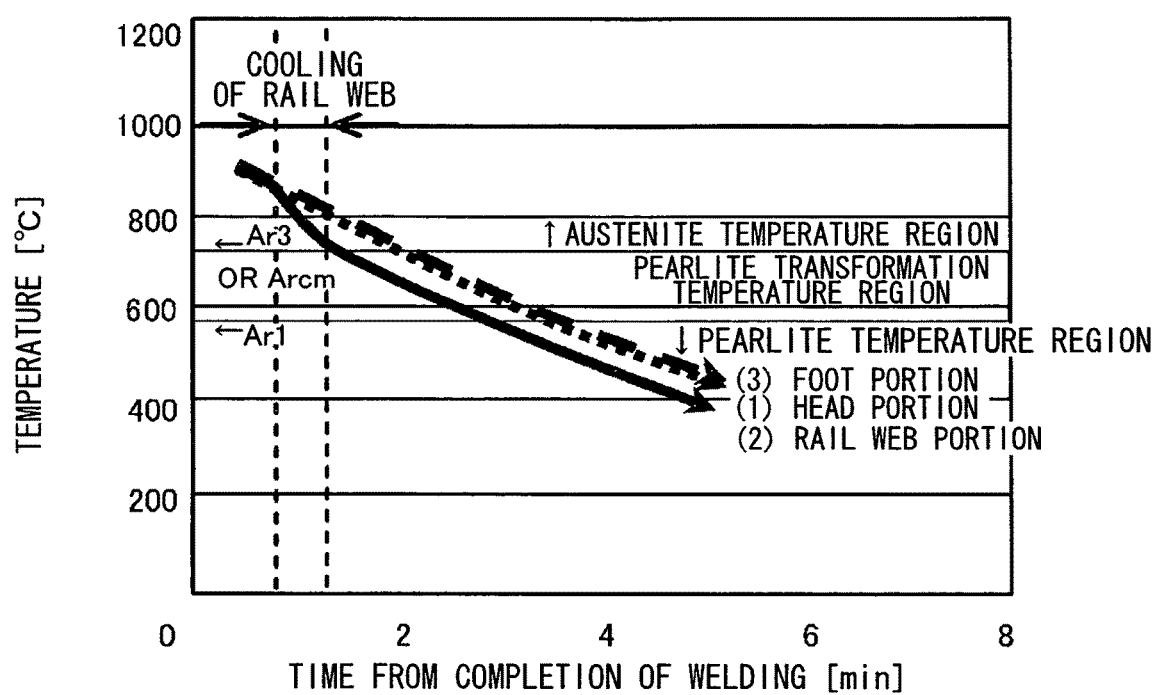
FIG. 18C is another schematic view showing temperature history when a rail web portion is subjected to accelerated cooling until the completion of pearlite transformation from the time where austenite decomposition does not start yet. (Second cooling pattern)

FIGS. 18A, 18B, and 18C show a second cooling pattern that starts accelerated cooling from a state where the temperature of the rail web portion of the rail weld zone is in an austenite temperature region.

FIG. 18A shows an example where the rail web portion is cooled from an austenite region until the completion of pearlite transformation. It is possible to increase fatigue strength by an effect of increasing strength by performing the accelerated cooling of the rail web portion of the weld zone, and an effect of previously flattening the temperature distribution in the vicinity of a welding center until a temperature reaches a temperature not higher than a pearlite transformation temperature where the generation of residual stress becomes significant. In order to obtain these effects, it is necessary to start cooling from an austenite temperature region. Further, since cooling is performed up to a temperature not higher than Ar1 where pearlite transformation is completed, the hardness of a cooled portion significantly increases.

FIG. 18B shows an example where the accelerated cooling of the rail web portion of the rail weld zone starts from an austenite temperature region and the rail web portion is cooled to the middle of a pearlite transformation region.

Even in this method, it is possible to increase fatigue strength by an effect of increasing strength by performing the accelerated cooling of the rail web portion of the weld zone, and an effect of previously flattening the temperature distribution in the vicinity of a welding center until a temperature reaches a temperature not higher than a pearlite transformation temperature where the generation of residual stress becomes significant. In order to obtain these effects, it is necessary to start cooling from at least an austenite temperature region. Meanwhile, since cooling stops before pearlite transformation is completed, the increase of hardness is smaller than that in FIG. 18A.

FIG. 18C shows an example where the accelerated cooling of the rail web portion of the rail weld zone starts from an austenite temperature region and stops before the temperature of the rail web portion enters a pearlite transformation region.

Even in this cooling method, it is possible to increase fatigue strength by an effect of previously flattening the temperature distribution in the vicinity of a welding center until a temperature reaches a temperature not higher than a pearlite transformation temperature where the generation of residual stress becomes significant. In order to obtain this effect, it is necessary to start cooling from at least an austenite temperature region. Further, for the purpose of flattening temperature distribution, it is preferable that cooling be performed until a temperature falls from the start of cooling by a temperature of at least 50° C. or more. In this case, when a cooling stop temperature decreases to a temperature not higher than a point Ar3, a point Ae, or a point Acm where a metallurgical driving force of pearlite transformation acts, hardness increases to some extent. However, an increase of hardness is smaller than that of FIGS. 18A and 18B. If a cooling stop temperature is not lower than a point Ar3, a point Ae, or a point Acm where a metallurgical driving force of pearlite transformation acts, hardness does not increase. However, even in this case, residual stress is improved by the flattening of temperature distribution.

If a cooling rate is equal to a natural cooling rate, the effect thereof is not obtained. In contrast, if a cooling rate is excessively high, the structure of the rail web portion does not cause a pearlite transformation and causes a bainite or martensite transformation at a lower temperature. Since the martensite structure of high-carbon steel is very hard and brittle, the martensite structure should be avoided. Further, the strength of bainite structure varies depending on a transformation temperature and the transformation of a segregated portion of components of an alloy is further delayed, so that there is a risk that a martensite structure is mixed with the bainite structure. For this reason, this is not preferable. In order to prevent a structure other than pearlite, it is necessary that a cooling rate is not higher than 5° C./s.

Figure 19:
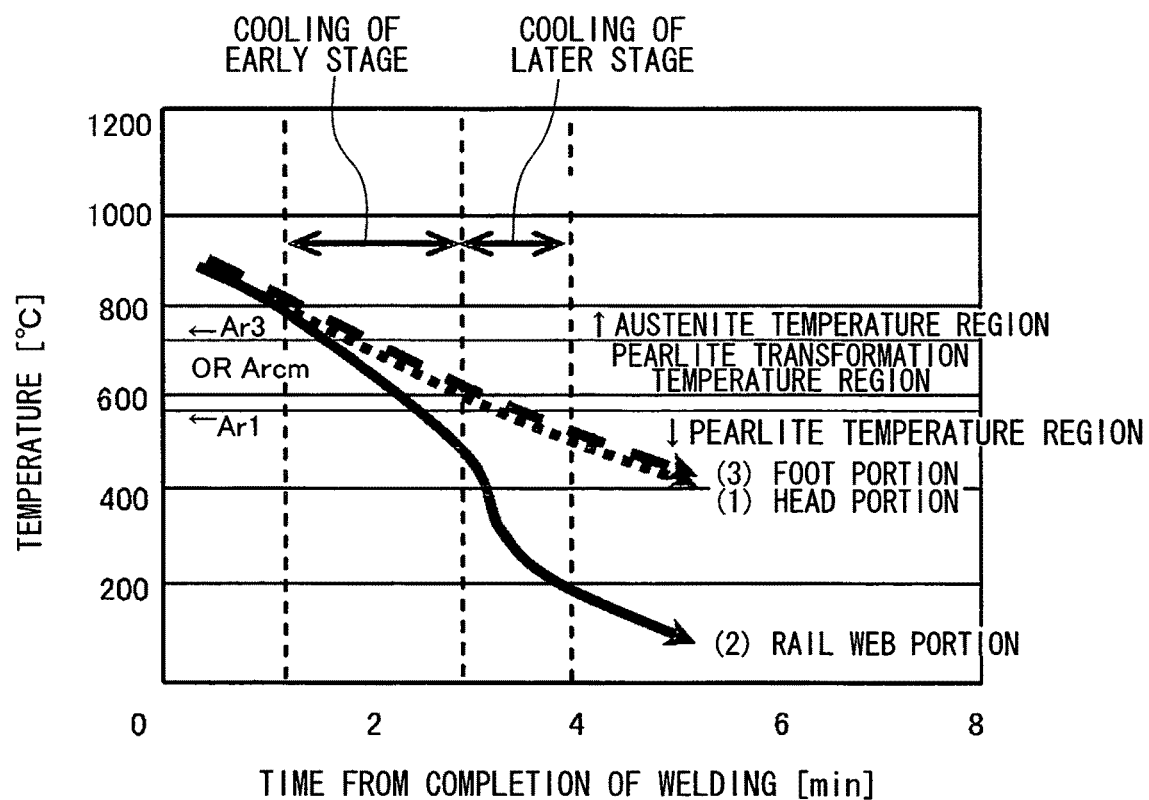
FIG. 19 is a schematic view showing temperature history when a rail web portion is subjected to accelerated cooling until the completion of pearlite transformation from the time where austenite decomposition does not start yet and is further subjected to accelerated cooling after the completion of pearlite transformation. (Third cooling pattern)

FIG. 19 shows a third cooling pattern that starts accelerated cooling from a state where the temperature of the rail web portion of the rail weld zone is in an austenite temperature region and performs the accelerated cooling of the rail web portion even after the pearlite transformation of the rail web portion is completed. This method can further increase fatigue strength by an effect of previously flattening the temperature distribution in the vicinity of a welding center until a temperature reaches a temperature not higher than a pearlite transformation temperature where the generation of residual stress becomes significant, an effect of increasing the strength of the rail web portion by performing the accelerated cooling of the rail web portion of the weld zone, and an effect of further cooling the rail web portion after the pearlite transformation of the rail web portion is completed. In order to obtain these effects, it is necessary to start cooling from at least an austenite temperature region. For the purpose of flattening temperature distribution, it is preferable that the end of the cooling from an austenite temperature region perform cooling of a temperature of at least 50° C. or more from the start of cooling. Further, in order to increase hardness, it is preferable that cooling be performed up to a temperature not higher than the point Ar3, the point Ae, or the point Acm where a metallurgical driving force of pearlite transformation acts.

Cooling from an austenite region may be performed until the completion of pearlite transformation, and cooling after the completion of pearlite may be then performed continuously.

It is necessary that a cooling rate from the austenite region up to the completion of pearlite transformation is not lower than a natural cooling rate, but it is preferable that a cooling rate be not higher than 5° C./s in order to avoid a martensite structure and bainite structure.

A cooling rate of the rail web portion after the completion of pearlite transformation is not lower than a natural cooling rate, and an effect of reducing residual stress becomes large as a cooling rate becomes high.

As described above, in order to prevent a martensite structure, it is necessary that a cooling rate of a pearlite transformation region is not higher than 5° C./s. As another method for preventing a martensite structure, it is effective to provide a period where accelerated cooling of a sufficiently low cooling rate, for example, a natural cooling rate or a cooling rate not higher than 2° C./s in a pearlite transformation temperature region, and wait for the completion of pearlite transformation. Pearlite transformation is completed by providing a sufficiently slow cooling period in the pearlite transformation temperature region regardless of a cooling rate in the temperature range other than the pearlite transformation temperature region, so that it is possible to completely suppress the generation of martensite.

In other words, this cooling pattern is a method that divides a cooling period of a weld zone into an early stage, a middle stage, and a later stage; sets a period corresponding to the middle stage in a part of a pearlite transformation temperature region in the range of 650° C. to 600° C.; and has a natural cooling rate or a gentle cooling rate not higher than 2° C./s. In order to suppress a martensite structure, it is preferable that a cooling period corresponding to the middle stage be 20 seconds or more.

Figure 20A:
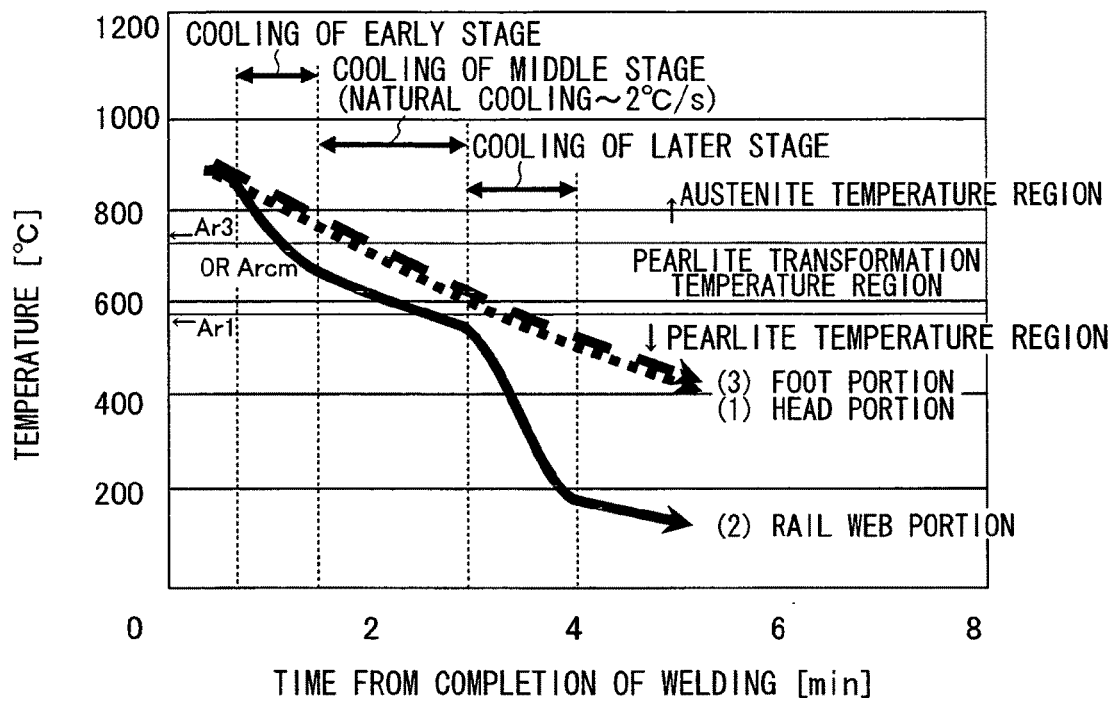
FIG. 20A is a schematic view showing temperature history when a rail web portion and a rail head portion are subjected to accelerated cooling until the completion of pearlite transformation from the time where austenite decomposition does not start yet and the rail web portion is further subjected to accelerated cooling after the completion of pearlite transformation. (Fourth cooling pattern)
Figure 20B:
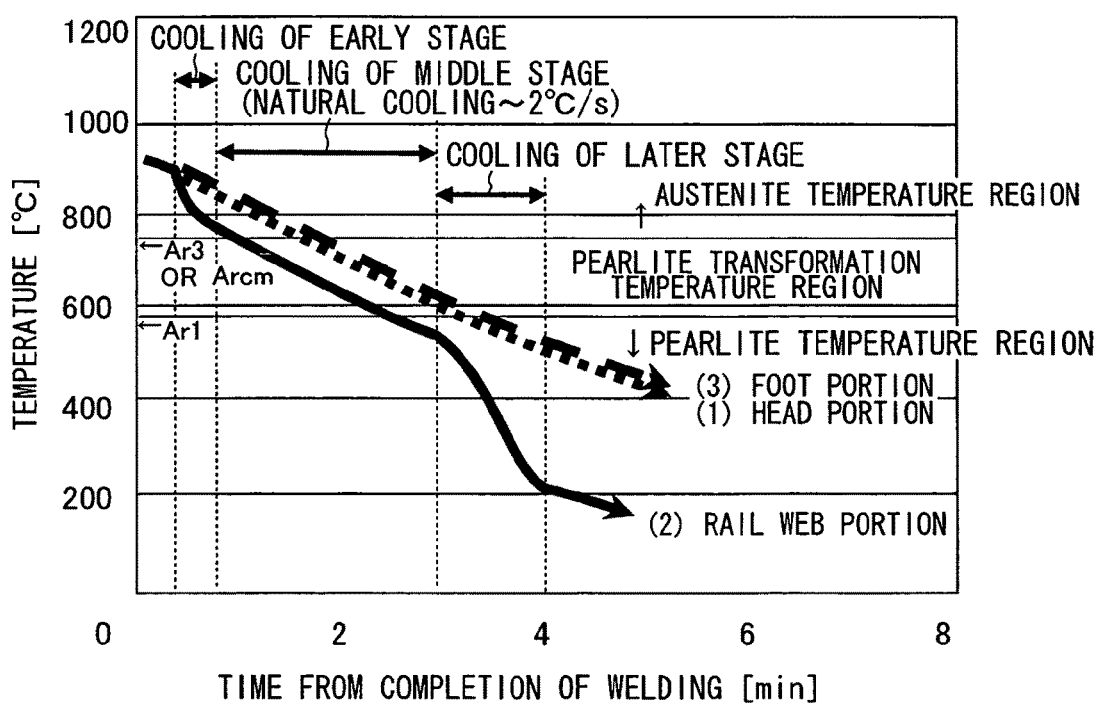
FIG. 20B is a schematic view showing temperature history during cooling, and is a view showing temperature history when a gentle cooling range corresponding to 2° C./s or less is provided in a pearlite transformation temperature region during cooling. (Fourth cooling pattern)

FIGS. 20A and 20B show a fourth cooling pattern that is an example thereof.

FIG. 20A shows an example that performs accelerated cooling so that the temperature of the rail web portion of the rail weld zone falls from an austenite temperature region to the middle of the pearlite transformation temperature region by the cooling of the early stage; completes the pearlite transformation of the rail web portion at a natural cooling rate or a gentle cooling rate not higher than 2° C./s as the cooling of the middle stage; and then cools the rail web portion at a cooling rate not lower than a natural cooling rate by the cooling of the later stage. Since the temperature section of the cooling of the early stage includes a part of a pearlite transformation temperature region in this method, an effect of increasing the strength of the rail web portion is obtained. As a cooling rate of the rail web portion in the later stage, after the completion of pearlite transformation, becomes high, an effect of reducing residual stress becomes large.

FIG. 20B shows an example that starts accelerated cooling of the early stage when the temperature of the rail web portion of the rail weld is in the austenite temperature region; switches the accelerated cooling into the cooling of the middle stage in the austenite temperature region; performs gentle cooling at a natural cooling rate or a gentle cooling rate not higher than 2° C./s from the austenite temperature region until the completion of pearlite transformation as the cooling of the middle stage; and then performs accelerated cooling of the rail web portion as the cooling of the later stage. As a cooling rate of the rail web portion, after the completion of pearlite transformation, becomes high, an effect of reducing residual stress becomes large.

Further, if a cooling rate of the foot portion exceeds a cooling rate of the rail web portion in the cooling after the pearlite transformation of the rail web portion, the rail web portion is slowly shrunk and the shrinkage of the rail web portion is restricted by the foot portion, so that tensile residual stress in the longitudinal direction increases. As a result, since tensile stress corresponding to a Poisson's ratio is generated even in the vertical direction (circumferential direction), this is not preferable. It is possible to further reduce the residual stress of the rail web portion in the vertical direction (circumferential direction) by this method, and to obtain higher fatigue strength by increasing the strength of the rail web portion.

In the above-mentioned cooling method, it has been described that it is necessary that the cooling rate of the foot portion after the pearlite transformation of the rail web portion is completed does not exceed the cooling rate of the rail web portion after the pearlite transformation of the rail web portion is completed. From this point of view, it is necessary to perform the natural cooling of a rail foot portion in a cooling process after welding in order to further improve residual stress and obtain higher fatigue strength, when a rail such as a heavy load rail is used under more severe conditions.

Meanwhile, in a cooling process after welding, it is preferable to give the same hardness as the hardness of a base material rail to a rail, of which a rail head portion is heat-treated, for a curved track where wear tend to occur, by performing the accelerated cooling of the rail head portion in a temperature range corresponding to pearlite transformation.

Figure 21:
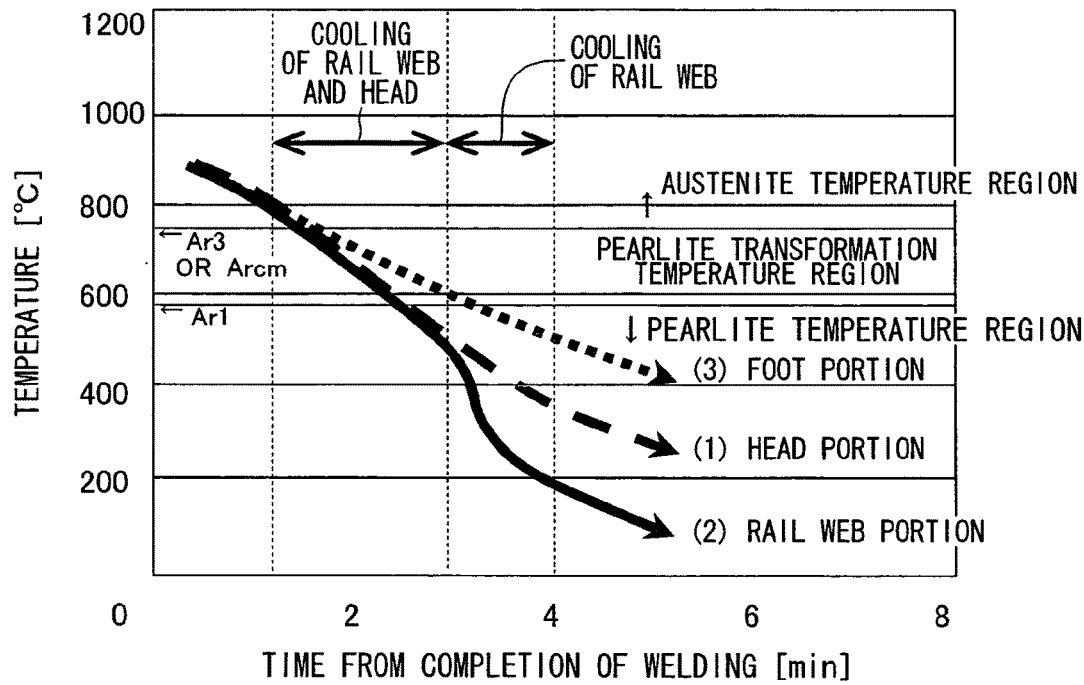
FIG. 21 is a schematic view showing temperature history during cooling, and is a view showing temperature history when a rail web portion and a rail head portion are subjected to accelerated cooling until the completion of pearlite transformation from the time where austenite decomposition does not start yet and the rail web portion is further subjected to accelerated cooling after the completion of pearlite transformation. (Fifth cooling pattern)

FIG. 21 shows a fifth cooling pattern that starts accelerated cooling from a state where the temperature of the rail head portion and the rail web portion is in an austenite temperature region and further performs the accelerated cooling of the rail web portion after the pearlite transformation of the rail web portion is completed.

In order to harden the rail head portion and the rail web portion, it is necessary to start the accelerated cooling of the rail head portion from the austenite temperature region exceeding A3, Ae, or Acm and to cool at least a part of a temperature range until the pearlite transformation is completed. For the purpose of flattening temperature distribution, it is preferable that the end of the cooling from an austenite temperature region perform cooling of a temperature of at least 50° C. or more from the start of cooling. Further, in order to increase hardness, it is necessary to perform cooling up to a temperature not higher than the point Ar3, the point Ae, or the point Acm where a metallurgical driving force of pearlite transformation acts. In order to obtain more sufficient hardness, it is necessary to perform cooling up to a temperature not higher than Ar1 where pearlite transformation is completed. Cooling from an austenite region may be performed until the completion of pearlite transformation, and cooling after the completion of pearlite may be then performed continuously. However, cooling may stop during the middle. Both of the cooling rates of the head portion and the rail web portion from an austenite region need to be higher than a natural cooling rate, so as to achieve hardening. Meanwhile, in order to avoid a martensite structure and bainite structure, it is necessary that the cooling rate is not higher than 5° C./s. Employing this method, in a heat-treated rail of which the rail head portion is hardened, the residual stress of the rail web portion in the vertical direction (circumferential direction) can be reduced, and partial uneven wear of a weld zone can be suppressed.

<Appropriate Relationship Between Cooling Time and Cooling Width of Weld Zone>

Further, in the case of the cooling of a weld zone, the temperature distribution of the weld zone of a rail web portion is changed depending on the time passed after welding. Since residual stress is determined by the temperature distribution of the weld zone, a cooling range effective in reducing residual stress varies depending on a cooling stop temperature or cooling time.

Hereinafter, a situation where a temperature distribution from a welding center in the longitudinal direction of a rail is changed with the passage of time after welding will be schematically illustrated and the change of residual stress in that case will be described with reference to FIGS. 22A to 22C.

Figure 22A:
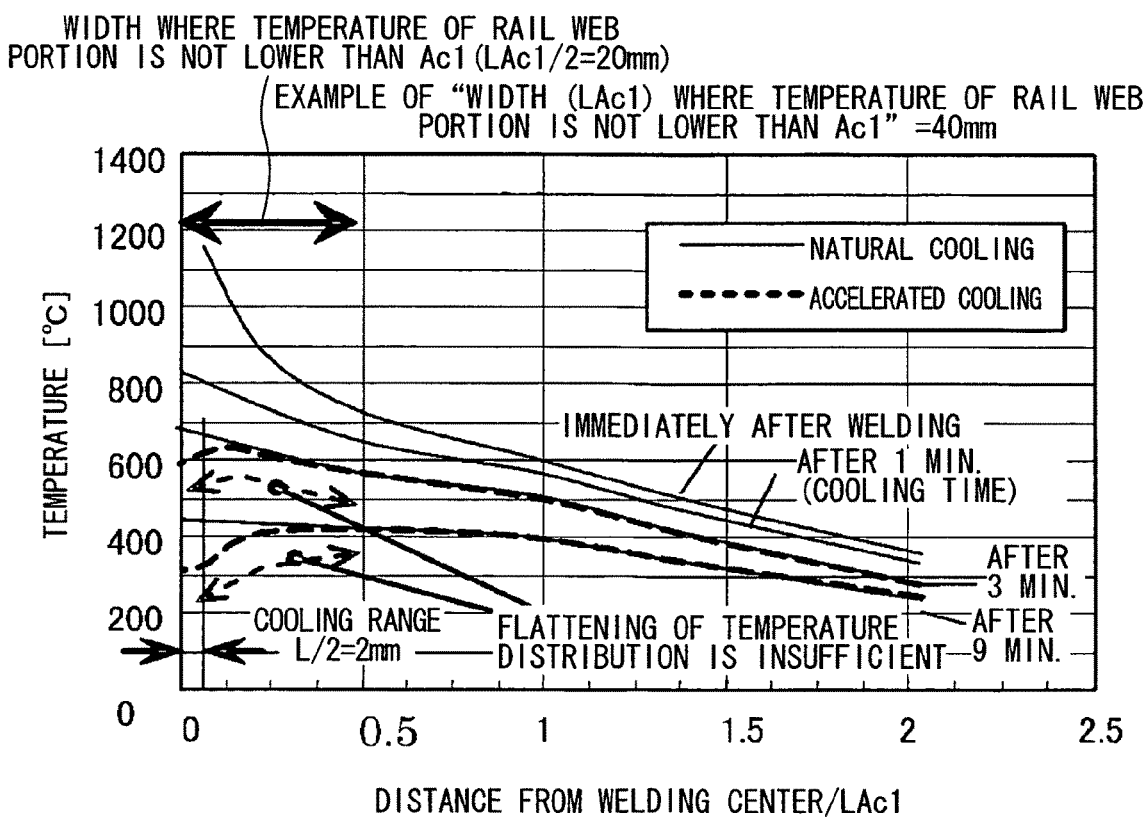
FIG. 22A is a schematic view showing the temperature distribution of a weld zone when a cooling width is narrow.
Figure 22B:
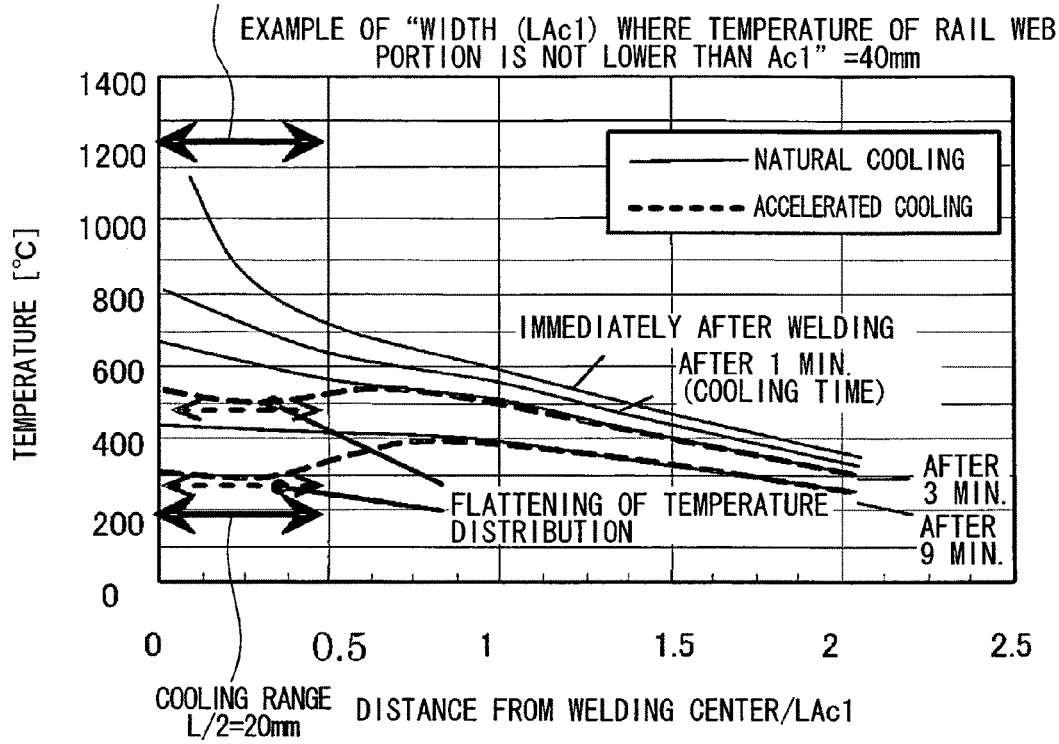
FIG. 22B is a schematic view showing the temperature distribution of a weld zone when a cooling width is medium.
Figure 22C:
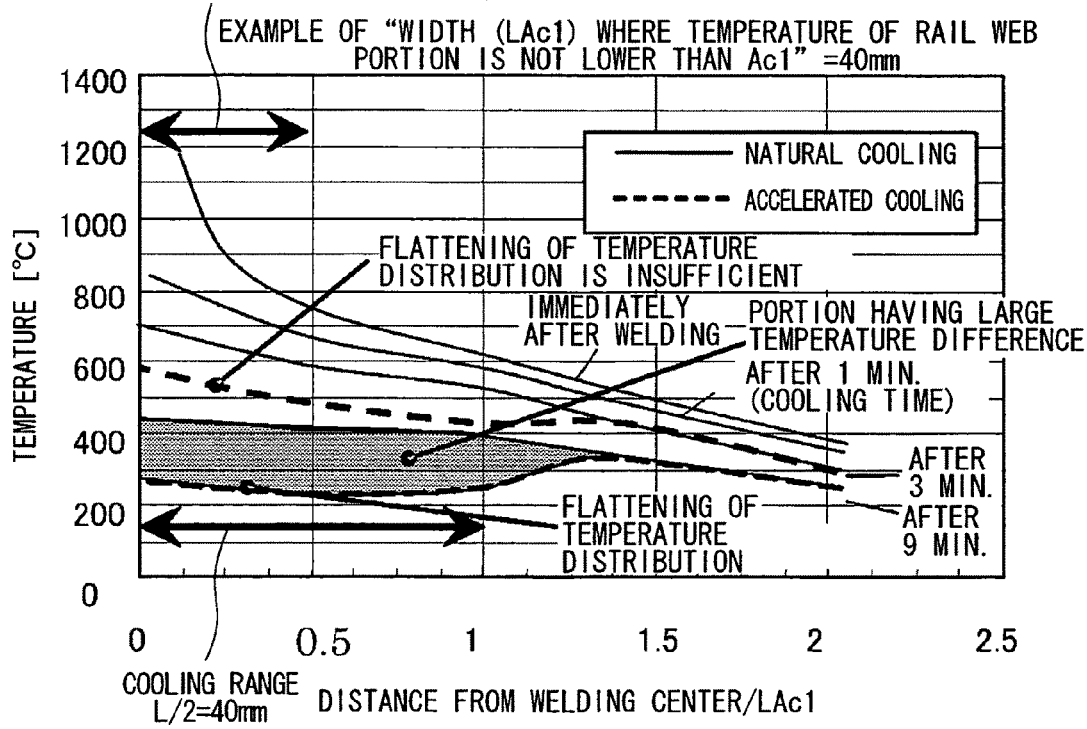
FIG. 22C is a schematic view showing the temperature distribution of a weld zone when a cooling width is large.

A vertical axis of each of FIGS. 22A to 22C represents temperature, and a horizontal axis thereof represents a dimensionless number that is obtained by dividing a distance from a welding center by a distance LAc1 where a material is heated to a temperature not lower than Ac1. The temperature Ac1 of this material is 730° C. A width where the material is heated to a temperature not lower than Ac1 during welding is 20 mm on one side from a welding central portion, and the entire width on both sides from the welding center is 40 mm.

FIGS. 22A to 22C show a state immediately after welding, a state where 1 minute has passed after welding, a state where 3 minutes has passed after welding, and a state where 9 minutes has passed after welding, when only a rail web portion is cooled with air at a cooling rate of 2° C./s after natural cooling is performed for 1 minute after welding. A solid line shows a state where a rail web portion is subjected to natural cooling, and a dotted line shows a temperature when the rail web portion is subjected to accelerated cooling. Since a foot portion is subjected to natural cooling in these examples, the temperature distribution of the foot portion corresponds to a solid line.

FIG. 22A shows a temperature distribution of a case where k is 0.1 that is a case where a cooling range L of the rail web portion is extremely narrow. A cooling width is 2 mm on one side from a welding central portion, and the entire width is 4 mm in regard to the entire weld zone. A width (LAc1) where the temperature of the rail web portion becomes not lower than Ac1 is 40 mm. When a ratio of the cooling range L to the width is denoted by k, k is 0.1.

Since the temperature of only the welding central portion falls in the temperature distribution of the rail web portion at a stage where cooling time is short, the difference between the maximum temperature and the minimum temperature at the welding central portion, that is, the region where the temperature of the rail web portion becomes not lower than Ac1 (a range where the distance from the welding center is 0 to 0.5 times of LAc1, on the horizontal axis of FIG. 22A) exceeds 50° C. and the residual stress of the rail web portion in the vertical direction (circumferential direction) is not reduced.

Even though cooling is performed for a long time under a condition where a cooling width is extremely narrow, that is, k is 0.1, temperature also falls only in the vicinity of the welding center. Accordingly, the difference between the maximum temperature and the minimum temperature at the region where the temperature of the rail web portion is not lower than Ac1 (a range where the distance from the welding center is 0 to 0.5 times of LAc1, on the horizontal axis of FIG. 22A) is about 100° C. and tensile residual stress is not reduced.

FIG. 22B shows a temperature distribution of a case where k is 1 that is a case where a cooling range L of the rail web portion is medium. A cooling width is 20 mm on one side from a welding center, and the entire width is 40 mm. A ratio (k) of the cooling width to the entire width of 40 mm where the temperature of the rail web portion becomes not lower than Ac1 is 1.

The difference between the maximum temperature and the minimum temperature at the region where the temperature of the weld zone of the rail web portion becomes not lower than Ac1 (a range where the distance from the welding center is 0 to 0.5 times of LAc1, on the horizontal axis of FIG. 22B) from a stage where cooling time is short is 50° C. or less and residual stress in the vertical direction (circumferential direction) is reduced.

Even though cooling is performed for a long time, a temperature range in the range where the temperature of the weld zone is not lower than Ac1 (a range where the distance from the stop of welding is 0 to 0.5 times of LAc1), is within 50° C. and residual stress in the vertical direction (circumferential direction) is reduced.

FIG. 22C shows a temperature distribution of a case where k is 2 that is a case where a cooling range L of the rail web portion is extremely wide. A cooling width is 40 mm on one side from a welding center, and the entire width is 80 mm. A ratio (k) of the cooling width to the width of 40 mm where the temperature of the rail web portion becomes not lower than Ac1 is 2.

Since the temperature of the rail web portion uniformly and extensively falls at a stage where cooling time is short, a tendency where the temperature of the welding center is high remains, the difference between the maximum temperature and the minimum temperature at the region where the temperature of the welding central portion, that is, the rail web portion becomes not lower than Ac1 (a range where the distance from the welding center is 0 to 0.5 times of LAc1, on the horizontal axis of FIG. 22C) exceeds 50° C., and an effect of reducing residual stress in the vertical direction (circumferential direction) is small.

Meanwhile, since a high-temperature portion is cooled first when cooling is performed for a long time, the temperature of the middle portion of the weld zone gradually falls. For this reason, the difference between the maximum temperature and the minimum temperature at the region where the temperature of the welding central portion, that is, the rail web portion becomes not lower than Ac1 (a range where the distance from the welding center is 0 to 0.5 times of LAc1, on the horizontal axis of FIG. 22C) becomes not higher than 50° C. and the residual stress of the rail web portion in the vertical direction (circumferential direction) is reduced.

Meanwhile, if a region where the temperature difference between the rail web portion and the foot portion (uncooled portion) is significant is widened, the residual stress of the sole portion in the longitudinal direction is transmitted to the tensile side. As a cooling width increases and cooling time increases, a region where the temperature difference between the rail web portion and the foot portion (uncooled portion) is significant is widened as shown in FIGS. 22A to 22C.

In FIGS. 22A to 22C, in the case shown in FIG. 22C where a cooling range is wide and cooling is performed for a long time, a region where the temperature difference between the rail web portion and the foot portion is significant is significantly widened and the absolute value of the residual stress of the sole portion in the longitudinal direction reaches tension side.

As described above, temperature distribution varies depending on cooling time in addition to a cooling width and residual stress caused by the temperature distribution varies. The contents described in FIGS. 22A to 22C are classified into the case of short-time cooling and the case of long-time cooling, and are organized in regard to a cooling width, so that the contents are organized as shown in FIGS. 23A and 23B.

Figure 23A:
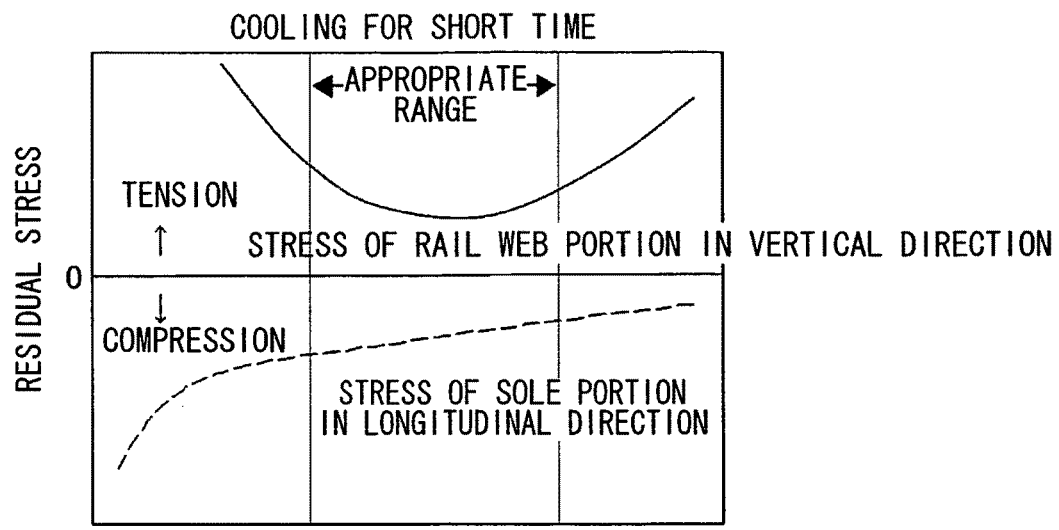
FIG. 23A is a schematic view showing a relationship between a k value (a ratio between a cooling width and the width of a material heated to a temperature of Ac1 or more) and residual stress in the case of short-time cooling.

First, in the case of short-time cooling shown in FIG. 23A, stress of the rail web portion in the vertical direction (circumferential direction) is not changed if the cooling width of the rail web portion is excessively narrow. Since the weld zone and the peripheral portions thereof are wholly cooled during cooling if a cooling width is excessively large, the welding central portion remains in a high-temperature state and residual stress is not reduced. Meanwhile, stress of the sole in the longitudinal direction is increased with the increase of a cooling width, and the sole is not tensioned even if a cooling width is excessively large. From the above description, when cooling time is short, a medium cooling width where the residual stress of the rail web portion in the vertical direction (circumferential direction) is reduced is an appropriate range.

Figure 23B:
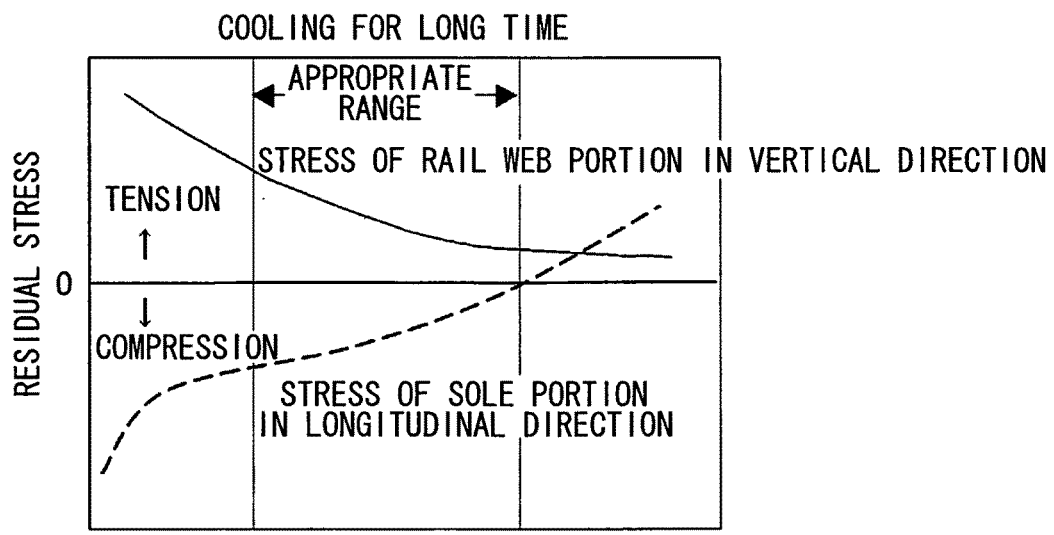
FIG. 23B is a schematic view showing a relationship between a k value (a ratio between a cooling width and the width of a material heated to a temperature of Ac1 or more) and residual stress in the case of long-time cooling.

Meanwhile, when a cooling time shown in FIG. 23B is long, the residual stress of the rail web portion is reduced as a cooling width increases. When the cooling width is excessively large, a region where the temperature difference between the rail web portion and the foot portion is large is widened, the shrinkage strain of the foot portion in the longitudinal direction acts on the rail web portion, and the tension of the rail web portion in the vertical direction (circumferential direction) is reduced by the compressive strain in the longitudinal direction. Accordingly, the shrinkage of the sole in the longitudinal direction is restricted by the rail web portion, and the absolute value of the residual stress of the sole decreases up to tensile stress. The appropriate range of a cooling width is a range until the absolute value of the residual stress of the sole in the longitudinal direction reaches tension side.

Figure 24:
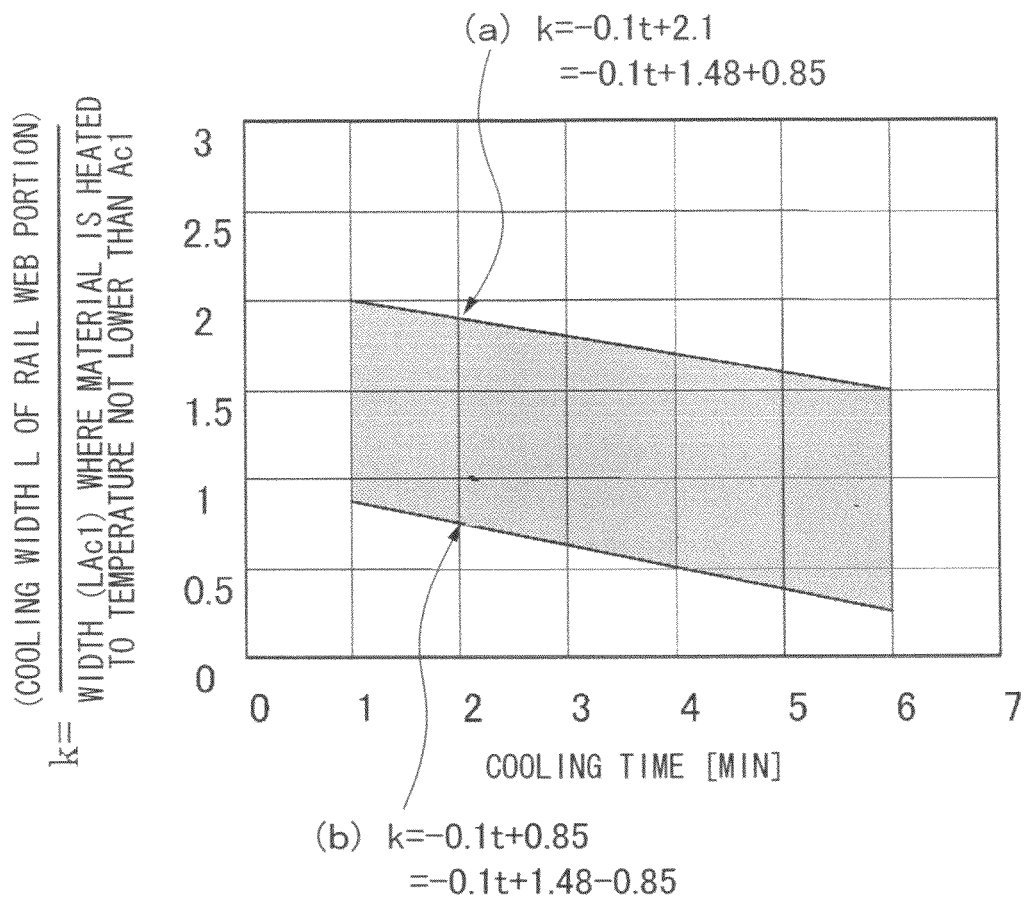
FIG. 24 is a schematic view showing a relationship between a k value (a ratio between a cooling width and the width of a material heated to a temperature of Ac1 or more), which is effective in the reduction of residual stress, and cooling time.

From the above description, the appropriate range of a cooling width is changed into a narrow range as cooling time increases. This aspect is shown in FIG. 24. A vertical axis of FIG. 24 represents a ratio k of the cooling width L of the rail web portion to the width LAc1 where the rail web portion is heated up to a temperature not lower than Ac1, and a horizontal axis thereof represents cooling time by minutes. An appropriate cooling range is a range that is surrounded by straight lines that are denoted by (a) and (b) in FIG. 24, and is changed into a narrow range as cooling time increases. The range surrounded by straight lines (a) and (b) is represented by Expression (1).

$$k=-0.1t-1.48\pm0.85 \qquad (1)$$

In other words, the range of k is represented as follows:

$$-0.1t+0.63 \le k \le -0.1t+2.33 \qquad (2)$$

As described above, it is possible to reduce the residual stress of the rail web portion in the vertical direction by flattening the temperature distribution in the vicinity of the weld zone of the rail web portion. For this reason, it is effective to limit a cooling range to a high-temperature region in the vicinity of the center of the weld zone.

Meanwhile, when a cooling width is excessively narrow, cooling efficiency decreases, so that an effect of reducing residual stress is lowered. Accordingly, it is preferable to cool a range of at least 5 mm or more.

An excellent weld joint is obtained where the residual stress of the rail web portion of the rail weld zone in the vertical direction is reduced and the residual stress of the sole portion in the longitudinal direction is also in a compression range by controlled cooling after the above-mentioned welding. Since the residual stress of a rail web portion in the vertical direction was reduced to tensile stress of 350 MPa or less, according to the experiments of the inventors, the generation of horizontal cracks of a rail web portion was not recognized in a fatigue test simulated on a heavy load rail. Further, since the residual stress of the sole portion in the longitudinal direction was in a compression range, sufficient fatigue life was obtained even in a bending fatigue test. Further, the generation of a martensite structure, which is hard and brittle, is suppressed by the change of 95% or more of a metal structure into a pearlite structure through the adjustment of a cooling rate when a pearlite transformation temperature region is cooled. As a result, these effects are obtained.

Meanwhile, if a section having a very low cooling rate is included in a cooling process as shown in FIGS. 20A and 20B, the entire cooling time between the start and end of cooling increases. According to the examination of the inventors, in this cooling method, it is necessary to use a value which is obtained by subtracting the time of slow cooling having a cooling rate of 2° C./s or less from the entire cooling time as the cooling time that is used in Expression (1) and Expression (2).

Figure 28:
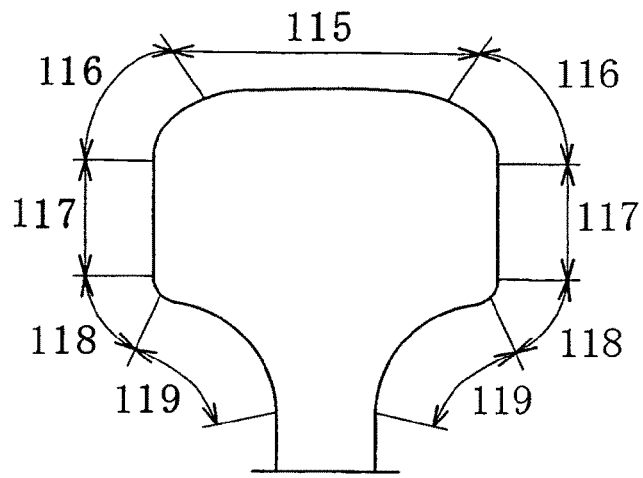
FIG. 28 is a partial cross-sectional view of a rail head portion.

Subsequently, an embodiment which sufficiently secures the hardness of the rail head portion and further reduces the residual stress of the rail web portion will be described below with reference to drawings. Meanwhile, in the description of the following embodiment, as shown in FIG. 28, an upper surface 115 of the rail head portion may be referred to as a "head-top portion", a side surface 117 of the head portion may be referred to as a "head-side portion", a constricted portion 119 formed between the head portion and the rail web portion may be referred to as a "neck portion", an upper corner portion 116 formed between the head-top portion and the head-side portion may be referred to as a "gauge corner portion", and a lower corner portion 118 formed between the head-side portion and the neck portion may be referred to as a "jaw portion".

When the head portion and the rail web portion of the rail weld zone are subjected to accelerated cooling, the cooling rates of the jaw portions are higher than those of the other portions as described below since the jaw portions angulate. The inventors found that the residual stress of the rail web portion was not much reduced if the cooling rates of the jaw portions were higher than those of the other portions. Accordingly, this embodiment reduces the residual stress of the rail web portion while sufficiently securing the hardness of the rail head portion by making the cooling rates of the jaw portions be lower than the cooling rate of the rail web portion when the head portion and the rail web portion of the rail weld zone are subjected to accelerated cooling. It is thought that if the cooling rate of the jaw portion is made to be lower than that of the rail web portion, the shrinkage strain of the rail web portion is absorbed due to the reduction of strength in the vicinity of the jaw portions so that the residual stress of the rail web portion is reduced.

Further, in the method of cooling a rail weld zone according to this embodiment, it is preferable that the entire head portion except for a region of the head portion, which is positioned below a lower position distant from the upper end of the head-side portion by a distance of 2 Hs/3, be subjected to accelerated cooling when the height of the head-side portion, which forms the side surface of the head portion, is denoted by Hs. Accordingly, the cooling rate of the jaw portion is made to be low, so that it is possible to make the cooling rate of the jaw portion be lower than the cooling rate of the rail web portion.

Furthermore, in the method of cooling a rail weld zone according to this embodiment, shield plates may be provided at a region of the head portion that is positioned below a lower position distant from the upper end of the head-side portion by a distance of 2 Hs/3, and a cooling fluid may be ejected to the head portion. According to this constitution, the cooling fluid ejected to the region of the head portion, which is positioned below a lower position distant from the upper end of the head-side portion by a distance of 2 Hs/3, is shut out by the shield plates. Accordingly, the cooling rate of the jaw portion is made to be low, so that it is possible to make the cooling rate of the jaw portion be lower than the cooling rate of the rail web portion. Meanwhile, any one of air, gas-water (mixed fluid of air and water), and water may be selected according to a cooling rate as the kind of the cooling fluid.

Moreover, a cooling device used in the method of cooling a rail weld zone includes a head portion cooling unit. The head portion cooling unit performs accelerated cooling of the entire head portion except for a region of the head portion, which is positioned below a lower position distant from the upper end of the head-side portion by a distance of 2 Hs/3, when the height of the head-side portion, which forms the side surface of the head portion of the rail weld zone, is denoted by Hs.

Further, in the device for cooling a rail weld zone according to the invention, the head portion cooling unit may include an ejection section and shield plates. The ejection section ejects a cooling fluid to the head portion, and the shield plates cover a region of the head portion that is positioned below a lower position distant from the upper end of the head-side portion by a distance of 2 Hs/3.

Furthermore, in a weld joint according to an embodiment of the invention, the residual stress of the rail web portion in a circumferential direction of the cross-section of a rail is set to 300 MPa or less and the hardness of the head portion is set to Hv 320 or more by the method of cooling a rail weld zone. Here, "hardness" is Vickers hardness.

If the residual stress of the rail web portion in the circumferential direction of the cross-section of a rail exceeds 300 MPa, the fatigue strength of the rail is significantly reduced. Moreover, if the hardness of the head portion is lower than Hv 320, the rail head portion is significantly worn away and the durability of the rail significantly deteriorates. Meanwhile, a rail which is very easily worn away and of which the hardness of the surface layer of a head portion of a base material is about Hv 400 is often applied to a curved track of a heavy load rail. For this reason, it is preferable that the surface layer of the head portion of the rail weld zone have a hardness of Hv 400 which is the same as the hardness of a base material rail.

[Flash Butt Welding]

The residual stress of a rail web portion of a rail weld zone in a vertical direction is significant in the flash butt welding where a temperature gradient becomes steepest. For this reason, in this specification, flash butt welding is described as an example of a method of welding a rail joint. Meanwhile, it goes without saying that the method of cooling a rail weld zone and the cooling device used in the method according to the invention can be applied to other welding methods such as Thermit welding.

Figure 34A:
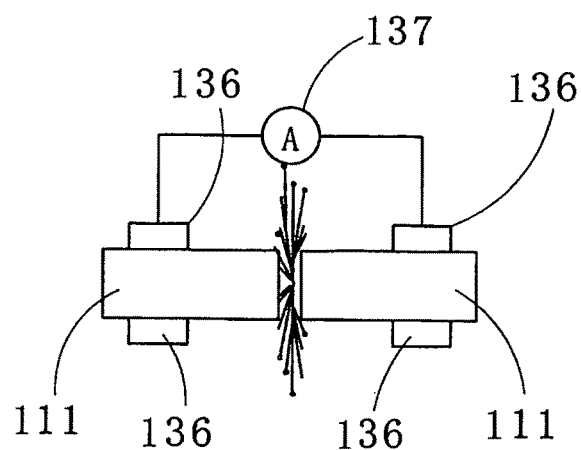
FIG. 34A is a schematic view illustrating a flashing process of flash butt welding.
Figure 34B:
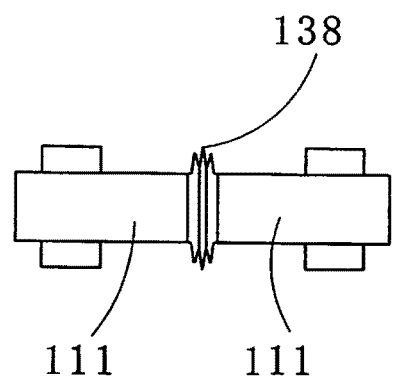
FIG. 34B is a schematic view illustrating an upset process of flash butt welding.
Figure 34C:
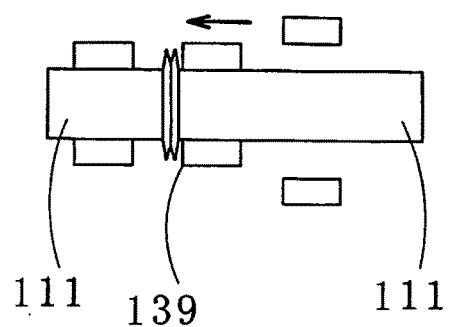
FIG. 34C is a schematic view illustrating a trimming process of flash butt welding.

Schematic views illustrating flash butt welding are shown in FIGS. 34A to 34C. In a first process that is referred to as a flashing process, an arc is continuously generated between the end faces of rails 111, which are provided in line, by a voltage that is applied through electrodes 136 connected to a power source 137 (see FIG. 34A). Portions where the arc is generated are locally melted, a part of molten metal is discharged to the outside as spatters, and the rest of molten metal remains on the end faces of the rails 111. Recesses, which are referred to as craters, are formed at the portions that are melted by the arc. As the rails 111 gradually approach each other, an arc is successively generated at new contact portions and the rails 111 are gradually shortened by the repetition of the local melting thereof. When the flashing process continues for several tens of seconds to several minutes, the entire end faces of the rails 111 are melted. Further, portions of the rails 111 in the vicinity of the end faces are softened due to the rise of temperature. Pressing in the axial direction of the rail is performed as shown in FIG. 34B at the time point where the rails reach this state (upset process). The craters, which are formed at the end faces of the rails 111, are crushed by this pressing that is referred to as upset. Accordingly, the molten metal, which exists between the end faces, is extruded to the outside of a weld surface. The cross-section of a portion in the vicinity of the softened end face increases due to plastic deformation and a weld bead 138 is formed around the weld surface. The weld bead 138 is sheared and removed by trimmers 139 as shown in FIG. 34C when being at a high temperature immediately after welding. This process is referred to as trimming. After trimming, a thin weld bead 138 remains around a weld zone. The thin weld bead 138, which remains at a rail head portion, is polished by a grinder so as to be smoothed. However, the thin weld bead 138, which remains at a rail web portion and a rail foot portion, is treated by treatments, which differ from railway company to railway company, such as a method of polishing the weld bead by a grinder and a method of not treating the weld bead.

[Rail Steel]

As defined in JIS-E1101 "normal rail and special rail for turnouts and crossings" and JIS-E1120 "heat-treated rail", eutectoid carbon steel or hypoeutectoid steel containing 0.5 to 0.8% by mass of carbon is generally used as rail steel. Further, rail steel, which has a hypereutectoid composition, contains carbon exceeding 0.8% by mass, and further improves wear resistance of a heavy load freight line of a foreign mining railway, has also become widespread in recent years.

[Mechanism for Generating Residual Stress]

When non-uniform shrinkage strain caused by non-uniform temperature in a rail exists, respective portions of the rail restrict shrinkage strain together with each other, so that shrinkage stress is generated. When the shrinkage stress remains as internal stress, the shrinkage stress is referred to as residual stress. When joints of rails are welded to each other, a large temperature difference is generated between a rail weld zone and peripheral portions. Accordingly, shrinkage stress is generated at the rail weld zone and becomes residual stress. If accelerated cooling is performed in the vicinity of a welding center, a temperature distribution in the vicinity of the welding center is flattened. Therefore, the generation of residual stress at the welding center is suppressed. However, an effect, which reduces residual stress by performing the accelerated cooling in the vicinity of the welding center so as to flatten the temperature distribution, is largest when the flattened temperature distribution is obtained in the vicinity of Ar1 (a temperature where austenite disappears). Since large residual stress is already generated even though a flat temperature distribution is obtained while the central temperature of the rail weld zone is lower than 200° C., the effect of reducing residual stress is small.

[Device for Cooling Rail Weld Zone]

Figure 29:
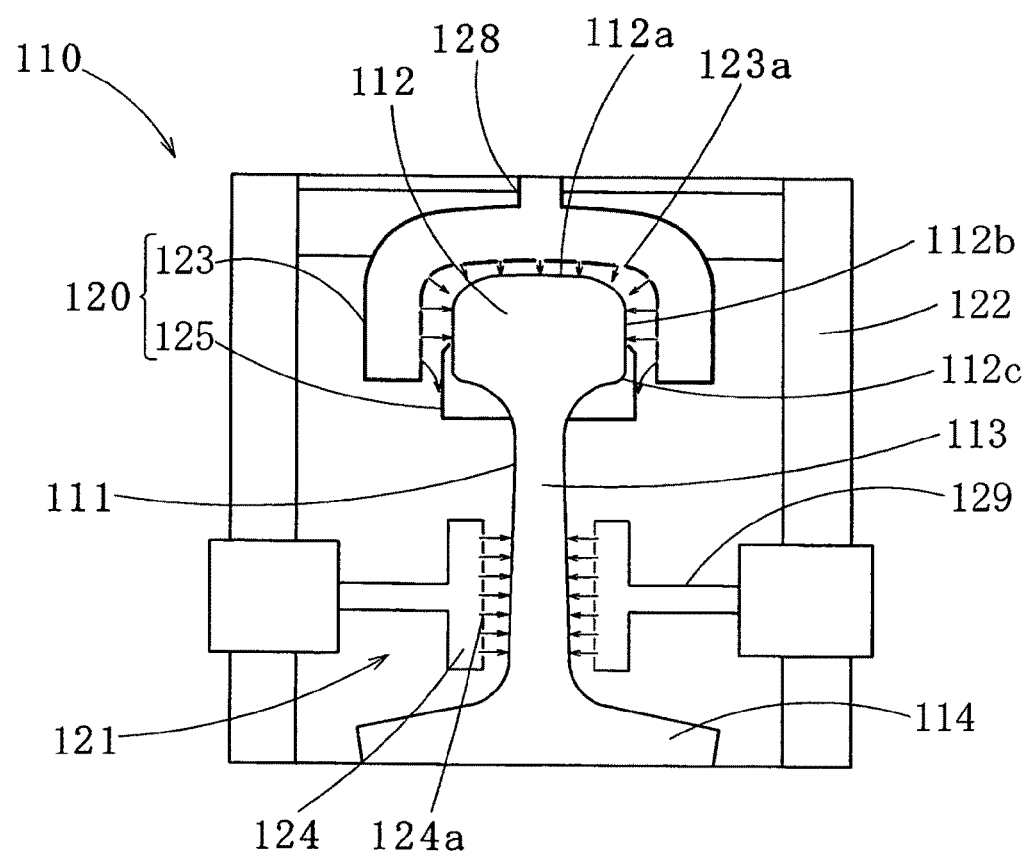
FIG. 29 is a schematic view showing a device for cooling a rail weld zone according to an embodiment of the invention.

As shown in FIG. 29, a device for cooling a rail weld zone (hereinafter, simply referred to as a cooling device) 110 according to an embodiment of the invention generally includes a head portion cooling unit 120 that performs accelerated cooling of a head portion 112 of a rail weld zone 150 after a rail 111 is welded, and rail web portion cooling units 121 that perform accelerated cooling of a rail web portion 113 of the rail weld zone 150. The cooling device does not include a cooling unit that performs accelerated cooling of a foot portion 114 of the rail weld zone 150. Meanwhile, the cooling device 110 may include a controller (not shown) to be described below.

Figure 30A:
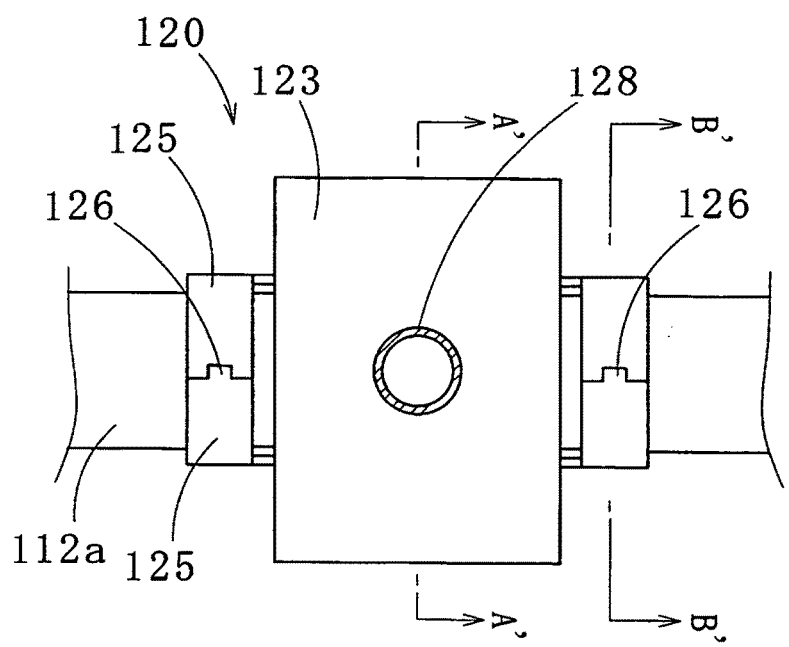
FIG. 30A is a plan view of a head portion cooling unit that performs the accelerated cooling of a head portion of a rail weld zone.
Figure 30B:
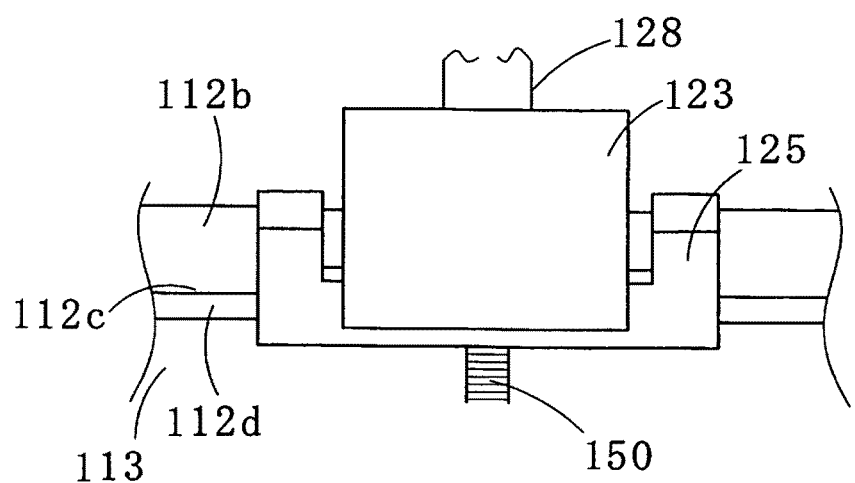
FIG. 30B is a side view of the head portion cooling unit.

The head portion cooling unit 120 includes an ejection section 123 that ejects a cooling fluid to the head portion 112, and a pair of shield plates 125 that is disposed on the side of the head portion 112 (see FIGS. 30A and 30B). The ejection section 123 is formed in a semi-cylindrical shape so as to surround a head-top portion 112a and head-side portions 112b of the rail weld zone 150. Ejection holes 123a, which eject a cooling fluid to the head-top portion 112a and the head-side portions 112b, are formed at the inner peripheral surface of the ejection section 123.

Figure 31:
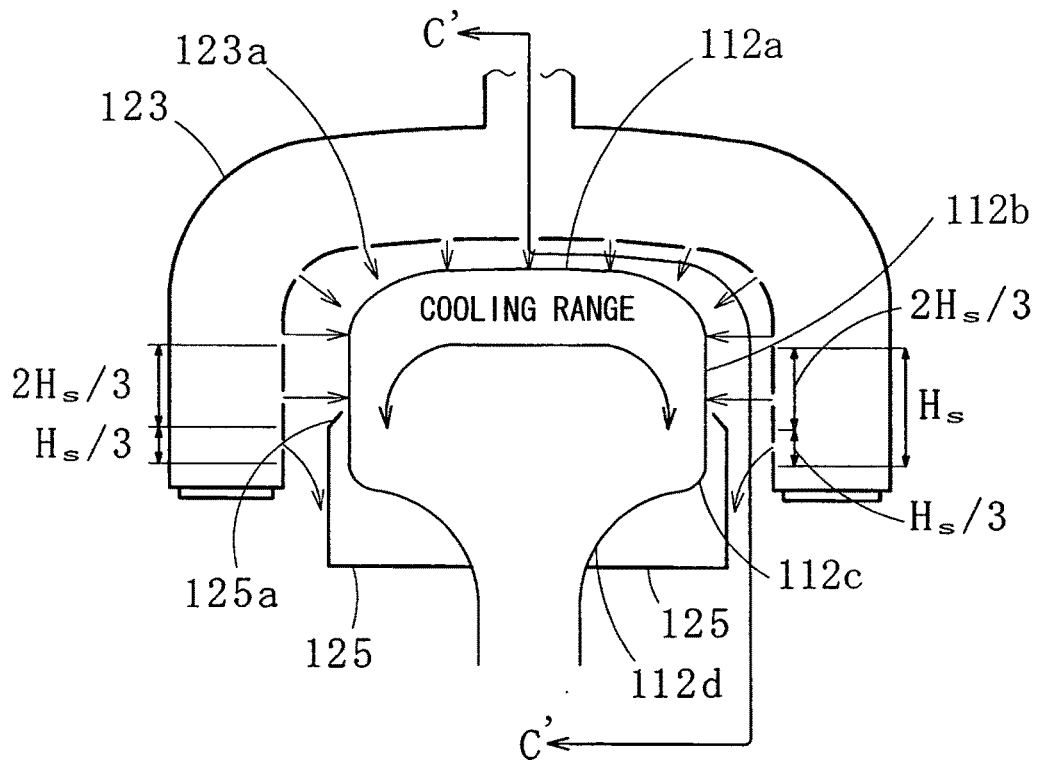
FIG. 31 is a cross-sectional view taken along a line A'-A' of FIG. 30A.
Figure 32:
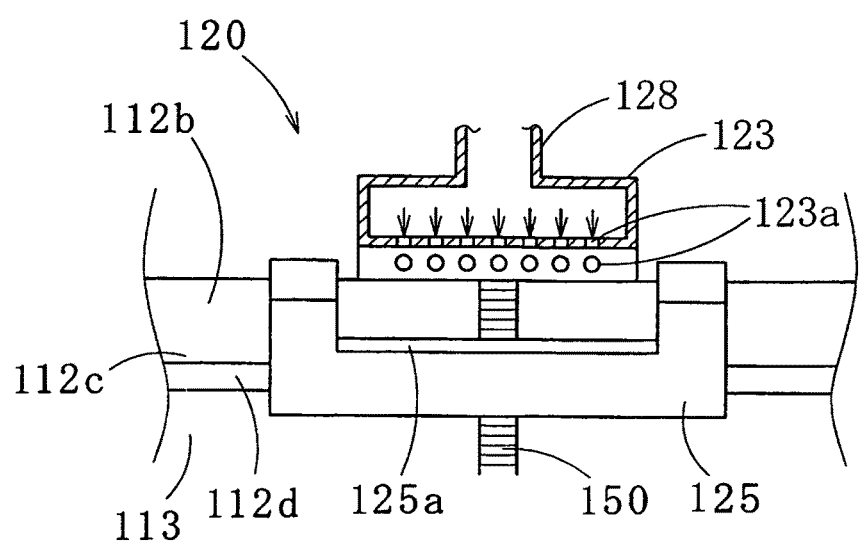
FIG. 32 is a cross-sectional view taken along a line C'-C' of FIG. 31.

The pair of shield plates 125 is long in the axial direction of the rail. Both end portions of the shield plate in the longitudinal direction have a substantially U-shaped (inverse U-shaped) cross-section, and the middle portion of the shield plate has a substantially L-shaped (inverse L-shaped) cross-section (see FIGS. 31, 32, and 33). The upper edge portions of both end portions of the pair of shield plates 125 are connected to each other by hinges 126, and are placed on the head-top portion 112a (see FIG. 33). The pair of shield plates 125 is rotated about the hinge 126 as a rotational axis in a plane which is perpendicular to an axis of the rail, so as to be freely opened and closed. The middle portion, which has a substantially L-shaped (inverse L-shaped) cross-section, covers a region of the head portion that is positioned below a lower position distant from the upper end of the head-side portion 112b by a distance of 2 Hs/3 (a lower portion of the head-side portion 112b corresponding to Hs/3+jaw portion 112c+neck portion 112d) when the height of the head-side portion 112b is denoted by Hs (see FIGS. 29 and 31). Meanwhile, upper edges 125a of the middle portion of the shield plates 125 are inclined toward the head-side portion 112b so that the cooling fluid does not flow to the region of the head portion.

The rail web portion cooling units 121 are disposed so as to face each other with the rail web portion 113 of the rail weld zone 150 interposed therebetween, and include a pair of ejection sections 124 that includes ejection holes 124a for ejecting a cooling fluid to the rail web portion 113 (see FIG. 29).

A supply tube 128, which supplies a cooling fluid, is connected to the ejection section 123 of the head portion cooling unit 120 that performs the accelerated cooling of the head portion 112 of the rail weld zone 150. Supply tubes 129, which supply a cooling fluid, are connected to the ejection sections 124 of the rail web portion cooling units 121 that perform the accelerated cooling of the rail web portion 113 of the rail weld zone 150. The supply tubes 128 and 129 are held on a pedestal 122 that is formed of a portal frame built over a rail 111.

[Method of Cooling Rail Weld Zone]

Next, a method of cooling the rail weld zone 150 by the cooling device 110 will be described.

Figure 33:
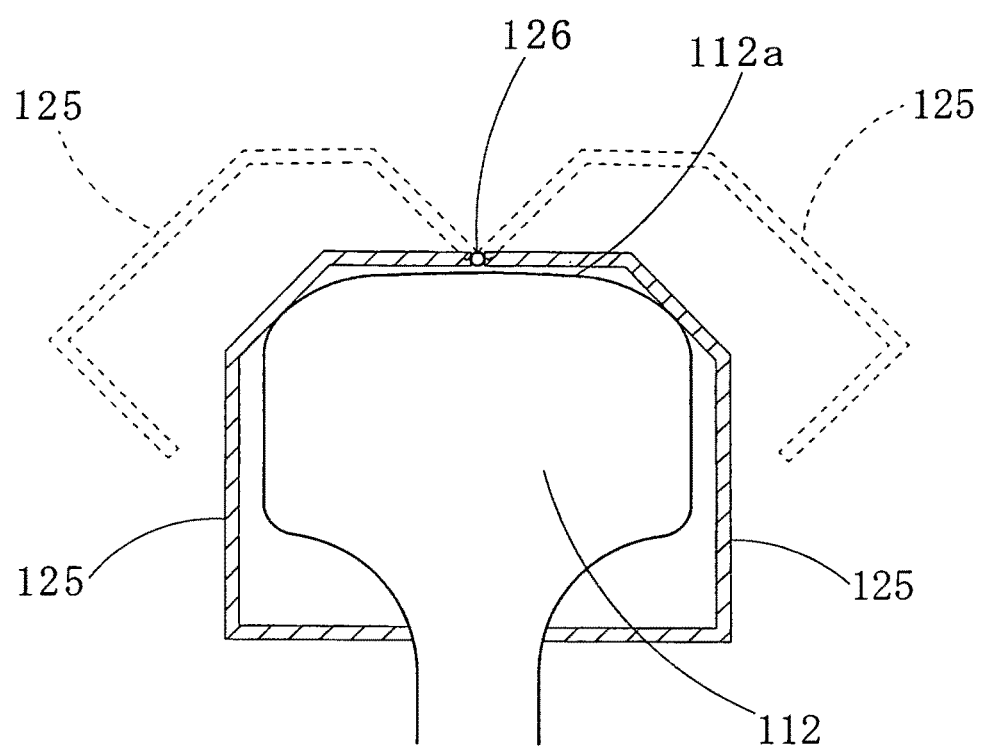
FIG. 33 is a cross-sectional view taken along a line B'-B' of FIG. 30A.

(1) As shown by a broken line of FIG. 33, the pair of shield plates 125 is rotated about the hinge 126 as a rotational axis so as to be opened, and the portions of the shield plates where the hinge 126 are provided is placed on the head-top portion 112a of the rail weld zone 150. The end portions of the pair of shield plates 125 placed on the head-top portion 112a are rotated downward due to their own weight, and are in a state shown by a solid line of FIG. 33. Accordingly, a region of the head portion, which is positioned below a lower position distant from the upper end of the head-side portion 112b of the rail weld zone 150 by a distance of 2 Hs/3, (a lower portion of the head-side portion 112b corresponding to Hs/3+jaw portion 112c+neck portion 112d) is covered with the shield plates 125 (see FIG. 31).

(2) The pedestal 122 formed of a portal frame is disposed over the rail 111, the ejection section 123 of the head portion cooling unit 120 is set so as to surround the head-top portion 112a and the head-side portion 112b of the rail weld zone 150, and the rail web portion cooling units 121 are disposed so as to face each other with the rail web portion 113 of the rail weld zone 150 interposed therebetween.

(3) Until the transformation of the head portion 112 and the rail web portion 113 of the rail weld zone 150 to pearlite from an austenite temperature region is completed, a cooling fluid is ejected from the ejection section 123 of the head portion cooling unit 120 and the ejection sections 124 of the rail web portion cooling unit 121 so that the head portion 112 and the rail web portion 113 are subjected to accelerated cooling. A controller, which is provided in the cooling device 110, is used to control the above-mentioned cooling.

Figure 35:
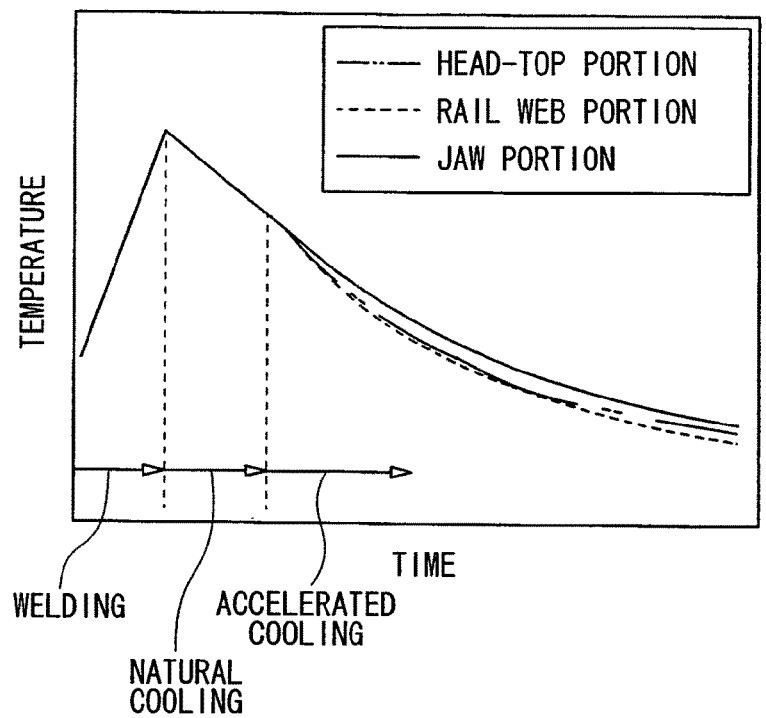
FIG. 35 is a schematic view showing temperature history when a rail weld zone is subjected to accelerated cooling by a method of cooling a rail weld zone according to an embodiment of the invention.
Figure 36:
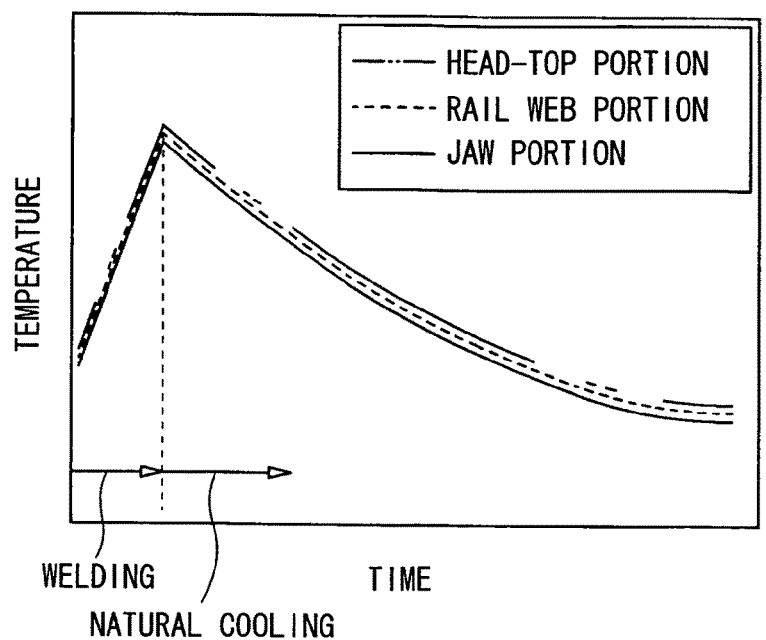
FIG. 36 is a schematic view showing temperature history when a rail weld zone is naturally cooled.
Figure 37:
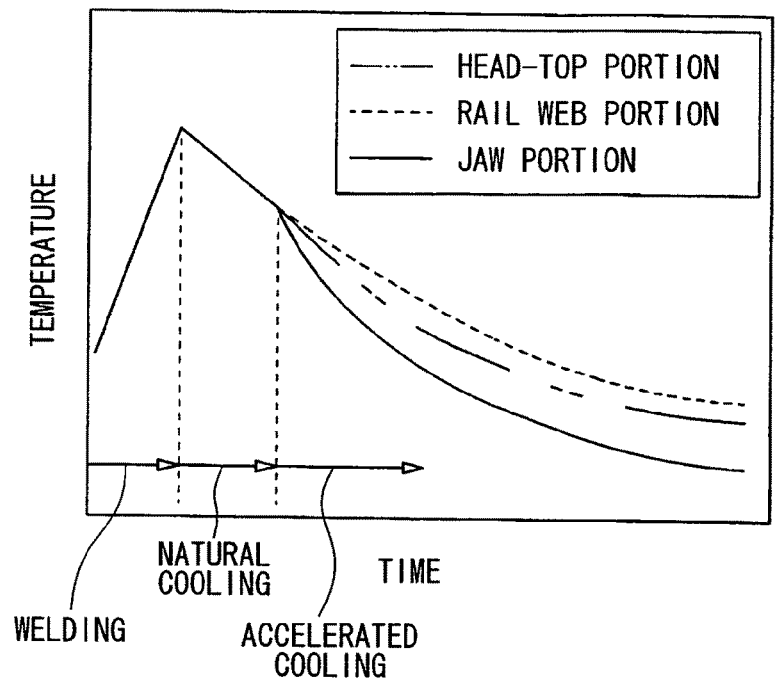
FIG. 37 is a schematic view showing temperature history when only a head portion of a rail weld zone is subjected to accelerated cooling.
Figure 38:
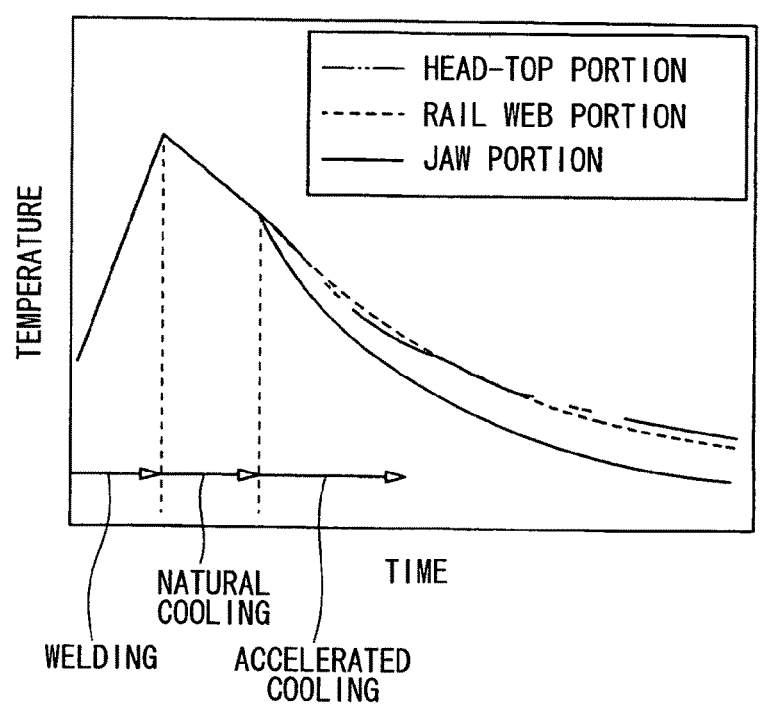
FIG. 38 is a schematic view showing temperature history when a head portion and a rail web portion of a rail weld zone are subjected to accelerated cooling by a method in the related art.

FIG. 35 shows temperature history when the rail weld zone is subjected to accelerated cooling by the method of cooling a rail weld zone according to the embodiment of the invention, FIG. 36 shows temperature history when the rail weld zone is naturally cooled, FIG. 37 shows temperature history when only the head portion of the rail weld zone is subjected to accelerated cooling, and FIG. 38 shows temperature history when the head portion and the rail web portion of the rail weld zone are subjected to accelerated cooling by a method in the related art. From these drawings, it is found that the cooling rate of the jaw portion is highest in any case of the natural cooling, the accelerated cooling of only the head portion, and the accelerated cooling of the head portion and the rail web portion by a method in the related art but the cooling rate of the jaw portion is lower than the cooling rate of the rail web portion according to the invention.

Figure 39:
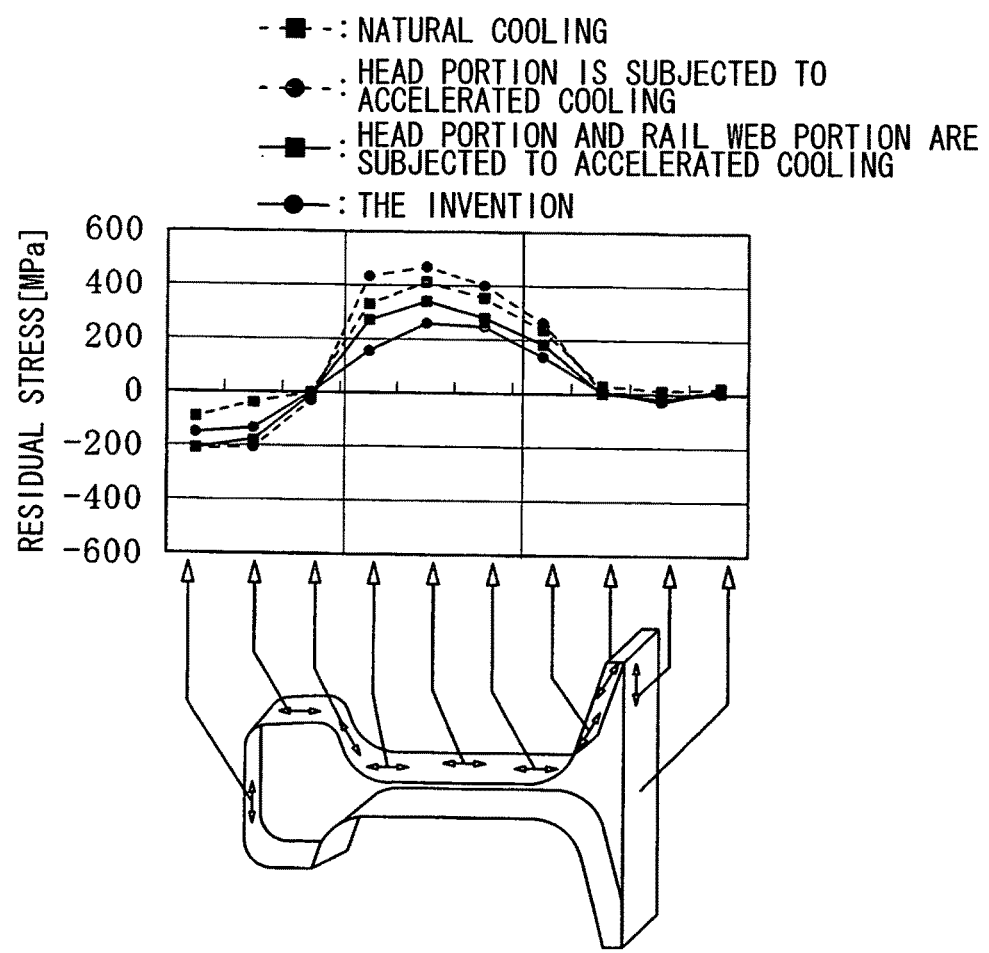
FIG. 39 is a schematic view showing an example of a residual stress distribution of four cooling methods.

FIG. 39 is a view showing the distribution of the residual stress of the welding center of the rail in the circumferential direction of the cross-section of the rail when the respective cooling methods are performed. From FIG. 39, it is found that the residual stress of the rail web portion increases as compared to the case of natural cooling when only the head portion is subjected to accelerated cooling, and the residual stress of the rail web portion is reduced as compared to the case of natural cooling when the head portion and the rail web portion are subjected to accelerated cooling by the method in the related art. In addition, it is found that the residual stress of the rail web portion is further reduced as compared to the method in the related art when accelerated cooling is performed by the method according to the invention.

The embodiment of the invention has been described above. However, the invention is not limited to the constitution of the above-mentioned embodiment, and may also include other embodiments and modifications that are considered to be within the scope of claims. For example, shield plates, which shut out the cooling fluid ejected to the region of the head portion positioned below a lower position distant from the upper end of the head-side portion by a distance of 2 Hs/3, have been provided in the above-mentioned embodiment. However, without the shield plates, the cooling fluid may be ejected to a region of the head portion that is positioned above an upper position distant from the upper end of the head-side portion by a distance of Hs/3. Further, in the above-mentioned embodiment, the ejection section of the head portion cooling unit has been formed in a semi-cylindrical shape but an ejection section for the head-top portion and ejection sections for the head-side portions may be provided.

EXAMPLES

<Test Method>
(As for Method of Testing Fatigue of Rail Web Portion)

Figure 25:
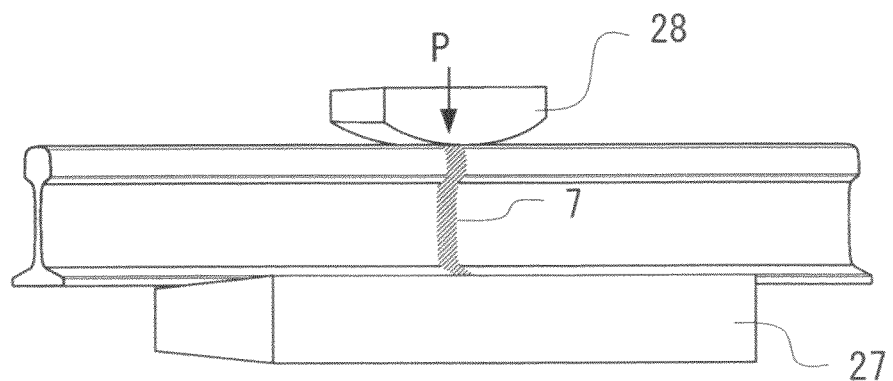
FIG. 25 is a schematic view illustrating a test for evaluating the fatigue strength of a rail web portion.

A test for evaluating the fatigue strength of a rail web portion against horizontal cracks was performed by a method that is schematically shown in FIG. 25. A rail weld zone was placed on a surface plate 27, and a load was repeatedly applied from a rail head portion of the weld zone by a pressing tool 28. The radius of curvature of the pressing tool 28 was 450 mm close to the radius of curvature of a wheel. The applied load was set to 30 tons for the purpose of quick progress of an experiment with consideration for the fact that an actual heavy load was about 20 tons. Since a test piece floats if the minimum load is set to 0 tons in the repetition of a load, the minimum load was set to 4 tons to avoid the floating of the test piece. The frequency of the repetitions of a load was set to 2 Hz, and the test ended at the time point where cracks were generated at the weld zone. Further, if the test piece was not fractured until the number of the repetitions of a load reached 2,000,000 cycles, the test ended at that time.

(As for Method of Testing Fatigue of Foot Portion)

Figure 26:
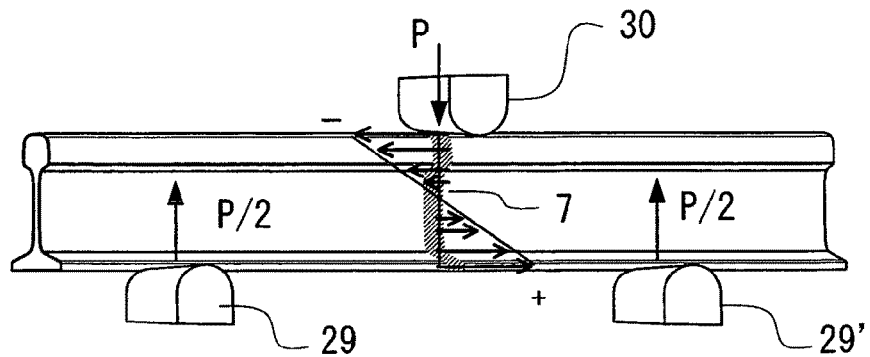
FIG. 26 is a schematic view illustrating a test for evaluating the bending fatigue strength of a foot portion.
Figure 27A:
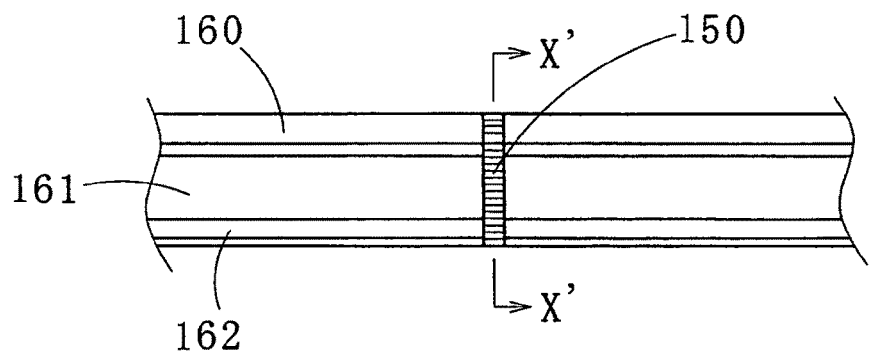
FIG. 27A is a side view of a rail.
Figure 27B:
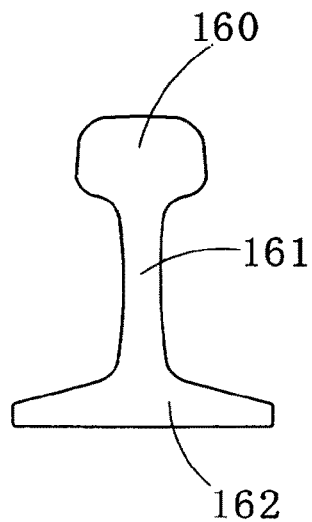
FIG. 27B is a cross-sectional view taken along a line X'-X' of FIG. 27A.

A test for evaluating bending fatigue strength was performed by a three-point bending method. A test method is schematically shown in FIG. 26. A rail weld zone cut by 1.5 m was placed in the middle between the mounts 29 and 29' between which a distance was set to 1 m so as to be in an upright rail web ure, and a load was applied to the middle of the rail weld zone from the rail head portion by a pressing tool 30. The radius of curvature of each of the portions of the mounts 29 and 29' and the pressing tool 30, which came into contact with the a rail, were set to 100 mmR. Test stress was set in the middle portion of the sole of the rail. Minimum stress was set to 30 MPa, maximum stress was set to 330 MPa, and a variable range of stress was set to 300 MPa. A general flash butt welding joint has a fatigue life of 2,000,000 cycles in a stress range of 300 MPa. The frequency of the repetitions of a load was set to 5 Hz, and the test ended at the time point where cracks were generated at the weld zone. Further, if the test piece was not fractured until the number of the repetitions of a load reached 2,000,000 cycles, the test ended and it was determined that the test piece had sufficient fatigue performance.

(As for Used Rail)

Three kinds of used rails are shown in Table 1. Rail steel A is a type of steel commonly referred to as normal rail and is hypoeutectoid steel containing 0.65 to 0.75% by weight of carbon. A rail head portion of rail steel A has a hardness in the range of Hv 260 to 290 in an as-rolled state. Rail steel B is rail that is heat treated after being rolled, and is eutectoid steel containing 0.75 to 0.85% by weight of carbon. A type of steel where the hardness below the surface of the rail head portion by a distance of 5 mm is Hv 360 to 400 was used as the rail steel B. Rail steel C is hypereutectoid steel containing 0.85 to 0.95% of carbon, and is rail that is heat treated after being rolled. A type of steel where the hardness below the surface of the rail head portion by a distance of 5 mm is Hv 400 to 450 was used as the rail steel C. The size for a general railway, which has a weight per meter of 60 kg/m, was used as the size of the rail.

[Table 1]

Examples and Comparative Examples of the invention are shown in Tables 2 to 8. Three specimens are formed under the same conditions. Among them, the first specimen was investigated in terms of residual stress, the hardness of a weld zone, and metal structure; the second specimen was subjected to a test for evaluating the fatigue life of a rail web portion; and the third specimen was subjected to a bending fatigue test. Tables show the kinds of rails welded; the width LAc1 of a region of the weld zone where maximum heating temperature is not lower than Ac1 in the longitudinal direction; the width of a region where temperature is not lower than Ac3, Ace, or Accm in the longitudinal direction; the width in the longitudinal direction when cooling is performed after welding; a value of a ratio k of the cooling width L of the rail web portion to LAc1; cooling time t; upper and lower limits of an appropriate range of a k value obtained by Expression (1); whether a k value is included in the upper and lower limits; a cooling temperature range; the measured value of residual stress; the hardness of the weld zone; and the number of the generation of cracks in a fatigue test. Since the measured values of the hardness of a decarburized region of the welding center have deviation, hardness was measured on the surface of a position distant from the welding center by a distance of 2 mm with a Shore hardness tester and then was converted into Vickers hardness. A value of residual stress was calculated from the change of strain that was obtained from the cutting of a strain gauge attachment portion. Metal structure was obtained by performing the mirror polishing of a cross-section, which is perpendicular to the longitudinal direction of the rail, of a portion that is positioned below the surface at a distance of 2 mm and is distant from the welding center by a distance of 2 mm; etching the mirror polished cross-section with acetic alcohol of 3%; and observing the mirror polished cross-section with a microscope. The structural fraction of the metal structure was obtained by the observation at a magnification of 100 and a point counting method. In Tables 2 to 6, a fact that a structure such as martensite other than pearlite was recognized is written in a remarks column. Meanwhile, the temperature recorded in the Tables is the surface temperature in the vicinity of a welding central portion.

Further, in flash butt welding, the temperature distribution of the weld zone in the longitudinal direction is changed by the adjustment of the time of a flash process. In the following examples, the change of the width of the maximum heating temperature of the weld zone was performed by the adjustment of flashing time.

[Table 2]

Example A

Table 2 shows examples that were obtained by completing the transformation of the entire rail web portion from austenite to pearlite after the flash butt welding of a rail and then cooling the following region of the rail web portion, which was limited in the longitudinal direction, at a cooling rate that exceeded a natural cooling rate and was not lower than a cooling rate of a rail foot portion.

A cooling method in this case was as follows: A region of a rail web portion in the longitudinal direction of the rail web portion, which was calculated by the product (L) of a k value of Table 2 and the width LAc1 of a rail web portion where the maximum heating temperature of the rail web portion is not lower than Ac1 in the longitudinal direction of the rail web portion, was cooled by controlling a flow rate and flow velocity of compressed air or compressed air containing water droplets with a controller; a region (a range narrower than the region) of a foot portion in the longitudinal direction where a maximum heating temperature is not lower than Ac1 was cooled by controlling a flow rate and flow velocity of compressed air; and regions except for the above-mentioned regions were subjected to natural cooling. In short, a part of the rail was subjected to accelerated cooling. Steel A of Table 1 was used as a rail to be welded.

Examples A1 to A6 are examples that were obtained by changing a cooling rate, when the rail web portion was cooled after the completion of pearlite transformation of the rail web portion, to various values. Pearlite transformation completion temperature was about 600° C., the cooling starting temperature of the rail web portion was set to 500° C., and the cooling ending temperature of the rail web portion was set to 200° C. Example A4 is an example where a cooling range in the longitudinal direction was changed.

The residual stress of the rail web portion of any example in the vertical direction (circumferential direction) was reduced as compared to Comparative Example A1 in an as-welded state. For this reason, in the case of Comparative Example A1 in an as-welded state, cracks were generated at a short life where the number of the repetitions of a load did not reach 2,000,000 cycles, in a fatigue test of the rail web portion. In contrast, in the cases of Examples A1 to A6, cracks were not generated until the number of the repetitions of a load reached 2,000,000 cycles. Further, the residual stress of the sole portions of Examples A1 to A6 in the longitudinal direction was in a compression range, and cracks were not generated and Examples A1 to A6 were not fractured in a bending fatigue test until the number of the repetitions of a load reached 2,000,000 cycles. Accordingly, it was confirmed that Examples A1 to A6 collectively had high fatigue strength. 95% or more of the metal structure of each of Examples A1 to A6 was a pearlite structure.

Meanwhile, in the case of Comparative Example A2, the range of a value of a ratio k of the cooling width L of the rail web portion to LAc1 was wider than an appropriate range, and the residual stress of the foot portion in the longitudinal direction became tensile. Comparative Example A2 was fractured during the test at a short life in a bending fatigue test.

Further, in the case of Comparative Example A3, the cooling rate of the foot portion is higher than that of the rail web portion, and the residual stress of the rail web portion was not reduced. Comparative Example A3 was fractured during the test at a short life in a fatigue test of the rail web portion.

Comparative Example A4 is an example that was obtained by setting the start timing of cooling to 650° C., that is, to a high temperature, and starting cooling before the completion of pearlite transformation. In addition, since a cooling rate was high, a fraction of martensite structure was 10% or more by an area ratio and the hardness of the rail web portion abnormally increased. Comparative Example A4 was fractured during the test at a short life in a fatigue test of the rail web portion.

In the case of Comparative Example A5, the range of a value of a ratio k of the cooling width L of the rail web portion to LAc1 was narrower than an appropriate range, and the residual stress of the rail web portion in the longitudinal direction became tensile. Comparative Example A5 was fractured during the test at a short life in a fatigue test of the rail web portion.

[Table 3]

Example B

Table 3 shows examples that were obtained by cooling the following region of the rail web portion of the weld zone, which was limited in the longitudinal direction, after the flash butt welding of a rail and at least a part of a temperature range until the completion of transformation to pearlite from an austenite temperature region where the temperature of the rail web portion exceeded Ae, at a cooling rate that exceeded a natural cooling rate and was not higher than 5° C./s. A cooling method in this case was as follows:

A region of a rail web portion in the longitudinal direction of the rail web portion, which was calculated by the product (L) of a k value of Table 3 and the width LAc1 of a rail web portion where the maximum heating temperature of the rail web portion is not lower than Ac1 in the longitudinal direction of the rail web portion, was cooled by controlling a flow rate and flow velocity of compressed air or compressed air containing water droplets; a region (a range narrower than the region) of a foot portion in the longitudinal direction where maximum heating temperature is not lower than Ac1 was cooled by controlling flow rate and flow velocity of compressed air; and regions except for the above-mentioned regions were subjected to natural cooling. In short, a part of the rail is subjected to accelerated cooling.

A pearlite transformation temperature region is in the range of 650° C. to 600° C. in natural cooling. However, when cooling is performed, a transformation temperature is changed to some extent according to a cooling rate. Steel A of Table 1 was used as a rail to be welded.

Examples B1 to B4 are examples that were obtained by changing a cooling temperature region and a cooling rate, when the rail web portion was cooled from an austenite region, to various values.

The residual stress of the rail web portion of any example in the vertical direction (circumferential direction) was lower than that of Comparative Example A1 in an as-welded state. For this reason, cracks were not generated until the number of the repetitions of a load reached 2,000,000 cycles, in a fatigue test of the rail web portion. Further, the residual stress of the sole portions of Examples B1 to B4 in the longitudinal direction was in a compression range, and cracks were not generated and Examples B1 to B4 were not fractured in a bending fatigue test until the number of the repetitions of a load reached 2,000,000 cycles. Accordingly, it was confirmed that Examples B1 to B4 collectively had high fatigue strength. 95% or more of the metal structure of each of Examples B1 to B4 was a pearlite structure. Furthermore, since the hardness of the rail web portion increased up to Hv 350 or more by the accelerated cooling of a pearlite transformation region of the rail web portion, it was more advantageous in terms of fatigue strength.

Meanwhile, in the case of Comparative Example B1, the cooling rate of the rail web portion exceeded 5° C./s, a fraction of martensite structure of the rail web portion was 10% or more by an area ratio, and the hardness of the rail web portion abnormally increased. Comparative Example B1 was fractured during the test at a short life in a fatigue test of the rail web portion.

In the case of Comparative Example B2, the range of a value of a ratio k of the cooling width L of the rail web portion to LAc1 was wider than an appropriate range, and the residual stress of the foot portion in the longitudinal direction became a tensile region. Comparative Example B2 was fractured during the test at a short life in a bending fatigue test.

Further, in the case of Comparative Example B3, cooling ending temperature was 760° C., that is, high and a temperature decrease caused by cooling was small. Accordingly, residual stress is not significantly different from residual stress in an as-welded state. Since cooling was ended before the start of pearlite transformation, hardness was also not increased. Comparative Example B3 was fractured during the test at a short life in a fatigue test of the rail web portion.

In the case of Comparative Example B4, the range of a value of a ratio k of the cooling width L of the rail web portion to LAc1 was narrower than an appropriate range, and the residual stress of the rail web portion in the longitudinal direction became tensile. Comparative Example B4 was fractured during the test at a short life in a fatigue test of the rail web portion.

[Table 4]

Example C

Table 4 shows examples that were obtained by cooling the following region of the rail web portion of the weld zone, which was limited in the longitudinal direction, after the welding of a rail and at least a part of a temperature range until the completion of transformation to pearlite from an austenite temperature region where the temperature of the rail web portion exceeded A3, Ae, or Acm, at a cooling rate that exceeded a natural cooling rate and was not higher than 5° C./s; and cooling the rail web portion after the completion of the transformation of the entire rail web portion from austenite to pearlite at a cooling rate exceeding a natural cooling rate and at a cooling rate not lower than the cooling rate of the rail foot portion.

A cooling method in this case was as follows: A region of a rail web portion in the longitudinal direction of the rail web portion, which was calculated by the product (L) of a k value of Table 4 and the width LAc1 of a rail web portion where the maximum heating temperature of the rail web portion is not lower than Ac1 in the longitudinal direction of the rail web portion, was cooled by controlling a flow rate and flow velocity of compressed air or compressed air containing water droplets; a region (a range narrower than the region) of a foot portion in the longitudinal direction where a maximum heating temperature is not lower than Ac1 was cooled by controlling flow rate and flow velocity of compressed air; and regions except for the above-mentioned regions were subjected to natural cooling. In short, a part of the rail was subjected to accelerated cooling.

A pearlite transformation temperature region was in the range of 650° C. to 600° C. in natural cooling. However, when cooling is performed, a transformation temperature is changed to some extent according to a cooling rate. Normal pearlite transformation is completed at a temperature slightly lower than 600° C. Meanwhile, the temperature range of cooling after the completion of pearlite transformation was set to the range of 500° C. to 200° C. Steel A of Table 1 was used as a rail to be welded.

Examples C1 to C4 are examples that were obtained by changing a cooling temperature region and a cooling rate when cooling the rail web portion in a pearlite transformation temperature region from an austenite region, and a cooling rate of cooling after the completion of pearlite transformation.

The residual stress of the rail web portion of any example in the vertical direction (circumferential direction) was reduced as compared to Comparative Example A1 in an as-welded state. For this reason, cracks were not generated until the number of the repetitions of a load reached 2,000,000 cycles, in a fatigue test of the rail web portion. Further, the residual stress of the sole portions of Examples C1 to C4 in the longitudinal direction was compression, and cracks were not generated in a bending fatigue test until the number of the repetitions of a load reached 2,000,000 cycles. Accordingly, it was confirmed that Examples C1 to C4 collectively had high fatigue strength. 95% or more of the metal structure of each of Examples C1 to C4 was a pearlite structure. Furthermore, since the hardness of the rail web portion increased up to Hv 350 or more by the accelerated cooling of a pearlite transformation region of the rail web portion, it was considered to be more advantageous in terms of fatigue strength.

Meanwhile, in the case of Comparative Example C1, the cooling rate of the rail web portion exceeded 5° C./s, a fraction of martensite structure of the rail web portion was 10% or more by an area ratio, and the hardness of the rail web portion abnormally increased. Comparative Example C1 was fractured during the test at a short life in a fatigue test of the rail web portion.

Further, in the case of Comparative Example C2, the cooling rate of the foot portion was higher than that of the rail web portion, and the residual stress of the rail web portion was not reduced. Comparative Example C2 was fractured during the test at a short life in a fatigue test of the rail web portion.

Meanwhile, in the case of Comparative Example C3, the range of a value of a ratio k of the cooling width L of the rail web portion to LAc1 was wider than an appropriate range, and the residual stress of the foot portion in the longitudinal direction became a tensile region. Comparative Example C3 was fractured during the test at a short life in a bending fatigue test.

In the case of Comparative Example C4, the range of a value of a ratio k of the cooling width L of the rail web portion to LAc1 was narrower than an appropriate range, and the residual stress of the rail web portion in the longitudinal direction became tensile. Comparative Example C4 was fractured during the test at a short life in a fatigue test of the rail web portion.

[Table 5]

Example D

Table 5 shows examples that were obtained by cooling the rail web portion of the weld zone after the welding of a rail and at least a part of a temperature range until the completion of transformation to pearlite from an austenite temperature region where the temperature of the rail web portion exceeded A3, Ae, or Acm, at a cooling rate exceeding a natural cooling rate; cooling at least a part of a pearlite transformation temperature region at a natural cooling rate or a cooling rate not higher than 2° C./s; and cooling a region of the rail web portion of the weld zone in the longitudinal direction after the completion of the transformation of the entire rail web portion of the weld zone from austenite to pearlite at a cooling rate exceeding a natural cooling rate and at a cooling rate not lower than the cooling rate of the rail foot portion.

A cooling method in this case was as follows: A region of a rail web portion in the longitudinal direction of the rail web portion, which was calculated by the product (L) of a k value of Table 5 and the width LAc1 of a rail web portion where the maximum heating temperature of the rail web portion is not lower than Ac1 in the longitudinal direction of the rail web portion, was cooled by controlling a flow rate and flow velocity of compressed air or compressed air containing water droplets; a region of a foot portion in the longitudinal direction where maximum heating temperature is not lower than Ac1 was cooled by controlling a flow rate and flow velocity of compressed air; and regions except for the above-mentioned regions were subjected to natural cooling. In short, a part of the rail was subjected to accelerated cooling.

A pearlite transformation temperature region was in the range of 650° C. to 600° C., the cooling of the middle stage included this temperature range, and a fall of temperature of 200° C. was obtained in the cooling of the rail web portion of the later stage after the completion of pearlite transformation of a temperature not higher than 600° C. Steel B of Table 1 was used as a rail to be welded.

Examples D1 to D4 are examples that were obtained by making the rail web portion be subjected to the cooling of the early stage from an austenite region to a part of a pearlite transformation temperature region, completing pearlite transformation by the cooling at a cooling rate not higher than 2° C./s or natural cooling, and performing the accelerated cooling of the rail web portion as the cooling of the later stage. In the case of Example D2, the cooling of the middle stage was natural cooling.

Examples D5 and D6 are examples that were obtained by making the rail web portion be subjected to the cooling of the early stage in a period of an austenite temperature region, performing natural cooling from an austenite temperature region until the completion of pearlite transformation as the cooling of the middle stage, and performing the accelerated cooling of the rail web portion as the cooling of the later stage.

The residual stress of the rail web portion of any example in the vertical direction (circumferential direction) was reduced as compared to Comparative Example A1 in an as-welded state. For this reason, cracks were not generated until the number of the repetitions of a load reached 2,000,000 cycles, in a fatigue test of the rail web portion. Further, the residual stress of the sole portions of the examples in the longitudinal direction was compression, and cracks were not generated in a bending fatigue test until the number of the repetitions of a load reached 2,000,000 cycles. Accordingly, it was confirmed that the examples collectively had high fatigue strength. 100% or more of the metal structure of each of the examples was a pearlite structure.

Meanwhile, in the case of Comparative Example D1, the cooling rate of the foot portion was higher than that of the rail web portion, and the residual stress of the rail web portion was not reduced. Comparative Example D1 was fractured during the test at a short life in a fatigue test of the rail web portion.

In the case of Comparative Example D2, the range of a value of a ratio k of the cooling width L of the rail web portion to LAc1 was wider than an appropriate range, and the residual stress of the foot portion in the longitudinal direction became a tensile region. Comparative Example D2 was fractured during the test at a short life in a bending fatigue test.

In the case of Comparative Example D3, the range of a value of a ratio k of the cooling width L of the rail web portion to LAc1 was narrower than an appropriate range, and the residual stress of the rail web portion in the longitudinal direction became tensile. Comparative Example D3 was fractured during the test at a short life in a fatigue test of the rail web portion.

[Table 6]

Example E

Table 6 shows examples that were obtained by performing the natural cooling of the rail foot portion in addition to satisfying the conditions of Examples A, B, and C. A pearlite transformation temperature region is in the range of 650° C. to 600° C. in natural cooling. However, when cooling is performed, a transformation temperature is changed to some extent according to a cooling rate. Normal pearlite transformation is completed at a temperature slightly lower than 600° C. The cooling temperature regions of examples, which were obtained by performing cooling from temperature ranges not lower than A3, Ae, and Acm before pearlite transformation, were to the range of 800 to 500° C. Further, the cooling temperature regions of examples, which were obtained by performing cooling after the completion of pearlite transformation, were set to the range of 500° C. to 200° C. Steel A of Table 1 was used as a rail to be welded.

The residual stress of the rail web portion of any example in the vertical direction (circumferential direction) was reduced as compared to Comparative Example A1 in an as-welded state, and the residual stress of the rail web portion in the vertical direction (circumferential direction) was further reduced averagely as compared to the examples. Cracks were not generated in a fatigue test of the rail web portion until the number of the repetitions of a load reached 2,000,000 cycles. Further, the residual stress of the sole portion in the longitudinal direction was in a compression range, and cracks were not generated in a bending fatigue test until the number of the repetitions of a load reached 2,000,000 cycles. Accordingly, it was confirmed that the examples collectively had high fatigue strength. 95% or more of the metal structure of each of the examples was a pearlite structure.

Meanwhile, in the case of Comparative Example E1, the range of a value of a ratio k of the cooling width L of the rail web portion to LAc1 was wider than an appropriate range, and the residual stress of the foot portion in the longitudinal direction became a tensile region. Comparative Example E1 was fractured during the test at a short life in a bending fatigue test.

In the case of Comparative Example E2, the cooling rate of the rail web portion exceeded 5° C./s and was high, a fraction of martensite structure of the rail web portion was 10% or more by an area ratio, and the hardness of the rail web portion abnormally increased. Comparative Example E2 was fractured during the test at a short life in a fatigue test of the rail web portion.

In the case of Comparative Example E3, the range of a value of a ratio k of the cooling width L of the rail web portion to LAc1 was narrower than an appropriate range, and the residual stress of the rail web portion in the longitudinal direction became tensile. Comparative Example E3 was fractured during the test at a short life in a fatigue test of the rail web portion.

[Table 7]

Example F

Table 7 shows examples that were obtained by cooling the rail head portion of the weld zone and at least a part of a temperature range until the completion of transformation to pearlite from an austenite temperature region exceeding A3, Ae, or Acm, at a cooling rate which exceeded a natural cooling rate and was not higher than 5° C./s, in addition to satisfying the conditions of Examples A, B, C and E. A pearlite transformation temperature region was in the range of 650° C. to 600° C. in natural cooling. However, when cooling is performed, a transformation temperature is changed to some extent according to a cooling rate. Normal pearlite transformation is completed at a temperature slightly lower than 600° C. The cooling temperature regions of examples, which were obtained by performing cooling from temperature ranges not lower than A3, Ae, and Acm before pearlite transformation, were to the range of 800° C. to 500° C. Further, the cooling temperature regions of examples, which were obtained by performing cooling after the completion of pearlite transformation, were set to the range of 500° C. to 200° C. An eutectoid or hypereutectoid heat-treated rail of Steel B or C of Table 1 was used as a rail to be welded.

The residual stress of the rail web portion of any example in the vertical direction (circumferential direction) was reduced as compared to Comparative Example A1 in an as-welded state. For this reason, cracks were not generated until the number of the repetitions of a load reached 2,000,000 cycles, in a fatigue test of the rail web portion. Further, the residual stress of the sole portions of the examples in the longitudinal direction was compression, and cracks were not generated in a bending fatigue test until the number of the repetitions of a load reached 2,000,000 cycles. Accordingly, it was confirmed that the examples collectively had high fatigue strength. 95% or more of the metal structure of each of the examples was pearlite structure.

Meanwhile, in the case of Comparative Example F1, the cooling rate of the foot portion was higher than that of the rail web portion, and the residual stress of the rail web portion was not reduced. Comparative Example F1 was fractured during the test at a short life in a fatigue test of the rail web portion.

In the case of Comparative Example F2, the range of a value of a ratio k of the cooling width L of the rail web portion to LAc1 was wider than an appropriate range, and the residual stress of the foot portion in the longitudinal direction became a tensile region. Comparative Example F2 was fractured during the test at a short life in a bending fatigue test.

In the case of Comparative Example F3, the range of a value of a ratio k of the cooling width L of the rail web portion to LAc1 was narrower than an appropriate range, and the residual stress of the rail web portion in the longitudinal direction became tensile. Comparative Example F3 was fractured during the test at a short life in a fatigue test of the rail web portion.

[Table 8]

Example G

Table 8 shows examples that were obtained by performing the natural cooling of the rail foot portion; and cooling the rail head portion of the weld zone and at least a part of a temperature range until the completion of transformation to pearlite from an austenite temperature region exceeding A3, Ae, or Acm, at a cooling rate which exceeded a natural cooling rate and was not higher than 5° C./s, in addition to satisfying the conditions of Examples D where a slow cooling period having a cooling rate of 2° C./s or less is provided at a part of the pearlite transformation temperature region. Steel C of Table 1 was used as a rail to be welded.

Examples G1 and G2 are examples that were obtained by performing the natural cooling of the foot portion; Examples G3 and G4 are examples that were obtained by performing the accelerated cooling of the rail head portion and at least a part of a temperature range until the completion of transformation to pearlite from an austenite temperature region; and Examples G5 and G6 are examples that were obtained by performing the accelerated cooling of the head portion and at least a part of a temperature range until the completion of transformation to pearlite from an austenite temperature region and performing the natural cooling of the foot portion.

The residual stress of the rail web portion of any example in the vertical direction (circumferential direction) was reduced as compared to Comparative Example A1 in an as-welded state. For this reason, cracks were not generated until the number of the repetitions of a load reached 2,000,000 cycles, in a fatigue test of the rail web portion. Further, the residual stress of the sole portions of the examples in the longitudinal direction was compression, and cracks were not generated in a bending fatigue test until the number of the repetitions of a load reached 2,000,000 cycles. Accordingly, it was confirmed that the examples collectively had high fatigue strength. 100% or more of the metal structure of each of the examples was a pearlite structure.

Meanwhile, in the case of Comparative Example G1, the cooling rate of the foot portion was higher than that of the rail web portion, and the residual stress of the rail web portion was not reduced. Comparative Example G1 was fractured during the test at a short life in a fatigue test of the rail web portion.

In the case of Comparative Example G2, the range of a value of a ratio k of the cooling width L of the rail web portion to LAc1 was wider than an appropriate range, and the residual stress of the foot portion in the longitudinal direction became a tensile region. Comparative Example G2 was fractured during the test at a short life in a bending fatigue test.

In the case of Comparative Example G3, the range of a value of a ratio k of the cooling width L of the rail web portion to LAc1 was narrower than an appropriate range, and the residual stress of the rail web portion in the longitudinal direction became tensile. Comparative Example G3 was fractured during the test at a short life in a fatigue test of the rail web portion.

Next, a cooling test of a rail weld zone, which is performed by a cooling device 10, will be described. Rail steel used in a cooling test is a US region standard 136-pound rail, and a component ratio thereof is 0.8C-0.4Si-1.0Mn-0.2Cr. Joints of rails were joined to each other by flash butt welding, so that a weld joint was formed. Air was used as a cooling fluid in the accelerated cooling of the rail weld zone. A pressure and a flow rate of air during accelerated cooling are shown in Table 9.

[Table 9]

Figure 40:
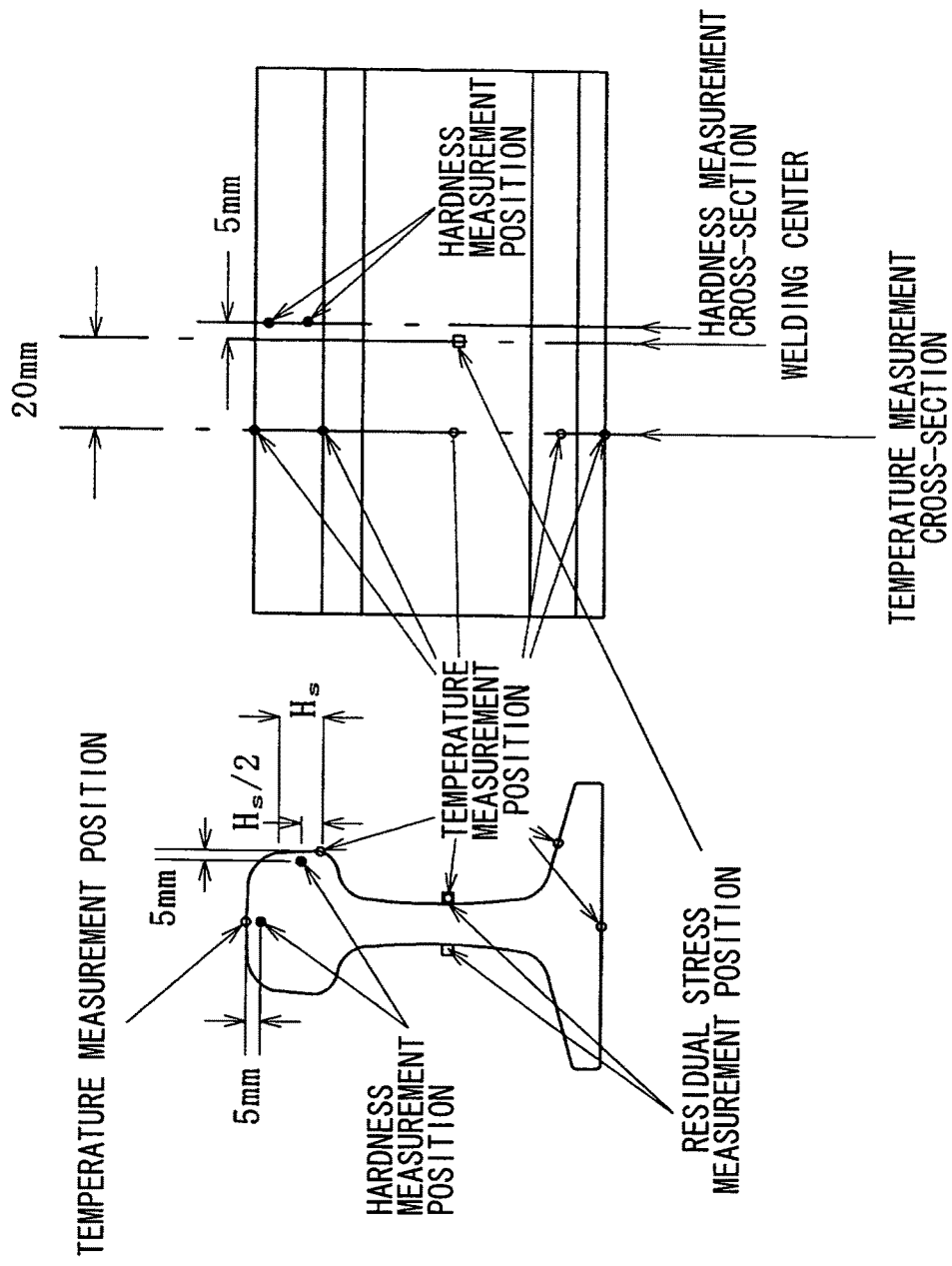
FIG. 40 is a schematic view showing positions where temperature, hardness, and residual stress are measured in a cooling test of a rail weld zone.
Figure 41A:
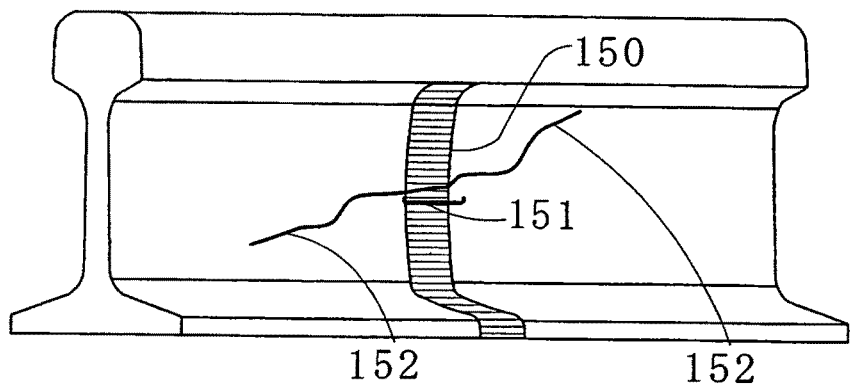
FIG. 41A is a schematic view showing fatigue damage that occurs from a rail web portion of a rail weld zone.
Figure 41B:
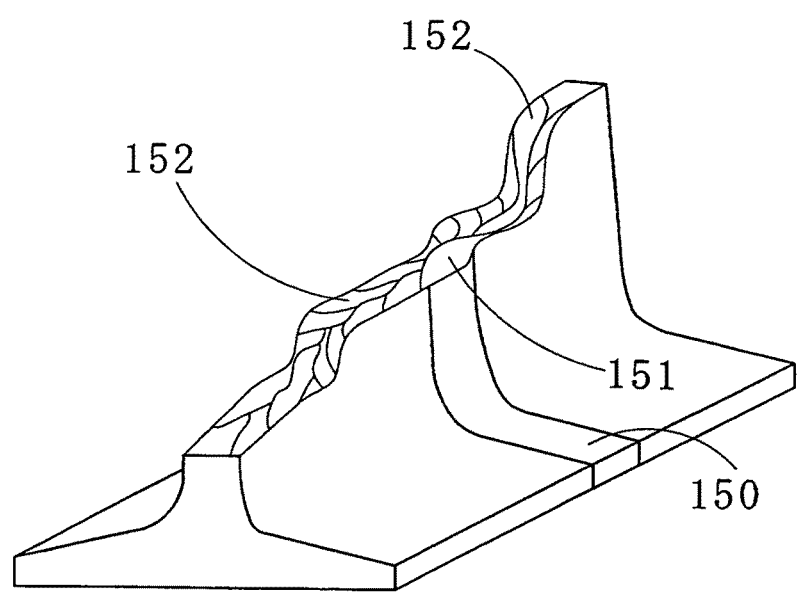
FIG. 41B is a schematic view showing a fracture surface of the damage.
Figure 42:
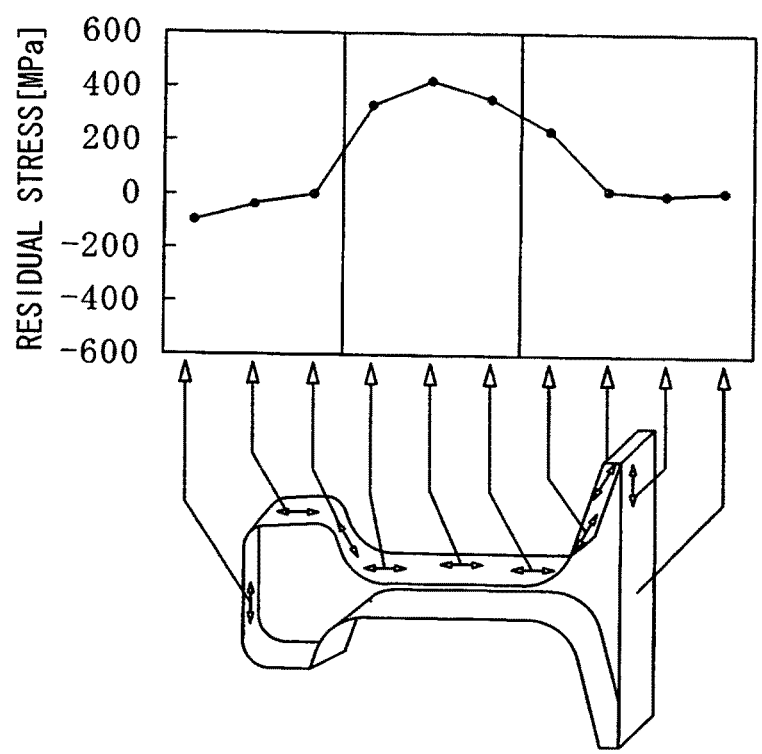
FIG. 42 is a graph showing the distribution of residual stress that exists at a peripheral portion of a rail weld zone in a circumferential direction.

Two weld joints, which were cooled under the same conditions, were prepared. Temperature, hardness, and residual stress were measured using one weld joint of the weld joints (see FIG. 40), and a test for evaluating the fatigue life of a rail web portion (hereinafter, simply referred to as a "fatigue test") was performed using the other weld joint. The temperature of a rail weld zone was measured by K thermocouples at five points at a position distant from the welding center in the axial direction of the rail by a distance of 20 mm, that is, the center of a head-top portion, a jaw portion, a portion corresponding to ½ of the height of the rail web portion, a foot-surface portion, and the center of a sole portion. Further, the hardness of a rail weld zone was measured by a Vickers hardness tester at a point below the surface of the head-top portion by a distance of 5 mm and a point below the surface of the head-top portion by a distance of 5 mm, at a position distant from the welding center in the axial direction of the rail by a distance of 5 mm.

Two-axis strain gauges having a gauge length of 2 mm were attached to both surfaces of the rail web portion (at a position corresponding to ½ of the height of the rail web portion) on a welding center line, this portion were cut out by a thickness of 5 mm×a width of 15 mm×a height of 15 mm, and residual stress was calculated from a relational expression using the difference between strain before cutting and strain after cutting.

Further, a fatigue test of the rail web portion was performed as follows: A rail weld zone was placed on a surface plate, and a load was repeatedly applied to the head portion of the rail weld zone by a pressing tool of which the end was formed of an arc-shaped protrusion. The radius of curvature of the arc-shaped protrusion was 450 mm close to the radius of curvature of a wheel. The applied load was set up to 30 tons with consideration for the fact that an actual heavy load was about 20 tons. Meanwhile, the minimum load in the repetition of a load was set to 4 tons. The frequency of the repetitions of a load was set to 2 Hz, and the test ended at the time point where cracks were generated at the weld zone.

Table 10 shows a list of test results. Meanwhile, as the results of the fatigue test, a case where fatigue cracks were not generated until the number of the repetitions of a load reached 2,000,000 cycles was represented by "GOOD", a case where fatigue cracks were not generated when the number of the repetitions of a load was not smaller than 1,000,000 cycles and smaller than 2,000,000 cycles was represented by "FAIR", and a case where fatigue cracks were not generated when the number of the repetitions of a load was smaller than 1,000,000 cycles was represented by "POOR". Further, a residual stress value in Table 10 was an average value of residual stress calculated from the strain gauges that were attached to both surfaces of the rail web portion.

[Table 10]

In the case of Example 11, when the entire head portion and the rail web portion were subjected to accelerated cooling after welding, the cooling rate of the head-side portion was adjusted to be lowered and the cooling rate of the jaw portion was adjusted to be not higher than the cooling rate of the rail web portion. The hardness of the head-top portion was the same as that of a base material rail. The hardness of the head-side portion was lowered by lowering the cooling rate of the head-side portion, but was higher than the hardness of the head-side portion that was subjected to natural cooling after welding. The residual stress of the rail web portion was improved as compared to Comparative Examples 11 to 13. In a fatigue test, fatigue cracks were generated when the number of the repetitions of a load was in the range of 1,000,000 to 2,000,000 cycles, but the fatigue performance of Example 11 was superior to that of Comparative Examples 11 to 13

In the case of Example 12, when the entire head portion and the rail web portion were subjected to accelerated cooling after welding, the cooling rate of the rail web portion was adjusted to increase and the cooling rate of the jaw portion was adjusted to be not higher than the cooling rate of the rail web portion. The hardness of the head-top portion and the hardness of the head-side portion were the same as that of a base material rail. The residual stress of the rail web portion was improved as compared to Example 11. In a fatigue test, fatigue cracks were generated when the number of the repetitions of a load was in the range of 1,000,000 to 2,000,000 cycles, but the fatigue performance of Example 12 was superior to that of Comparative Examples 11 to 13.

In the case of Example 13, when the head portion and the rail web portion were subjected to accelerated cooling after welding, air ejection holes of the head-side portion were adjusted so as to correspond to the range of ⅔ or more of the height of the head-side portion from above. The jaw portion was not subjected to accelerated cooling, but the cooling rate of Example 13 was increased as compared to Comparative Example 11 where any portion was not subjected to accelerated cooling. This was caused by heat transfer that was associated with the accelerated cooling of the head-side portion and the rail web portion. The hardness of the head-top portion was the same as that of a base material rail, and the hardness of the head-side portion was also substantially the same as that that of the base material rail. The residual stress of the rail web portion was improved as compared to Comparative Examples 11 to 13. In a fatigue test, fatigue cracks were generated when the number of the repetitions of a load was in the range of 1,000,000 to 2,000,000 cycles, but the fatigue performance of Example 13 was more excellent than that of Comparative Examples 11 to 13.

In the case of Example 14, when the head portion and the rail web portion were subjected to accelerated cooling after welding, air ejection holes of the head-side portion were adjusted so as to correspond to the range of ½ or more of the height of the head-side portion from above. The hardness of the head-top portion was the same as that of the base material rail. The hardness of the head-side portion was lowered by lowering the cooling rate of the head-side portion, but the head-side portion was significantly harder than a head-side portion that was subjected to natural cooling after welding. The residual stress of the rail web portion was improved as compared to Example 13. In a fatigue test, fatigue cracks were not generated until the number of the repetitions of a load reached 2,000,000 cycles.

Example 15 is an example where a region of the head portion, which was positioned below a lower position distant from the upper end of the head-side portion by a distance of 2 Hs/3, was covered with shield plates when the entire head portion and the rail web portion were subjected to accelerated cooling after welding. The hardness of the head-top portion was the same as that of a base material rail. The hardness of the head-side portion was lowered by lowering the cooling rate of the head-side portion, but the head-side portion was harder than a head-side portion that was subjected to natural cooling after welding. The residual stress of the rail web portion was improved as compared to Comparative Examples 11 to 13. In a fatigue test, fatigue cracks were generated when the number of the repetitions of a load was in the range of 1,000,000 to 2,000,000 cycles, but the fatigue performance of Example 15 was superior to that of Comparative Examples 11 to 13.

Example 16 is an improvement example of Example 15 where a gap between the shield plate and the rail was adjusted to be narrow so that the cooling rate of the jaw portion was lower than that of the rail web portion. The hardness of the head-side portion was lowered, but the hardness of the head-side portion was further lowered, but the head-side portion was harder than a head-side portion that was subjected to natural cooling after welding. The residual stress of the rail web portion was improved as compared to Example 15. In a fatigue test, fatigue cracks were not generated until the number of the repetitions of a load reached 2,000,000 cycles.

Example 17 is an example where air ejection holes of the head-side portion were adjusted so as to correspond to the range of ½ or more of the height of the head-side portion from above and a region of the head portion, which was positioned below a lower position distant from the upper end of the head-side portion by a distance of 2 Hs/3, was covered with shield plates when the head portion and the rail web portion were subjected to accelerated cooling after welding. The hardness of the head-top portion and the hardness of the head-side portion were the same as that of a base material rail. The residual stress of the rail web portion was significantly improved as compared to Comparative Examples 11 to 13. In a fatigue test, fatigue cracks were not generated until the number of the repetitions of a load reached 2,000,000 cycles.

In contrast, Comparative Example 11 is an example that was subjected to natural cooling after welding. The cooling rates at the respective measurement positions were in the range of 0.7 to 0.9° C./s. The hardness of the head portion was low and the residual stress of the rail web portion was in a strong tensile state of about 400 MPa. In a fatigue test, fatigue cracks were generated when the number of the repetitions of a load was smaller than 1,000,000 cycles. Comparative Example 12 is an example where the entire head portion was subjected to accelerated cooling after welding. The hardness of the head portion was the same as that of a base material rail, but the residual stress of the rail web portion deteriorated as compared to a case where the rail web portion was subjected to natural cooling after welding. In a fatigue test, fatigue cracks were generated when the number of the repetitions of a load was smaller than 1,000,000 cycles. Comparative Example 13 is an example where the entire head portion and the rail web portion were subjected to accelerated cooling after welding. The hardness of the head portion was the same as that of a base material rail, and the residual stress of the rail web portion was improved as compared to a case where the rail web portion was subjected to natural cooling after welding. In a fatigue test, fatigue cracks were generated when the number of the repetitions of a load was smaller than 1,000,000 cycles.

INDUSTRIAL APPLICABILITY

According to the invention, it is possible to efficiently manufacture a rail of which the fatigue strength of a weld zone is improved compared to the related art. For this reason, the invention has sufficient industrial applicability.

REFERENCE SIGNS LIST

1: head portion of rail
2: rail web portion of rail
3: foot portion of rail
4: head-top portion of rail
5: foot-surface portion of rail
6: rail sole
7: weld zone
8: weld bead
9: electrode
10: rail to be welded
11: weld bead formed by upset
12: trimmer
13: power source
14: mold of Thermit welding
15: crucible of Thermit welding
16: molten steel of Thermit welding
17: burner of gas pressure welding
18: trimmer of gas pressure welding
19: backing metal of enclosed arc welding
20: siding metal of enclosed arc welding
21: welding rod of metal enclosed arc welding
22: fatigue crack
23: brittle crack
24: sleeper
25: wheel
26: fatigue crack
XX, YY, ZZ: temperature distribution curve
P: load
27: surface plate
28: pressing tool
29, 29': mount
30: pressing tool
110: cooling device
111: rail
112: head portion
112a: head-top portion
112b: head-side portion
112c: jaw portion
112d: neck portion
113: rail web portion
114: foot portion
120: head portion cooling unit
121: rail web portion cooling unit
122: pedestal
123, 124: ejection section
123a, 124a: ejection hole
125: shield plate
125a: upper edge
126: hinge
128, 129: supply tube
136: electrode
137: power source
138: weld bead
139: trimmer
150: rail weld zone

TABLE 1

| | rail steel used | | | | | | | | | |
|---|---|---|---|---|---|---|---|---|---|---|
| | chemical component [wt %] | | | | hardness | | transformation temperature (equilibrium) | | | |
| | C | Si | Mn | Cr | as-rolled | heat treatment | Ac1 | Ac3 | Acm | Ae |
| A | 0.68~0.73 | 0.2~0.4 | 0.7~1.0 | <0.2 | 260~290 | | 730 | 740 | — | — |
| B | 0.78~0.83 | 0.2~0.4 | 0.7~1.0 | 0.2~0.6 | | 360~400 | 730 | — | — | 726 |
| C | 0.88~0.95 | 0.2~0.4 | 0.7~1.0 | 0.2~0.6 | | 400~450 | 730 | — | 820 | — |

TABLE 2

| No. | rail to be welded | width of weld zone [mm] (the maximum heating temperature range) | | cooling range [mm] | | | k (L/LAC1) | cooling time t (min.) | appropriate range of k | | suitability of cooling width |
|---|---|---|---|---|---|---|---|---|---|---|---|
| | | Ac1 or more (LAC1) | Ac3, Ae3 or Accm or more | head portion | rail web portion (L) | foot portion | | | upper limit (−0.1 t +1.48 +0.85) | lower limit (−0.1 t +1.48 −0.85) | |
| example A1 | A | 30 | 18 | — | 26 | 26 | 0.87 | 1.39 | 2.19 | 0.49 | OK |
| example A2 | A | 35 | 22 | — | 34 | 34 | 0.97 | 0.48 | 2.28 | 0.58 | OK |
| example A3 | A | 28 | 16 | — | 20 | 20 | 0.71 | 2.00 | 2.13 | 0.43 | OK |
| example A4 | A | 27 | 12 | — | 25 | 25 | 0.93 | 0.83 | 2.25 | 0.55 | OK |
| example A5 | A | 34 | 18 | — | 35 | 25 | 1.03 | 1.19 | 2.21 | 0.51 | OK |
| example A6 | A | 32 | 16 | — | 28 | 28 | 0.88 | 1.92 | 2.14 | 0.44 | OK |
| comparative example A1 | A | 34 | 18 | — | — | — | — | — | — | — | — |

TABLE 2-continued

| No. | rail to be welded | Ac1 | Ac3, Ae3 or Accm or more | head portion | rail web portion | foot portion | k (L/LAC1) | cooling time t (min.) | upper limit (-0.1 t +1.48 +0.85) | lower limit (-0.1 t +1.48 -0.85) | suitability |
|---|---|---|---|---|---|---|---|---|---|---|---|
| comparative example A2 | A | 28 | 12 | — | 70 | 25 | <u>2.50</u> | 1.56 | 2.17 | 0.47 | NG |
| comparative example A3 | A | 36 | 26 | — | 25 | 25 | 0.69 | 1.67 | 2.16 | 0.46 | OK |
| comparative example A4 | A | 36 | 18 | — | 25 | 25 | 0.69 | 0.68 | 2.26 | 0.56 | OK |
| comparative example A5 | A | 36 | 18 | — | 10 | 25 | <u>0.28</u> | 0.76 | 2.25 | 0.55 | NG |

| | cooling rate during cooling (after completion of pearlite transformation) [° C./s] | | residual stress [MPa] | |
|---|---|---|---|---|
| | | | circumferential direction of rail | longitudinal direction of sole |
| No. | rail web portion | foot portion | web portion | portion |
| example A1 | 3.6 | 1.6 | 322 | −119 |
| example A2 | 10.4 | 1.6 | 301 | −91 |
| example A3 | 2.5 | 1.6 | 346 | −134 |
| example A4 | 6.0 | 1.6 | 299 | −130 |
| example A5 | 4.2 | 1.6 | 315 | −128 |
| example A6 | 2.6 | 1.6 | 336 | −120 |
| comparative example A1 | natural releasing cooling | natural releasing cooling | 410 | −154 |
| comparative example A2 | 3.2 | 1.2 | 320 | 125 |
| comparative example A3 | 3.0 | 5.2 | 418 | −139 |
| comparative example A4 | 11.0 | 1.6 | 391 | −103 |
| comparative example A5 | 11.0 | 1.6 | 415 | −100 |

| | hardness of weld zone [Hv] (2 mm from welding center, surface) | | | fatigue crack generation life [×1000] | | remarks | |
|---|---|---|---|---|---|---|---|
| No. | head portion | rail web portion | foot portion | life of rail web portion | life of foot portion | rail web portion cooling temperature region | |
| example A1 | 280 | 269 | 281 | >2,000 | >2,000 | 500→200° C. | |
| example A2 | 269 | 286 | 287 | >2,000 | >2,000 | 500→200° C. | |
| example A3 | 265 | 284 | 285 | >2,000 | >2,000 | 500→200° C. | |
| example A4 | 270 | 283 | 279 | >2,000 | >2,000 | 500→200° C. | |
| example A5 | 268 | 290 | 278 | >2,000 | >2,000 | 500→200° C. | |
| example A6 | 290 | 286 | 264 | >2,000 | >2,000 | 500→200° C. | |
| comparative example A1 | 274 | 281 | 279 | 849 | >2,000 | none | as-welded |
| comparative example A2 | 277 | 281 | 278 | >2,000 | 680 | 500→200° C. | since cooling width is maximum, residual stress of sole is large tensile stress |
| comparative example A3 | 278 | 276 | 294 | 1,286 | >2,000 | 500→200° C. | since cooling of foot is strong, tensile stress of rail web is large |
| comparative example A4 | 288 | 523 | 269 | 1,480 | >2,000 | 650→200° C. | since cooling starting temperature is high, fraction of martensite is 10% or more |
| comparative example A5 | 281 | 269 | 284 | 978 | >2,000 | 500→200° C. | since width of cooling width is excessively small, tensile stress of rail web is large |

TABLE 3

| | | | | width of weld zone [mm] (the maximum heating temperature range) | | | | | appropriate range of k | | |
|---|---|---|---|---|---|---|---|---|---|---|---|
| | rail | | Ac3, Ae3 | cooling range [mm] | | | | | upper limit | lower limit | |
| No. | to be welded | Ac1 or more | or Accm or more | head portion | rail web portion | foot portion | k (L/LAC1) | cooling time t (min.) | (−0.1 t +1.48 +0.85) | (−0.1 t +1.48 −0.85) | suitability of cooling width |
| example B1 | A | 34 | 18 | — | 32 | 26 | 0.94 | 1.67 | 2.16 | 0.46 | OK |
| example B2 | A | 28 | 16 | — | 26 | 26 | 0.93 | 1.20 | 2.21 | 0.51 | OK |
| example B3 | A | 36 | 26 | — | 36 | 36 | 1.00 | 0.28 | 2.30 | 0.60 | OK |
| example B4 | A | 30 | 20 | — | 26 | 26 | 0.87 | 1.04 | 2.23 | 0.53 | OK |

TABLE 3-continued

| No. | rail to be welded | | | | | | | | | |
|---|---|---|---|---|---|---|---|---|---|---|
| comparative example B1 | A | 36 | 28 | — | 26 | 26 | 0.72 | 0.66 | 2.26 | 0.56 | OK |
| comparative example B2 | A | 44 | 32 | — | 100 | 26 | 2.27 | 2.63 | 2.07 | 0.37 | NG |
| comparative example B3 | A | 38 | 24 | — | 32 | 26 | 0.84 | 0.28 | 2.30 | 0.60 | OK |
| comparative example B4 | A | 38 | 24 | — | 10 | 26 | 0.26 | 2.00 | 2.13 | 0.43 | NG |

| | cooling rate during cooling (start from temperature exceeding A3, Ae, Acm) [°C./s] | | residual stress [MPa] | |
|---|---|---|---|---|
| No. | rail web portion | foot portion | circumferential direction of rail web portion | longitudinal direction of sole |
| example B1 | 4.0 | 1.4 | 306 | −117 |
| example B2 | 2.5 | 1.4 | 328 | −123 |
| example B3 | 3.6 | 1.4 | 346 | −106 |
| example B4 | 2.4 | 1.4 | 331 | −129 |
| comparative example B1 | 7.6 | 2.0 | 374 | −118 |
| comparative example B2 | 1.9 | 1.6 | 365 | 125 |
| comparative example B3 | 2.4 | 1.5 | 402 | −131 |
| comparative example B4 | 2.5 | 1.5 | 430 | −120 |

| | hardness of weld zone [Hv] (2 mm from welding center, surface) | | | fatigue crack generation life [×1000] | | remarks | |
|---|---|---|---|---|---|---|---|
| No. | head portion | rail web portion | foot portion | life of rail web portion | life of foot portion | rail web portion cooling temperature region from temperature not lower than A3, Ae, Acm | |
| example B1 | 274 | 406 | 342 | >2,000 | >2,000 | 900→500° C. | cooling until completion of pearlite transformation from austenite region |
| example B2 | 281 | 361 | 370 | >2,000 | >2,000 | 800→620° C. | cooling until middle of pearlite transformation from austenite region |
| example B3 | 286 | 325 | 341 | >2,000 | >2,000 | 700→640° C. | cooling before pearlite transformation (until Ar3 or less) from austenite region |
| example B4 | 290 | 274 | 284 | >2,000 | >2,000 | 900→750° C. | cooling before pearlite transformation (until Ar3 or more) from austenite region |
| comparative example B1 | 268 | 608 | 374 | 1,745 | >2,000 | 800→500° C. | since cooling rate of rail web is excessively high, fraction of martensite of rail web is 10% or more |
| comparative example B2 | 271 | 283 | 802 | >2,000 | 698 | 800→500° C. | since cooling width is excessively large, residual stress of sole is large tensile stress |
| comparative example B3 | 282 | 275 | 374 | 1,240 | >2,000 | 800→760°C. | cooling ending temperature is high, fall of temperature is small, effect is small |
| comparative example B4 | 273 | 284 | 369 | 1,046 | >2,000 | 800→500° C. | since width of cooling width is excessively small, tensile stress of rail web is large |

TABLE 4

| | | width of weld zone [mm] (the maximum heating temperature range) | | cooling range [mm] | | | | | appropriate range of k | | |
|---|---|---|---|---|---|---|---|---|---|---|---|
| No. | rail to be welded | Ac1 or more | Ac3, Ae3, or Accm or more | head portion | rail web portion | foot portion | k (L/LAC1) | cooling time t (min.) | upper limit (−0.1 t +1.48 +0.85) | lower limit (−0.1 t +1.48 −0.85) | suitability of cooling width |
| example C1 | A | 36 | 22 | — | 32 | 32 | 0.89 | 4.52 | 1.88 | 0.18 | OK |
| example C2 | A | 32 | 14 | — | 32 | 32 | 1.00 | 2.03 | 2.13 | 0.43 | OK |
| example C3 | A | 26 | 8 | — | 26 | 26 | 1.00 | 1.29 | 2.20 | 0.50 | OK |
| example C4 | A | 42 | 26 | — | 42 | 32 | 1.00 | 2.85 | 2.04 | 0.34 | OK |
| example C5 | A | 36 | 18 | — | 32 | 32 | 0.89 | 3.63 | 1.97 | 0.27 | OK |
| example C6 | A | 26 | 22 | — | 32 | 23 | 1.23 | 2.56 | 2.07 | 0.37 | OK |

TABLE 4-continued

| | | | | | | | | | | |
|---|---|---|---|---|---|---|---|---|---|---|
| comparative example C1 | A | 32 | 16 | — | 32 | 32 | 1.00 | 2.22 | 2.11 | 0.41 | OK |
| comparative example C2 | A | 40 | 26 | — | 26 | 26 | 0.65 | 2.86 | 2.04 | 0.34 | OK |
| comparative example C3 | A | 36 | 18 | — | 80 | 32 | 2.22 | 3.10 | 2.02 | 0.32 | NG |
| comparative example C4 | A | 36 | 18 | — | 8 | 26 | 0.22 | 3.14 | 2.02 | 0.32 | NG |

| | cooling rate during cooling [° C./s] | | | | residual stress[MPa] | |
|---|---|---|---|---|---|---|
| | rail web portion | | foot portion | | | |
| No. | (start from temperature exceeding A3, Ae, Acm) | (after completion of pearlite transformation) | (start temperature exceeding 3, Ae, Acm) | (after completion of pearlite transformation) | circumferential direction of rail web portion | longitudinal direction of sole |
| example C1 | 2.0 | 4.2 | 2.0 | 1.6 | 267 | −121 |
| example C2 | 2.4 | 6.4 | 2.0 | 2.2 | 272 | −126 |
| example C3 | 2.2 | 6.0 | 1.5 | 1.8 | 274 | −119 |
| example C4 | 1.8 | 5.0 | 1.4 | 2.2 | 265 | −127 |
| example C5 | 1.9 | 5.0 | 1.4 | 2.2 | 284 | −126 |
| example C6 | 2.8 | 3.0 | 1.5 | 1.4 | 288 | −122 |
| comparative example C1 | 9.0 | 3.0 | 2.2 | 2.0 | 274 | −116 |
| comparative example C2 | 3.6 | 3.4 | 4.0 | 6.2 | 467 | −143 |
| comparative example C3 | 3.0 | 3.5 | 2.2 | 2.5 | 267 | 118 |
| comparative example C4 | 3.0 | 3.4 | 2.3 | 2.1 | 438 | −105 |

| | hardness of weld zone [Hv] | | | fatigue crack generation life | | remarks | |
|---|---|---|---|---|---|---|---|
| | (2 mm from welding center, surface) | | | [×1000] | | rail web portion | |
| | | | | life of | life of | cooling temperature | (the rail web portion cooling temperature |
| No. | head portion | rail web portion | foot portion | rail web portion | foot portion | region from A3, Ae, Acm or more | region after pearlite transformation is 500→200° C.) |
| example C1 | 284 | 374 | 390 | >2,000 | >2,000 | 900→500° C. | cooling until completion of pearlite transformation from austenite region |
| example C2 | 275 | 356 | 346 | >2,000 | >2,000 | 800→620° C. | cooling until the middle of pearlite transformation from austenite region |
| example C3 | 286 | 330 | 335 | >2,000 | >2,000 | 700→640° C. | cooling before pearlite transformation (until Ar3 or less) from austenite region |
| example C4 | 284 | 371 | 358 | >2,000 | >2,000 | 800→600° C. | |
| example C5 | 269 | 384 | 340 | >2,000 | >2,000 | 800→500° C. | |
| example C6 | 275 | 281 | 283 | >2,000 | >2,000 | 900→750° C. | cooling before pearlite transformation (until Ar3 or more) from austenite region |
| comparative example C1 | 281 | 720 | 284 | 1,287 | >2,000 | 800→500° C. | since cooling rate of rail web is excessively high, fraction of martensite of rail web is 10% or more |
| comparative example C2 | 276 | 411 | 276 | 516 | >2,000 | 800→500° C. | since cooling of foot is stronger than cooling of rail web, tensile stress of rail web is large |
| comparative example C3 | 290 | 405 | 274 | >2,000 | 608 | 800→500° C. | since cooling width is excessively large, residual stress of sole is large tensile stress |
| comparative example C4 | 276 | 428 | 281 | 1,057 | >2,000 | 800→500° C. | since cooling width is excessively small, tensile stress of rail web is large |

TABLE 5

| No. | rail to be welded | width of weld zone [mm] (the maximum heating temperature range) Ac1 or more | width of weld zone [mm] (the maximum heating temperature range) Ac3, Ae3, or Accm or more | cooling range [mm] head portion | cooling range [mm] rail web portion | cooling range [mm] foot portion | k (L/LAC1) | cooling time t (min.)* | appropriate range of k upper limit (−0.1 t +1.48 +0.85) | appropriate range of k lower limit (−0.1 t +1.48 −0.85) | suitability of cooling width |
|---|---|---|---|---|---|---|---|---|---|---|---|
| example D1 | B | 35 | 21 | — | 75 | 30 | 2.14 | 1.53 | 2.18 | 0.48 | OK |
| example D2 | B | 33 | 15 | — | 50 | 30 | 1.52 | 1.75 | 2.16 | 0.46 | OK |
| example D3 | B | 27 | 7 | — | 26 | 25 | 0.96 | 1.00 | 2.23 | 0.53 | OK |
| example D4 | B | 42 | 25 | — | 55 | 30 | 1.31 | 1.32 | 2.20 | 0.50 | OK |
| example D5 | B | 25 | 19 | — | 20 | 20 | 0.80 | 1.83 | 2.15 | 0.45 | OK |
| example D6 | B | 27 | 22 | — | 32 | 20 | 1.19 | 2.23 | 2.11 | 0.41 | OK |
| comparative example D1 | B | 41 | 25 | — | 25 | 25 | 0.61 | 1.85 | 2.14 | 0.44 | OK |
| comparative example D2 | B | 37 | 18 | — | 54 | 30 | 1.46 | 1.89 | 2.14 | 0.44 | NG |
| comparative example D3 | B | 37 | 17 | — | 8 | 30 | 0.22 | 1.76 | 2.15 | 0.45 | NG |

| No. | cooling rate during cooling [°C./s] rail web portion early cooling (start from temperature exceeding A3, Ae, Acm) | cooling rate during cooling [°C./s] rail web portion middle cooling | cooling rate during cooling [°C./s] rail web portion later cooling (after completion of pearlite transformation) | cooling rate during cooling [°C./s] foot portion early cooling (start from temperature exceeding A3, Ae,) | cooling rate during cooling [°C./s] foot portion middle cooling | cooling rate during cooling [°C./s] foot portion later cooling (after completion of pearlite transformation) | residual stress [MPa] circumferential direction of rail web portion | residual stress [MPa] longitudinal direction of sole |
|---|---|---|---|---|---|---|---|---|
| example D1 | 5.5 | 1.1 | 4.3 | 2.1 | natural releasing cooling | 1.5 | 265 | −115 |
| example D2 | 2.5 | natural releasing cooling | 6.1 | 1.9 | natural releasing cooling | 2.1 | 270 | −126 |
| example D3 | 2.3 | 1.5 | 5.9 | 1.4 | 1.0 | 1.7 | 274 | −133 |
| example D4 | 5.2 | 1.3 | 4.9 | 1.5 | 1.0 | 1.9 | 266 | −125 |
| example D5 | 1.9 | natural releasing cooling | 4.8 | 1.6 | natural releasing cooling | 2.0 | 290 | −109 |
| example D6 | 2.8 | natural releasing cooling | 3.2 | 1.6 | natural releasing cooling | 1.5 | 285 | −152 |
| comparative example D1 | 3.7 | 1.1 | 3.5 | <u>4.1</u> | natural releasing cooling | <u>6.3</u> | 450 | −144 |
| comparative example D2 | 3.1 | natural releasing cooling | 3.6 | 2.1 | natural releasing cooling | 2.4 | 269 | 120 |
| comparative example D3 | 3.1 | 1.6 | 3.5 | 2.4 | 1.0 | 2.2 | 423 | −99 |

| No. | hardness of weld zone [Hv] (2 mm from welding center, surface) head portion | hardness of weld zone [Hv] rail web portion | hardness of weld zone [Hv] foot portion | fatigue crack generation life [×1000] life of rail web portion | fatigue crack generation life [×1000] life of foot portion | remarks temperature region of early cooling | remarks temperature region of middle cooling | remarks temperature region of later cooling | remarks |
|---|---|---|---|---|---|---|---|---|---|
| example D1 | 280 | 376 | 379 | >2,000 | >2,000 | 900→650° C. | 650→580° C. | 580→380° C. | |
| example D2 | 169 | 358 | 341 | >2,000 | >2,000 | 800→620° C. | 620→550° C. | 550→350° C. | |
| example D3 | 290 | 360 | 340 | >2,000 | >2,000 | 700→640° C. | 640→500° C. | 500→300° C. | |
| example D4 | 270 | 403 | 361 | >2,000 | >2,000 | 800→600° C. | 600→500° C. | 530→330° C. | |
| example D5 | 272 | 296 | 346 | >2,000 | >2,000 | 800→670° C. | 640→600° C. | 600→400° C. | |
| example D6 | 278 | 280 | 284 | >2,000 | >2,000 | 900→700° C. | 700→500° C. | 500→300° C. | |
| comparative example D1 | 269 | 402 | 280 | 497 | >2,000 | 800→600° C. | 600→500° C. | 500→300° C. | since cooling of foot is stronger than cooling of rail web, tensile |

TABLE 5-continued

| | | | | | | | | | |
|---|---|---|---|---|---|---|---|---|---|
| comparative example D2 | 289 | 400 | 275 | >2,000 | 560 | 800→620° C. | 620→570° C. | 570→370° C. | stress of rail web is large since cooling width is excessively large, residual stress of sole is large tensile stress |
| comparative example D3 | 280 | 409 | 278 | 951 | >2,000 | 800→650° C. | 650→550° C. | 550→350° C. | since cooling width is excessively salll, tensile stress of rail web is large |

*Not including cooling time in middle cooling

TABLE 6

| | | width of weld zone [mm] | | | | | | appropriate range of k | | |
|---|---|---|---|---|---|---|---|---|---|---|
| | rail | (the maximum heating temperature range) | | cooling range [mm] | | | | cooling | upper limit (−0.1 t +1.48 +0.85) | lower limit (−0.1 t +1.48 −0.85) | |
| No. | to be welded | Ac1 or more | Ac3, Ae3, or Accm or more | head portion | rail web portion | foot portion | k (L/LAC1) | time t (min.) | | | suitability of cooling width |
| example E1 | A | 36 | 22 | — | 32 | — | 1.45 | 2.50 | 2.08 | 0.38 | OK |
| example E2 | A | 32 | 16 | — | 26 | — | 0.81 | 1.25 | 2.21 | 0.51 | OK |
| example E3 | A | 42 | 26 | — | 50 | — | 1.19 | 2.76 | 2.05 | 0.35 | OK |
| example E4 | A | 46 | 32 | — | 36 | — | 0.78 | 1.86 | 2.14 | 0.44 | OK |
| example E5 | A | 26 | 14 | — | 18 | — | 0.69 | 2.50 | 2.08 | 0.38 | OK |
| comparative example E1 | A | 36 | 18 | — | 50 | — | 1.39 | 1.67 | 2.16 | 0.46 | NG |
| comparative example E2 | A | 36 | 18 | — | 32 | — | 0.89 | 0.38 | 2.29 | 0.59 | OK |
| comparative example E3 | A | 26 | 16 | — | 8 | — | 0.31 | 2.17 | 2.11 | 0.41 | NG |

| | cooling rate during cooling [° C./s] | | | | residual stress [MPa] | |
|---|---|---|---|---|---|---|
| | rail web portion | | foot portion | | circumferential direction of rail web portion | longitudinal direction of sole |
| No. | (start from temperature exceeding A3, Ae, Acm) | (after completion of pearlite transformation) | (start from temperature exceeding A3, Ae, Acm) | (after completion of pearlite transformation) | | |
| example E1 | natural releasing cooling | 2.0 | natural releasing cooling | natural releasing cooling | 306 | −110 |
| example E2 | 2.4 | natural releasing cooling | natural releasing cooling | natural releasing cooling | 310 | −85 |
| example E3 | 1.8 | 5.5 | natural releasing cooling | natural releasing cooling | 220 | −95 |
| example E4 | 3.5 | 5.5 | natural releasing cooling | natural releasing cooling | 215 | −94 |
| example E5 | 2.0 | 6.0 | natural releasing cooling | natural releasing cooling | 226 | −102 |
| comparative example E1 | natural releasing cooling | 3.0 | natural releasing cooling | natural releasing cooling | 270 | 164 |
| comparative example E2 | 8.0 | natural releasing cooling | natural releasing cooling | natural releasing cooling | 325 | −102 |
| comparative example E3 | 2.4 | 6.4 | natural releasing cooling | natural releasing cooling | 409 | −110 |

| | hardness of weld zone [Hv] (2 mm from welding center, syrface) | | | fatigue crack generation life [×1000] | | remarks (the rail web portion cooling temperature region from A1, Ae, Acm or more is 800→500° C.) (the rail web portion cooling temperature region after pearlite transformation is 500→200° C.) |
|---|---|---|---|---|---|---|
| No. | head portion | rail web portion | foot portion | life of rail web portion | life of foot portion | |
| example E1 | 284 | 280 | 281 | >2,000 | >2,000 | |
| example E2 | 276 | 359 | 273 | >2,000 | >2,000 | |
| example E3 | 275 | 384 | 280 | >2,000 | >2,000 | |
| example E4 | 279 | 398 | 280 | >2,000 | >2,000 | |
| example E5 | 281 | 389 | 268 | >2,000 | >2,000 | |
| comparative example E1 | 269 | 282 | 290 | >2,000 | 872 | since cooling width is excessively large, residual stress of sole is large tensile stress |

TABLE 6-continued

| | | | | | | |
|---|---|---|---|---|---|---|
| comparative example E2 | 296 | 602 | 278 | 1,776 | >2,000 | since cooling rate of rail web is excessively high, fraction of martensite of rail web is 10% or more |
| comparative example E3 | 271 | 381 | 277 | 989 | >2,000 | since cooling width is excessively small, tensile stress of rail web is large |

TABLE 7

| | | width of weld zone [mm] | | | | | | | appropriate range of k | | |
|---|---|---|---|---|---|---|---|---|---|---|---|
| | rail | the maximum heating temperature range | | cooling range [mm] | | | | | upper limit (−0.1t | lower limit (−0.1t | |
| No. | to be welded | Ac1 or more | Ac3, Ae3, or Accm or more | head portion | rail web portion | foot portion | k (L/LAC1) | cooling time t (min.) | +1.48 +0.85) | +1.48 −0.85) | suitability of cooling width |
| example F1 | B | 36 | 22 | 60 | 36 | 26 | 1.00 | 1.88 | 2.14 | 0.44 | OK |
| example F2 | B | 32 | 16 | 40 | 32 | 32 | 1.00 | 3.29 | 2.00 | 0.30 | OK |
| example F3 | C | 42 | 26 | 40 | 36 | 32 | 0.86 | 4.86 | 1.84 | 0.14 | OK |
| example F4 | C | 36 | 22 | 30 | 28 | — | 0.78 | 1.20 | 2.21 | 0.51 | OK |
| example F5 | B | 46 | 32 | 50 | 32 | — | 0.70 | 4.63 | 1.87 | 0.17 | OK |
| example F6 | B | 36 | 18 | 50 | 32 | — | 0.89 | 4.02 | 1.93 | 0.23 | OK |
| comparative example F1 | C | 36 | 18 | 50 | 14 | 32 | 0.39 | 4.02 | 1.93 | 0.23 | OK |
| comparative example F2 | C | 36 | 18 | 60 | 82 | — | 2.28 | 1.50 | 2.18 | 0.48 | NG |
| comparative example F3 | B | 36 | 18 | 60 | 12 | — | 0.33 | 1.50 | 2.18 | 0.48 | NG |

| | cooling rate during cooling [° C./s] | | | | | | | |
|---|---|---|---|---|---|---|---|---|
| | head portion | rail web portion | | foot portion | | residual stress [MPa] | | |
| | (start | (start | | (start | | | | |
| No. | from temperature exceeding A3, Ae, Acm) | from temperature exceeding A3, Ae, Acm) | (after completion of pearlite transformation) | from temperature exceeding A3, Ae, Acm) | (after completion of pearlite transformation) | circumferential direction of rail web portion | longitudinal direction of sole | |
| example F1 | 1.6 | natural releasing cooling | 3.0 | natural releasing cooling | 2.0 | 320 | −123 | |
| example F2 | 4.2 | 2.0 | natural releasing cooling | 1.2 | natural releasing cooling | 345 | −125 | |
| example F3 | 1.6 | 1.8 | 4.0 | 1.2 | 2.0 | 280 | −123 | |
| example F4 | 2.5 | natural releasing cooling | 2.5 | natural releasing cooling | natural releasing cooling | 269 | −85 | |
| example F5 | 1.8 | 1.8 | natural releasing cooling | natural releasing cooling | natural releasing cooling | 321 | −95 | |
| example F6 | 2.2 | 2.0 | 6.0 | natural releasing cooling | natural releasing cooling | 228 | −97 | |
| comparative example F1 | 2.2 | 2.0 | 3.8 | 1.4 | 6.0 | 472 | −157 | |
| comparative example F2 | 2.0 | natural releasing cooling | 2.0 | natural releasing cooling | natural releasing cooling | 290 | 146 | |
| comparative example F3 | 2.0 | natural releasing cooling | 2.0 | natural releasing cooling | natural releasing cooling | 445 | −129 | |

| | hardness of weld zone [Hv] | | | fatigue crack generation life [×1000] | | remarks (the rail web portion cooling temperature region from A1, Ae, Acm or more is 800→500° C.) |
|---|---|---|---|---|---|---|
| | (2 mm from welding center, surface) | | | life of | life of | (the rail web portion cooling temperature |
| No. | head portion | rail web portion | foot portion | rail web portion | foot portion | region after pearlite transformation is 500→200° C.) |
| example F1 | 371 | 277 | 284 | >2,000 | >2,000 | |
| example F2 | 428 | 382 | 351 | >2,000 | >2,000 | |
| example F3 | 374 | 390 | 356 | >2,000 | >2,000 | |
| example F4 | 402 | 278 | 284 | >2,000 | >2,000 | |
| example F5 | 384 | 378 | 281 | >2,000 | >2,000 | |
| example F6 | 410 | 379 | 277 | >2,000 | >2,000 | |
| comparative example F1 | 376 | 381 | 375 | 425 | >2,000 | since cooling of foot is stronger than cooling of rail web, tensile stress of rail web is large |
| comparative example F2 | 375 | 281 | 276 | >2,000 | 1,036 | since cooling width is excessively large, residual stress of sole is large tensile stress |
| comparative example F3 | 386 | 275 | 279 | 1,536 | >2,000 | since cooling width is excessively salll, tensile stress of rail web is large |

TABLE 8

| No. | width of weld zone [mm] rail to be welded | (the maximum heating temperature range) Ac1 or more | (the maximum heating temperature range) Ac3, Ae3, or Accm or more | cooling range [mm] head portion | cooling range [mm] rail web portion | cooling range [mm] foot portion | cooling k (L/LAC1) | cooling time t (min.)* | appropriate range of k upper limit (−0.1 t +1.48 +0.85) | appropriate range of k lower limit (−0.1 t +1.48 −0.85) | suitability of cooling width |
|---|---|---|---|---|---|---|---|---|---|---|---|
| example G1 | C | 37 | 16 | — | 44 | — | 1.19 | 0.96 | 2.23 | 0.53 | OK |
| example G2 | C | 30 | 16 | — | 38 | — | 1.27 | 2.01 | 2.13 | 0.43 | OK |
| example G3 | C | 35 | 21 | 32 | 60 | 30 | 1.71 | 1.68 | 2.16 | 0.46 | OK |
| example G4 | C | 27 | 22 | 19 | 19 | 25 | 0.70 | 2.71 | 2.06 | 0.36 | OK |
| example G5 | C | 33 | 15 | 32 | 32 | — | 0.97 | 2.26 | 2.10 | 0.40 | OK |
| example G6 | C | 42 | 25 | 52 | 52 | — | 1.24 | 1.83 | 2.15 | 0.45 | OK |
| comparative example G1 | C | 42 | 25 | — | 25 | 30 | 0.60 | 2.39 | 2.09 | 0.39 | OK |
| comparative example G2 | C | 36 | 20 | — | 100 | — | 2.78 | 2.29 | 2.10 | 0.40 | NG |
| comparative example G3 | C | 37 | 16 | 8 | 8 | — | 0.22 | 1.81 | 2.15 | 0.45 | NG |

| No. | cooling rate during cooling [° C./s] head portion early cooling (start from temperature exceeding A3, Ae, Acm) | rail web portion early cooling (start from temperature exceeding A3, Ae, Acm) | rail web portion middle cooling | rail web portion later cooling (after completion of pearlite transformation) | foot portion early cooling (start from temp. exceeding A3, Ae, Acm) | foot portion middle cooling | foot portion later cooling (after completion of pearlite transformation) | residual stress [MPa] circumferential direction of rail web portion | residual stress [MPa] longitudinal direction of sole |
|---|---|---|---|---|---|---|---|---|---|
| example G1 | natural releasing cooling | 2.5 | natural releasing cooling | 5.9 | natural releasing cooling | natural releasing cooling | natural releasing cooling | 248 | −122 |
| example G2 | natural releasing cooling | 1.6 | 1.2 | 5.1 | natural releasing cooling | natural releasing cooling | natural releasing cooling | 263 | −136 |
| example G3 | 1.8 | 4.8 | 1.2 | 4.1 | 2.8 | natural releasing cooling | 3.6 | 326 | −129 |
| example G4 | 2.8 | 2.0 | natural releasing cooling | 3.2 | 1.8 | natural releasing cooling | 1.4 | 291 | −128 |
| example G5 | 2.7 | 1.8 | natural releasing cooling | 5.6 | natural releasing cooling | natural releasing cooling | natural releasing cooling | 218 | −140 |
| example G6 | 2.1 | 3.5 | natural releasing cooling | 3.8 | natural releasing cooling | natural releasing cooling | natural releasing cooling | 230 | −125 |
| comparative example G1 | natural releasing cooling | 2.6 | natural releasing cooling | 3.0 | 3.8 | 1.2 | 5.5 | 462 | −128 |
| comparative example G2 | natural releasing cooling | 1.9 | natural releasing cooling | 4.7 | natural releasing cooling | natural releasing cooling | natural releasing cooling | 405 | 141 |
| comparative example G3 | 2.5 | 3.0 | 1.2 | 3.4 | natural releasing cooling | natural releasing cooling | natural releasing cooling | 437 | −120 |

| No. | hardness of weld zone [Hv] (2 mm from welding center, surface) head portion | rail web portion | foot portion | fatigue crack generation life [×1000] life of rail web portion | life of foot portion | remarks temperature region of early cooling | temperature region of middle cooling | temperature region of later cooling | remarks |
|---|---|---|---|---|---|---|---|---|---|
| example G1 | 298 | 352 | 269 | >2,000 | >2,000 | 700→640° C. | 640→500° C. | 500→300° C. | |
| example G2 | 290 | 361 | 274 | >2,000 | >2,000 | 800→670° C. | 640→600° C. | 600→400° C. | |
| example G3 | 404 | 351 | 300 | >2,000 | >2,000 | 900→650° C. | 650→580° C. | 580→380° C. | |
| example G4 | 436 | 289 | 318 | >2,000 | >2,000 | 900→700° C. | 700→500° C. | 500→300° C. | |
| example G5 | 438 | 364 | 287 | >2,000 | >2,000 | 800→620° C. | 620→550° C. | 550→350° C. | |
| example G6 | 425 | 394 | 281 | >2,000 | >2,000 | 800→600° C. | 600→500° C. | 530→330° C. | |
| comparative example G1 | 302 | 399 | 356 | 604 | >2,000 | 800→600° C. | 600→500° C. | 500→300° C. | since cooling of foot is stronger than cooling of rail web, tensile stress of rail web is large |

TABLE 8-continued

| | | | | | | | | | |
|---|---|---|---|---|---|---|---|---|---|
| comparative example G2 | 285 | 402 | 281 | >2,000 | 812 | 800→620° C. | 620→570° C. | 570→370° C. | since cooling width is excessively large, residual stress of sole is large tensile stress |
| comparative example G3 | 436 | 416 | 277 | 489 | >2,000 | 800→650° C. | 650→550° C. | 550→350° C. | since cooling width is excessively small, tensile stress of rail web is large |

*Not including cooling time in middle cooling

TABLE 9

| portion | pressure[kPa] | flow rate[Nm³/Hr] |
|---|---|---|
| head portion | 50-100 | 40-90 |
| raile web portion | 2-100 | 20-250 |

TABLE 10

| specimen | portion | cooling temperature, cooling rate [° C./s] | | | | | | hardness [Hv] | | residual stress of rail web portion [MPa] | result of fatugue test |
|---|---|---|---|---|---|---|---|---|---|---|---|
| | | head-top portion | head-side portion | jaw portion | rail web portion | foot-surface portion | sole portion | head-top portion | head-side portion | | |
| example 11 | cooling range | entire | entire | entire | entire | none | none | 400 | 330 | 350 | FAIR |
| | cooling rate | 2.0 | 1.2 | 1.8 | 2.0 | 0.8 | 0.7 | | | | |
| example 12 | cooling range | entire | entire | entire | entire | none | none | 400 | 400 | 350 | FAIR |
| | cooling rate | 2.0 | 2.0 | 2.5 | 2.7 | 0.9 | 0.8 | | | | |
| example 13 | cooling range | entire | upper ⅔ | none | entire | none | none | 400 | 385 | 340 | FAIR |
| | cooling rate | 2.0 | 1.7 | 1.6 | 2.0 | 0.8 | 0.7 | | | | |
| example 14 | cooling range | entire | upper ½* | none | entire | none | none | 400 | 360 | 290 | GOOD |
| | cooling rate | 2.0 | 1.4 | 1.2 | 2.0 | 0.8 | 0.7 | | | | |
| example 15 | cooling range | entire | entire* | entire* | entire | none | none | 400 | 330 | 320 | FAIR |
| | cooling rate | 2.0 | 1.3 | 1.8 | 2.0 | 0.8 | 0.7 | | | | |
| example 16 | cooling range | entire | entire* | entire* | entire | none | none | 400 | 320 | 280 | GOOD |
| | cooling rate | 2.0 | 1.3 | 1.0 | 2.0 | 0.8 | 0.7 | | | | |
| example 17 | cooling range | entire | upper ½* | none* | entire | none | none | 400 | 390 | 250 | GOOD |
| | cooling rate | 2.0 | 1.8 | 1.0 | 2.0 | 0.8 | 0.7 | | | | |
| comparative example 11 | cooling range | none | none | none | none | none | none | 310 | 300 | 400 | POOR |
| | cooling rate | 0.7 | 0.7 | 0.9 | 0.7 | 0.7 | 0.7 | | | | |
| comparative example 12 | cooling range | entire | entire | entire | none | none | none | 400 | 400 | 450 | POOR |
| | cooling rate | 2.0 | 2.0 | 3.0 | 0.7 | 0.7 | 0.7 | | | | |
| comparative example 13 | cooling range | entire | entire | entire | entire | none | none | 400 | 400 | 370 | POOR |
| | cooling rate | 2.0 | 2.0 | 3.0 | 2.0 | 0.7 | 0.7 | | | | |

*shield plates are provided at a region of the head portion positioned below a lower position distant from the upper end of the head-side portion by a distance of 2Hs/3.

The invention claimed is:

1. A method of cooling a rail weld zone having a temperature distribution in an axial direction of a rail after welding of the rail has been completed whereby the rail weld zone comprises an Ac1 heated region at a temperature not lower than a starting temperature Ac1 of transformation from pearlite to austenite, and an Ac3 heated region having a temperature not lower than a completion temperature Ac3 of the transformation, the method comprising:
cooling a rail web portion cooling region of the rail weld zone in a temperature range completing the transformation from austenite to pearlite, in a first rail web portion cooling;
cooling the rail web portion cooling region in a second rail web portion cooling;
cooling a foot portion of the rail weld zone in a foot portion cooling; and
cooling a head portion of the rail weld zone in a head portion cooling, wherein, when a cooling time of the first and second rail web portion cooling is t minutes, a k value, obtained by dividing a width L (mm) of the rail web portion cooling region by a width LAc1 (mm) of the Ac1 region, satisfies an expression represented as $-0.1t+0.63 \leq k \leq -0.1t+2.33$.

2. The method of cooling the rail weld zone according to claim 1, further comprising:
cooling the rail web portion cooling region at a cooling rate exceeding a natural cooling rate and not higher than 5° C./s in the first rail web portion cooling; and
cooling the rail web portion cooling region at a cooling rate exceeding a natural cooling rate and not lower than a cooling rate of the foot portion in the second rail web portion cooling.

3. The method of cooling the rail weld zone according to claim 1, further comprising:
cooling the rail web portion cooling region at a cooling rate exceeding a natural cooling rate and not lower than a cooling rate of the foot portion in the second rail web portion cooling.

4. The method of cooling the rail weld zone according to claim 1, further comprising:
cooling the rail web portion cooling region at a cooling rate exceeding a natural cooling rate and not higher than 5° C./s in the first rail web portion cooling.

5. The method of cooling the rail weld zone according to claim 1, further comprising:
in the first rail web portion cooling, cooling of an austenite temperature region comprises a first former rail web portion cooling and a first latter rail web portion cooling that continues cooling the rail web portion cooling region after the first former rail web portion cooling in a temperature range completing the transformation to pearlite;

cooling the rail web portion cooling region at a cooling rate exceeding a natural cooling rate and not lower than a cooling rate of the foot portion, in the first former rail web portion cooling;

cooling the rail web portion cooling region at a natural cooling rate or at a cooling rate not higher than 2° C./s in the first latter rail web portion cooling; and cooling the rail web portion cooling region at a cooling rate exceeding a natural cooling rate and not lower than a cooling rate of the foot portion, in the second rail web portion cooling.

6. The method of cooling the rail weld zone according to claim 1, further comprising cooling the foot portion at a natural cooling rate.

7. The method of cooling the rail weld zone according to claim 1, further comprising:

in the head portion cooling, cooling the head portion at a cooling rate exceeding a natural cooling rate and not higher than 5° C./s in at least a part of the temperature range completing the transformation to pearlite from an austenite temperature region that exceeds A3, Ae, or Acm.

8. The method of cooling the rail weld zone according to claim 1, further comprising cooling a lower corner portion of a jaw portion at a rate lower than the rail web portion cooling rate when the head portion and the rail web portion are cooled.

9. The method of cooling the rail weld zone according to claim 8, further comprising, when a height of a head-side portion, forming a side surface of the head portion, is denoted by Hs (mm), the head portion, except for a region of the head portion positioned below a lower position distant from an upper end of the head-side portion by a distance of 2 Hs/3, is entirely subjected to accelerated cooling.

10. The method of cooling the rail weld zone according to claim 9, further comprising providing shield plates at the region of the head portion positioned below a lower position distant from the upper end of the head-side portion by a distance of 2 Hs/3, and ejecting a cooling fluid to the head portion.

11. A rail weld joint, cooled by the method of cooling the rail weld zone according to claim 1, the rail weld joint comprising:

a rail web portion having a residual stress in a vertical direction of 350 MPa or less;

a rail sole portion in which a residual stress in a longitudinal direction of the rail is compressive stress; and a rail weld zone comprising 95% or more of pearlite.

12. A rail weld joint, cooled by the method of cooling the rail weld zone according to claim 8, the rail weld joint comprising:

a rail web portion having a residual stress in a circumferential direction of a cross-section of the rail of 300 MPa or less; and a head portion having a hardness of Hv 320 or more.

* * * * *

UNITED STATES PATENT AND TRADEMARK OFFICE
CERTIFICATE OF CORRECTION

PATENT NO. : 8,557,064 B2  Page 1 of 1
APPLICATION NO. : 13/138791
DATED : October 15, 2013
INVENTOR(S) : Kenichi Karimine et al.

It is certified that error appears in the above-identified patent and that said Letters Patent is hereby corrected as shown below:

In the Specification

Column 14, line 5, change "a eutectoid" to -- an eutectoid --;

Column 14, line 34, change "a" to -- an --;

Column 15, line 14, change "a" to -- an --;

Column 27, Equation 1, change "k= -0.1t-1.48±0.85" to -- k= -0.1t+1.48±0.85 --;

Column 53-54, in Table 5, under foot portion, change header "early cooling (start from temperature exceeding A3, Ae," to -- early cooling (start from temperature exceeding A3, Ae, Acm) --;

Column 55-56, in Table 6, change header "hardness of weld zone [Hv] (2mm from welding center, syrface)" to -- hardness of weld zone [Hv] (2mm from welding center, surface) --;

Column 61-62, in Table 10, change header "result of fatugue test" to -- result of fatigue test --.

Signed and Sealed this
Fifth Day of August, 2014

Michelle K. Lee
*Deputy Director of the United States Patent and Trademark Office*